(12) United States Patent
Selden et al.

(10) Patent No.: US 12,480,166 B2
(45) Date of Patent: Nov. 25, 2025

(54) MULTIPLEXED FUEL ANALYSIS

(71) Applicant: ANDE Corporation, Waltham, MA (US)

(72) Inventors: Richard F. Selden, Lincoln, MA (US); Rosemary Turingan Witkowski, Stoneham, MA (US)

(73) Assignee: ANDE Corporation, Waltham, MA (US)

( * ) Notice: Subject to any disclaimer, the term of this patent is extended or adjusted under 35 U.S.C. 154(b) by 854 days.

(21) Appl. No.: 17/258,434

(22) PCT Filed: Jul. 29, 2019

(86) PCT No.: PCT/US2019/043968
§ 371 (c)(1),
(2) Date: Jan. 6, 2021

(87) PCT Pub. No.: WO2020/028273
PCT Pub. Date: Feb. 6, 2020

(65) Prior Publication Data
US 2022/0177980 A1 Jun. 9, 2022

Related U.S. Application Data

(60) Provisional application No. 62/712,075, filed on Jul. 30, 2018.

(51) Int. Cl.
*C12Q 1/6888* (2018.01)
*C12Q 1/6848* (2018.01)

(52) U.S. Cl.
CPC ......... *C12Q 1/6888* (2013.01); *C12Q 1/6848* (2013.01); *C12Q 2600/16* (2013.01)

(58) Field of Classification Search
None
See application file for complete search history.

(56) References Cited

U.S. PATENT DOCUMENTS

| | | | |
|---|---|---|---|
| 5,693,517 A | 12/1997 | Gelfand et al. | |
| 7,932,028 B2 * | 4/2011 | Fukui | C12Q 1/6895 435/6.15 |
| 8,018,593 B2 | 9/2011 | Tan et al. | |
| 8,173,417 B2 | 5/2012 | Tan et al. | |
| 8,206,974 B2 | 6/2012 | Tan et al. | |
| 8,450,059 B2 * | 5/2013 | Fredricks | C12Q 1/6883 435/6.1 |
| 8,720,026 B2 | 5/2014 | McGlinchy | |
| 9,314,795 B2 | 4/2016 | Selden et al. | |
| 9,354,199 B2 | 5/2016 | Neil Ganey et al. | |
| 9,366,631 B2 | 6/2016 | Tan et al. | |
| 9,523,656 B2 | 12/2016 | Tan et al. | |
| 9,606,083 B2 | 3/2017 | Tan et al. | |
| 9,889,449 B2 | 2/2018 | Tan et al. | |
| 10,191,011 B2 | 1/2019 | Tan et al. | |
| 11,900,604 B2 | 2/2024 | Tan et al. | |
| 2008/0261206 A1 * | 10/2008 | Kim | C12Q 1/6837 435/6.15 |
| 2009/0047671 A1 | 2/2009 | Bergeron et al. | |
| 2009/0263809 A1 * | 10/2009 | Roberton | B01D 57/02 204/450 |
| 2017/0100718 A1 * | 4/2017 | Tan | G01N 27/44726 |
| 2024/0271225 A1 | 8/2024 | Selden et al. | |

FOREIGN PATENT DOCUMENTS

| | | | |
|---|---|---|---|
| CN | 102181545 | * | 9/2011 |
| WO | 0111075 A2 | | 2/2001 |
| WO | WO 2012/155084 A1 | | 11/2012 |
| WO | WO 2017/058546 | * | 9/2015 |
| WO | WO2020028273 A1 | | 2/2020 |

OTHER PUBLICATIONS

Gao et al MicrobiologyOpen. 4(2): 332-342 and Supporting Information, total of 22 pages (Year: 2015).*
Padmanabhan et al (Intern. J. Environ. Studies. 61(6): 709-717 (Year: 2004).*
De Azambuja et al Fuel. Published online Nov. 2016. 189: 340-349 (Year: 2016).*
Joo et al Environmental Pollution. 156: 891-896 (Year: 2008).*
Agrawal et al., "Rapid detection and quantification of bisulfite reductase genes in oil field samples using real-time PCR." *FEMS Microbiol Ecol* (2009), 69:301-312.
Bailey et al., "Evaluation of Microbiological Test Kits for Hydrocarbon Fuel Systems." *Applied and Environmental Microbiology* (1979), 37(5):871-877.
Birch, L. et al. "A comparison of nucleic acid ampli®cation techniques for the assessment of bacterial viability." *Lett Appl Microbiol* (2001), 33(4):296-301.
Cord-Runisch et al., "Sulfate-Reducing Bacteria and their Activities in Oil Production," J. Petroleum Tech. 1987: 97-106.
Da Silva, P. R., et al. "Selection and evaluation of reference genes for RT-qPCR expression studies on Burkholderia tropica strain Ppe8, a sugarcane-associated diazotrophic bacterium grown with different carbon sources or sugarcane juice." *Antoine Van Leeuwenhoek* (2016), 109(11)1493-1502.
Dean, D et al., "A Multiplexed Microfluidic PCR Assay for Sensitive and Specific Point-of-Care Detection of Chlamydia trachomatis. "*PLoS One* (2012), 7(12):e51685. doi: 10.1371/journal.pone.0051685.

(Continued)

*Primary Examiner* — Carla J Myers
(74) *Attorney, Agent, or Firm* — Proskauer Rose LLP

(57) ABSTRACT

Compositions, testing chambers and methods for testing a fuel sample for microbial contamination (including fuels treated with a biocide) are provided, which comprise: a quantity of hydrocarbon fuel; a microbial contamination wherein the microbial contamination further comprises nucleic acid in the form of both DNA, RNA or a combination thereof, and an analyzing solution; wherein the analyzing solution comprises at least six (6) primer pairs for amplification of at least one target locus, wherein at least one primer of each pair of primers is labeled with a fluorescent dye and wherein at least one of the primer pair binds to the nucleic acid of the microbial contamination.

20 Claims, 77 Drawing Sheets

Specification includes a Sequence Listing.

(56) References Cited

OTHER PUBLICATIONS

Della Manna, A. et al. "Developmental validation of the DNAscanTM Rapid DNA AnalysisTM instrument and expert system for reference sample processing." *Forensic Science International: Genetics* (2016), 25:145-156.
Denaro, T. et al. DNA Isolation of Microbial Contaminants in Aviation Turbine Fuel Via Traditional Polymerase Chain Reaction (PCR) and Direct PCR. AFRL-PR-WP-TR-2006-2049, Propulsion Directorate. Air Force Research Laboratory (2005).
Deska, M. et al. "Coal Enrichment Methods by Using Microorganisms and Their Metabolites." *Journal of Ecological Engineering* (2018), 19(2).
Efremenko E.N. et al. "An approach to the rapid control of oil spill bioremediation by bioluminescent method of intracellular ATP determination." *International Biodeterioration & Biodegradation* (2005), 56(2):94-1001.
Gaylarde C. et al. "Microbial Contamination of Stored Hydrocarbon Fuels and Its Control." *Revista de Microbiologia* (1999) 30:01-10.
Gomes, A. E. I. et al. " Selection and validation of reference genes for gene expression studies in Klebsiella pneumonia using Reverse Transcription Quantitative real-time PCR." *Sci Rep* (2018), 8(1);9001.
Grover, R. et al. "FlexPlex27—highly multiplexed rapid DNA identification for law enforcement, kinship, and military applications." *Int J Legal Med* (2017), 131(6):1489-1501.
Hill, E. C. et al., "Microbial Contamination and Associated Corrosion in Fuels, During Storage, Distribution and Use." *ECHA Microbiology Ltd*, Technical notes (2007).
Jamal, Q. et al. "Isolation and Characterization of Bacteria from Coal Mines of Dara Adam Khel, Pakistan." *Geomicrobiology Journal* (2016), 33(1).
Kavanaugh et al., "Selected Antimicrobial Essential Oils Eradicate Pseudomonas spp. And *Staphylococcus aureus* Biofilms," Applied Environ. Microbiol, 2010.
Kavanaugh et al., Selected Antimicrobial Essential Oils Eradicate Pseudomonas spp. And *Staphylococcus aureus* Biofilms Applied Environ. Microbiol. 2012.
Kilbane, J. and J. Wylde. "Investigation of Microorganisms in a West Texas Oilfield Using Growth and Genetic Testing." *SPE International Symposium on Oilfield Chemistry*.
Kralik, P. and Ricchi, M. "A Basic Guide to Real Time PCR in Microbial Diagnostics: Definitions, Parameters, and Everything." *Front Microbiol* (2017); 8:108.
Krätzer, C. et al. "Transcriptional Profiling of Methyltransferase Genes during Growth of Methanosarcina mazei on Trimethylamine." *J. Bacteriol* (2009), 191(16):5108-15.
Llanos, A. et al. "Tracking the best reference genes for RT-Qpcr data normalization in filamentous fungi." BMC Genomics (2015).
Lopes, P. and Gaylarde, C. "Use of Immunofluorescence to Detect the Fungus Hormoconis resinae in Aviation Kerosine." *International Biodeterioration & Biodegradation* (1996), 37(1-2):37-40.
Martin-Sanchez, P,M. et al. "A novel qPCR protocol for the specific detection and quantification of the fuel-deteriorating fungus Hormoconis resinae." *Blofouling* (2014), 32(6):635-644.
Maruthamuthu et al., "A novel qPCR protocol for the specific detection and quantification of the fuel-deteriorating fungus Hormoconis resinae." Indian J. Chem. Technol. vol. 12. Sep. 2005, 567-575.
Masak et al., "Pseudomonas Biofilms: Possibilities of their control," FEMS Microbiol. Ecol. 89 (2014) 1-14.
Mesle, M. et al. "Microbial methanogenesis in subsurface oil and coal." *Research in Microbiology* (2013), 164(9):959-972.
Miqueletto et al., "Cultivation-independent methods applied to the microbial propection of oil and gas in soil from a sedimentary basin in Brasil," AMB Express 2011, 1-35.
Muthukumar et al., "Microbially influenced corrosion in petroleum product pipelines, a Review," Indian J. Experimental Biol., vol. 41, Sep. 2003. 1012-1022.
Myers, T.W. and Gelfand, D. H. "Reverse Transcription and DNA Amplification by a Thermus thermophilus DNA Polymerase." *Biochemistry* (1991), 30:7661-7666.
Nafta-Gaz et al., "The application of Biocides in the Oil and Gas Industry," Oil & Gas Institute, Krakow (2013) 103-11.
Passman, F.J. "Microbial contamination and its control in fuels and fuel systems since 1980, a review." *International Biodeterioration & Biodegradation* (2013), 81:88- 104.
Pathan, E. K. et al. "Selection of reference genes for quantitative real-time RT-PCR assays in different morphological forms of dimorphic zygomycetous fungus Benjaminiella poitrasil." *PLoS One* (2017), 12(6):e0179454. doi: 10.1371/journal.pone.0179454.
Rajasekar et al., "Bacteria as indicators for finding oil and gas reservoirs: A case study of the Bikaner-Nagaur Basin, Rajasthan, India." Appl. Microbiol.Biotechnol (2010) 85:1175-1188.
Rasheed et al., "Bacteria as Indicators for finding oil and gas reservoirs," Pet. Sci. (2011)8:264-268.
Rasheed, M. et al. "Application of geo-microbial prospecting method for finding oil and gas reservoirs." *J Petrol Sci Eng* (2012), 84-85:33-41.
Rasheed et al., "Application of Geo-microbial prospecting for finding oil and gas reserves," Front. Earth, Sci 2015, 9(1):40-50.
Rauch, M.E. et al. "Characterization of microbial contamination in United States Air Force aviation fuel tanks." *J Ind Microbiol Biotechnol* (2006) 33:29-36.
Read, T. et al. "Rapid Multi-Locus Sequence Typing Using Microfluidic Biochips." PLoS ONE (2010), 5(5):e10595. doi:10.1371/journal.pone.0010595].
Rosin-Cerate. Using Bacteria to look for oil and gas, Jun. 17, 2015.
Samuel et al., Microbial Contaminants in the Commercial Aviation Fuel Obtained from Benin City Airport, Nigeria, Universal J. of Microbiol. Res. 3(3):31-35, 2015.
Sanchez et al., Presence of Opportunistic Oil-degrading Microorganisms Operating in the Initial Steps of Oil extraction and handling, Int'l Microbiol. 20006 9:119-124.
Savli, H. et al. Expression stability of six housekeeping genes: a proposal for resistance gene quantification studies of Pseudomonas aeruginosa by real-time quantitative RT-PCR. J. Med Microbiol (2003), 52:40308.
Sekhohola, L.M. et al. "Fungal colonization and enzyme-mediated metabolism of waste coal by Neosartorya fischeri strain ECCN 84." *Biosci Biothechnol Biochem* (2014), 78(10):1797-802;.
Strapoc, D. et al. "Methane-Producing Microbial Community in a Coal Bed of the Illinois Basin." *Applied and Environmental Microbiology* (2008), 74(8).
Tan, E. et al. "Fully integrated, fully automated generation of short tandem repeat profiles." *Investig Genet* (2013), 4:16.
Tulsiyan, R. K. et al. "Isolation and Identification of Fungi from Coal Mines near Hazaribagh and their Diversity Study." *Journal of Cell Science and Apoptosis* (2017), 1:1.
Turingan R.S. et al., "Rapid DNA analysis for automated processing and Interpretation of low DNA content samples." *Investigative Genetics* (2016) 7:2.
Turingan, R.S. et al. "Rapid detection and strain typing of Chlamydia trachomatis using a highly multiplexed microfluidic PCR assay." *PLoS One* (2017), 12(5):e0178653. doi: 10.1371/journal.pone.0178653.
Turingan, R.S. et al. "Rapid Focused Sequencing: A Multiplexed Assay for Simultaneous Detection and Strain Typing of Bacillus anthracis, Francisella tularensis, and Yersinia pestis." *PLoS One.* (2013); 8(2):e56093. doi: 10.1371/journal.pone.0056093.
Vigneron, A. et al. "Succession in the petroleum reservoir microbiome through an oil field production lifecycle". *ISME J.* (2017), 11(9):2141-2154; http://www.hpcdfuel.com/pdf/DOWfuel_training.pdf].
Wen, S. et al. "Validation of Reference Genes for Real-Time Quantitative PCR (qPCR) Analysis of Avibacterium paragallinarum." *PLoS One* (2016), 11(12):e0167736. doi: 10.1371/journal.pone.0167736.
White, J. et al. "Culture-Independent Analysis of Bacterial Fuel Contamination Provides Insight into the Level of Concordance with the Standard Industry Practice of Aerobic Cultivation." *Applied and Environmental Microbiology* (2011), 77(13):4527-4538.

(56) References Cited

OTHER PUBLICATIONS

Xu and Gu, The War against Problematic Biofilms in the Oil and Gas Industry, J. Microbio, Biochem. Technol. 2015 7:5.

Yemashova et al., Biodeterioration of Crude Oil and oil Derived Products Review, Rev. Environ. Sci. Biotechnol. Springer Sciences, 2007.

Radwan et al., "Robust Multiplex Quantitative Polymerase Chain Reaction Assay for Universal Detection of Microorganisms in Fuel", *Energy Fuels* 2018, 32, 10530-10539 (2018).

International Search Report and Written Opinion for PCTU.S. Pat. No. 2019043698, dated Jul. 1, 2020 (10 pages).

Beckmann, S. et al., "Long-term succession in a coal seam microbiome during in situ biostimulation of coalbed-methane generation," The ISME Journal (2019) 13:632-650, https://doi.org/10.1038/s41396-018-0296-5 (19 pages).

Carney, C. et al., "Developmental validation of the ANDE™ rapid DNA system with FlexPlex™ assay for arrestee and reference buccal swab processing and database searching," Forensic Science International: Genetics 40 (2019) 120-130 (11 pages).

Gatekeeper, "Bacteria Testing: Genetic Methods," GAT2004-GKP-2013.0, Mar. 2013 (2 pages).

Jia, R. et al., "Enhanced Biocide Treatments with D-amino Acid Mixtures against a Biofilm Consortium from a Water Cooling Tower," Frontiers in Microbiology, Aug. 16, 2017, https://doi.org/10.3389/fmicb.2017.01538 (11 pages).

Pannekens, M. et al., "Oil reservoirs, an exceptional habitat for microorganisms," New Biotechnology 49 (2019) pp. 1-9 (9 pages).

Rajasekar, A. et al., "Characterization of corrosive bacterial consortia isolated from petroleum-product-transporting pipelines," Appl Microbiol Biotechnol (2010) 85:1175-1188 DOI 10.1007/s00253-009-2289-9 (14 pages).

Selden, R. et al., "Rapid DNA Identification: Changing the Paradigm, A Look in the Mirror: A Case Study About Police Race Versus Cultural Awareness for Effective Staffing," The Magazine of the FBI National Academy Associates, Jan./Feb. 2018, vol. 20, No. 1 (4 pages).

Sheridan, G. E. C. et al., "Detection of mRNA by Reverse Transcription-PCR as an Indicator of Viability in *Escherichia coli* Cells," Applied and Environmental Microbiology, Apr. 1998, vol. 64, No. 4, pp. 1313-1318 (6 pages).

Su, X. et al., "The diversity of hydrogen-producing bacteria and methanogens within an in situ coal seam," Biotechnol Biofuels (2018) 11:245, https://doi.org/10.1186/s13068-018-1237-2 (18 pages).

Vick, S.H.W. et al., "Succession Patterns and Physical Niche Partitioning in Microbial Communities from Subsurface Coal Seams," iScience 12, 152-167, Feb. 22, 2019 (27 pages).

Mck, S.H.W. et al., "Who eats what? Unravelling microbial conversion of coal to methane," *FEMS Microbiology Ecology*, 95, 2019, fiz093, doi: 10.1093/femsec/fiz093 (14 pages).

Wu, T. et al., "Pseudomonas aeruginosa L10: A Hydrocarbon-Degrading, Biosurfactant-Producing, and Plant-Growth-Promoting Endophytic Bacterium Isolated From a Reed (Phragmites australis)," Frontiers in Microbiology, May 2018, vol. 9, Article 1087 https://doi.org/10.3389/fmicb.2018.01087, https://www.frontiersin.org/articles/10.3389/fmich.2018.01087/full (12 pages).

"NCBI Database, GenBank Accession No. KC119202.1, "Aspergillus fumigatus strain KARVS06 28S ribosomal RNA gene, partial sequence, National Library of Medicine, National Institutes of Health, Bethesda, MD; URL: <ncbi.nlm.hih.gov/nuccore/KC119202.1/>) Year 2013 (1 page).

\* cited by examiner

General Assay for Microbial Contamination in Oil Products

| General assay | Ribosomal coding region | | Sulphate reduction | Methanogenesis |
|---|---|---|---|---|
| | 16S | 18S | *dsr B* | *mcr A* |
| Bacteria | T1 | - | T5/- | - |
| Archaea | T2 | - | T5/- | T6/- |
| Filamentous fungi | - | T3 | - | - |
| Yeast | - | T4 | - | - |

FIG. 13

Amplicon sizing for General 6-plex Assay

| Target# | General assay Amplicon Sizes |
|---|---|
| T1 | 220-221 (215-223) |
| T2 | 228-230, 233 (224-237) |
| T3 | 195-198 (192-199) |
| T4 | 243-244 (239-245) |
| T5 | 222, 228, 240, 243 (218-258) |
| T6 | 273-278 (272-278) |

FIG. 16

Jet Fuel/Kerosene-Specific Assay

| Jet fuel (Kerosene) | Ribosomal coding region | Ribosomal coding region | Internal transcribed spacer regions and ribosomal coding regions | Internal transcribed spacer regions and ribosomal coding regions | Sulphate reduction |
|---|---|---|---|---|---|
| | 16S | 18S | 18S-ITS1-5.8S-ITS2-28S | 18S-ITS1-5.8S-ITS2-28S | dsrB |
| Bacteria | T1 | - | - | - | T5/- |
| Archaea | T2 | - | - | - | T5/- |
| Filamentous fungi | - | T3 | T18/- | T21/- | - |
| Hormoconis resinae | - | T3 | T18 | - | - |
| Aspergillus species | - | T3 | - | T21 | - |
| Yeast | - | T4 | - | - | - |

| Diesel fuel | Diesel Fuel-Specific assay | | | | | | | |
|---|---|---|---|---|---|---|---|---|
| | Ribosomal coding region | Internal transcribed spacer regions or ribosomal coding regions | Non-ribosomal target | Ribosomal coding region | Internal transcribed spacer regions and ribosomal coding regions | Sulphate reduction | Methanogenesis | Non-ribosomal target |
| | 16S | 16S, 23S, 23S_IT5_5S | groEL (chaperonine) | 18S | 18S-ITS1-5.8S-ITS2-28S | dsrB | mcrA | Tubuline |
| Bacteria | | | | | | | | |
| Pseudomonas species | T1 | T7-14/- | T15/- | | | T5/- | | |
| Flavobacteriaceae species | T1 | T7 | | | | | | |
| Desulfovibrionaceae species | T1 | T8 | | | | T5/- | | |
| Desulfotomaculum species | T1 | T9 | | | | T5/- | | |
| Clostridium species | T1 | T10 | | | | | | |
| Achromobacter species | T1 | T11 | | | | | | |
| Bordetella species | T1 | T12 | | | | | | |
| Bacillus species | T1 | T13 | | | | | | |
| Burkholderia species | T1 | T14 | | | | | | |
| Archaea | T2 | | T15/- | | | T5/- | T6/- | |
| Filamentous fungi | | | | | | | | |
| Hormoconis resinae | | | | T3 | T18/20/21/- | | | T19/- |
| Fusarium species | | | | T3 | T18 | | | |
| Aspergillus species | | | | T3 | T20 | | | |
| Penicillium species | | | | T3 | T21 | | | |
| Yeast | | | | T4 | T22/- | | | T19 |
| Candida species | | | | T4 | T22 | | | |

Gasoline Fuel-Specific assay

| Gasoline | Ribosomal coding region | Internal transcribed spacer regions or ribosomal coding regions | Non-ribosomal target | Ribosomal coding region | Sulphate reduction | Methanogenesis |
|---|---|---|---|---|---|---|
| | 16S | 16S, 23S, 23S_ITS_5S | gyrAB | 18S | dsrB | mcrA |
| Bacteria | T1 | T7/17/- | T27/- | - | T5/- | - |
| Halomonas species | T1 | T17 | | | | |
| Marinobacterium species | T1 | - | T27 | - | - | - |
| Pseudomonas species | T1 | T7 | - | - | - | - |
| Archaea | T2 | - | - | - | T5/- | T6/- |
| Filamentous fungi | - | - | - | T3 | - | - |
| Yeast | - | - | - | T4 | - | - |

FIG. 21

OligoAnalyzer

Sequence [5 MOD▼ INTERNAL▼ 3' MOD▼ MIXED BASES▼]

AGA TGG TGG TTG ACC TGG

Bases 18

Try the new batch mode here

CLEAR SEQUENCE

Parameter sets [SpecSheet (Default)]
- Target type
- Oligo Conc
- Na+ Conc
- Mg++ Conc
- dNTPs Conc

Results

| | RESUSPENSION |
|---|---|
| SEQUENCE | 5'- AGA TGG TGG TTG ACC TGG -3' |
| COMPLEMENT | 5'- CCA GGT CAA CCA CCA TCT -3' |
| LENGTH | 18 |
| GC CONTENT | 55.6% |
| MELT TEMP | 62.5°C |
| MOLECULAR WEIGHT | 5530.6 g/mole |
| EXTINCTION COEFFICIENT | 172600 L/(mole·cm) |
| nmole/OD$_{260}$ | 5.79 |
| μg/OD$_{260}$ | 32.04 |

OligoAnalyzer

Sequence [5 MOD▼ INTERNAL▼ 3' MOD▼ MIXED BASES▼]

GAT GGT GGT TGA CCT CG

Bases 17

Try the new batch mode here

CLEAR SEQUENCE

Parameter sets [SpecSheet (Default)]
- Target type
- Oligo Conc
- Na+ Conc
- Mg++ Conc
- dNTPs Conc

Results

| | RESUSPENSION |
|---|---|
| SEQUENCE | 5'- GAT GGT GGT TGA CCT CG -3' |
| COMPLEMENT | 5'- CGA GGT CAA CCA CCA TC -3' |
| LENGTH | 17 |
| GC CONTENT | 58.8% |
| MELT TEMP | 60.7°C |
| MOLECULAR WEIGHT | 5217.4 g/mole |
| EXTINCTION COEFFICIENT | 159100 L/(mole·cm) |
| nmole/OD$_{260}$ | 6.29 |
| μg/OD$_{260}$ | 32.79 |

FIG. 23

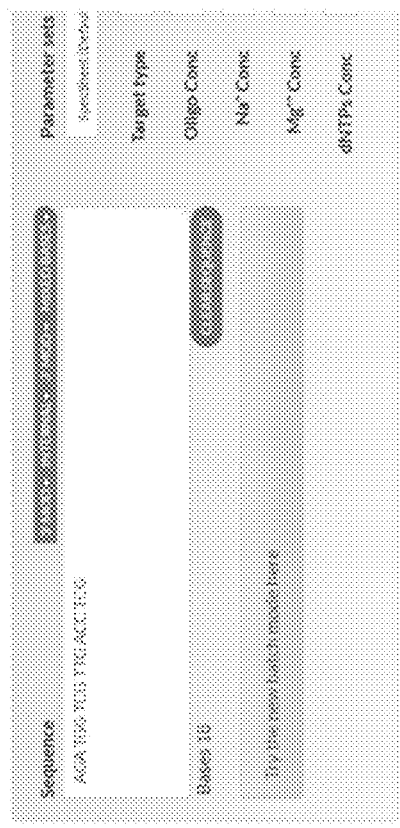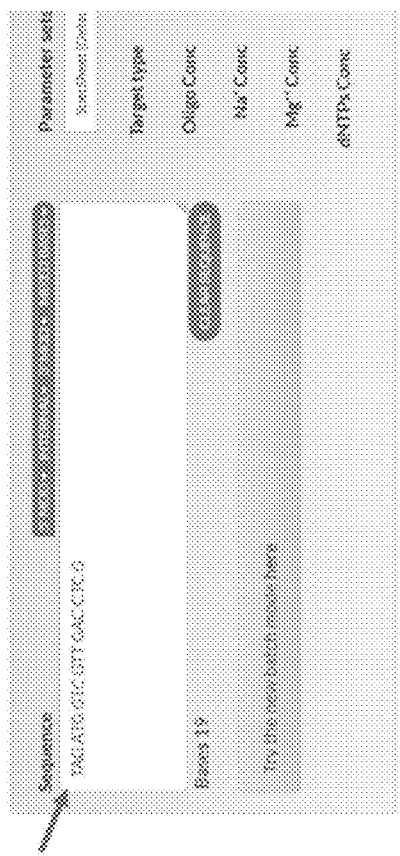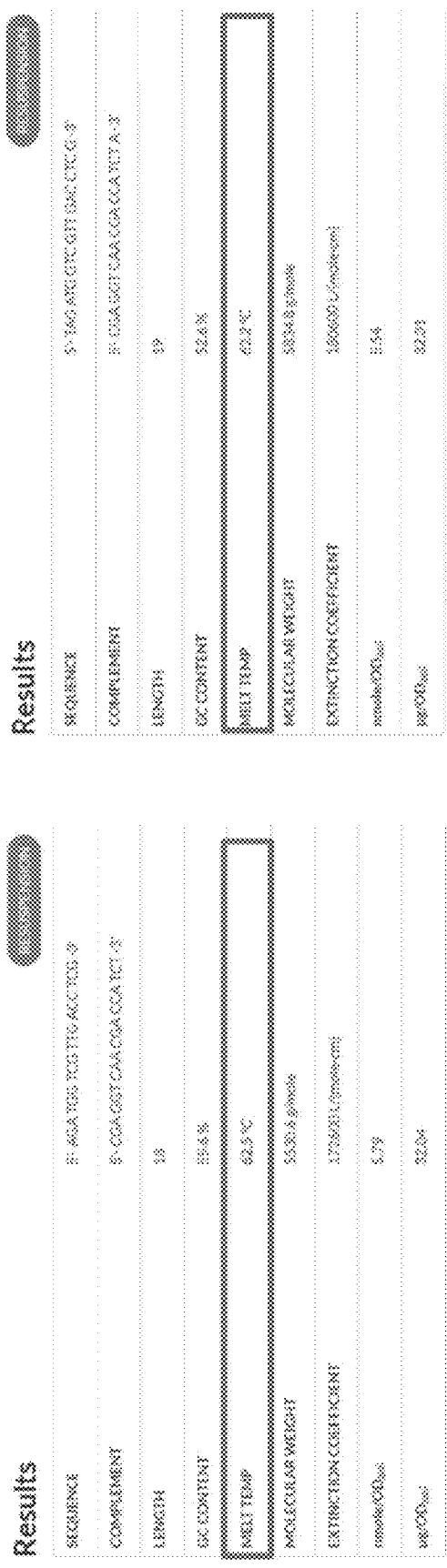
FIG. 24

An Expanded 16-plex Assay for 3 Different Fuel Types (Jet fuel/Kerosene, Diesel, and Gasoline)

| Expanded assay (Families/Genera) | Internal transcribed spacer regions or ribosomal coding regions<br>16S, 23S, 23S_ITS_5S | Non-ribosomal targets<br>groEL, gyrAB, rhoD, atpA, oprL, Tubuline | Internal transcribed spacer regions or ribosomal coding regions<br>18S-ITS1-5.8S-ITS2-28S | Non-ribosomal targets<br>Tubuline, RPB2, CaM |
|---|---|---|---|---|
| *Pseudomonas species* | T7 | " | " | " |
| *Flavobacteriaceae species* | T8 | " | " | " |
| *Desulfovibrionaceae species* | T9 | " | " | " |
| *Desulfotomaculum species* | T10 | " | " | " |
| *Clostridium species* | T11 | " | " | " |
| *Achromobacter species* | T12 | " | " | " |
| *Bordetella species* | T13 | " | " | " |
| *Bacillus species* | T14 | " | " | " |
| *Burkholderia species* | - | T15 | " | " |
| *Marinobacter species* | T16 | " | " | " |
| *Halomonas species* | T17 | " | " | " |
| *Hormoconis resinae* | - | " | T18 | " |
| *Penicillium species* | - | " | " | T19 |
| *Fusarium species* | - | " | T20 | " |
| *Aspergillus species* | - | " | T21 | " |
| *Candida species* | - | " | T22 | " |

Species Detection of Select/Representative Genera (*Bacillus*, *Pseudomonas*, *Penicillium*, *Aspergillus*, and *Candida*).

| Species Detection | Ribosomal coding regions | Internal transcribed spacer regions or ribosomal coding regions | Non-ribosomal targets | Internal transcribed spacer regions and ribosomal coding regions | Non-ribosomal targets | |
|---|---|---|---|---|---|---|
| | 16S, 23S | 16S, 5S, 23S, ITS_5S | gyrB, gyrAB, rho D, apg A, cpn1, Tubuline | 18S-ITS1-5.8S-ITS2-28S | Tubuline | RPB2, CaM, Tubuline |
| Bacillus species | T13 | | T76-82/- | | | |
| B. cereus | T14 | | T76 | | | |
| B. subtilis | T13 | | T77 | | | |
| B. thuringiensis | T14 | | T78 | | | |
| B. megaterium | T14 | | T79 | | | |
| B. licheniformis | T13 | | T80 | | | |
| B. brevi | T14 | | T81 | | | |
| Pseudomonas species | T7 | T83-84/- | T85-86/- | | | |
| P. aeruginosa | T7 | T82 | | | | |
| P. putida | T7 | T83 | | | | |
| P. angullisepticus | T7 | T84 | | | | |
| P. fluorescens | T7 | | T85 | | | |
| P. stutzeri | T7 | | T86 | | | |
| P. oleovorans | T7 | | T87 | | | |
| P. mendocina | T7 | | T88 | | | |
| P. cattida | T7 | | T89 | | | |
| Penicillium species | | | | | T19 | T90-94/- |
| P. chrysogenum | | | | | T19 | T90 |
| P. citrinum | | | | | T19 | T91 |
| P. variable | | | | | T19 | T92 |
| P. komati | | | | | T19 | T93 |
| P. frequentans | | | | | T19 | T94 |
| Aspergillus species | | | | T21 | | T95-103/- |
| A. fumigatus | | | | T21 | | T95 |
| A. ochraceus | | | | T21 | | T96 |
| A. niger | | | | T21 | | T97 |
| A. parasiticus | | | | T21 | | T98 |
| A. nomori | | | | T21 | | T99 |
| A. terreus | | | | T21 | | T100 |
| A. versicolor | | | | T21 | | T101 |
| A. penicillioides | | | | T21 | | T102 |
| A. flavus | | | | T21 | | T103 |
| Candida species | | | | T22 | | T104-106/- |
| C. tropicalis | | | | T22 | | T104 |
| C. albicans | | | | T22 | | T105 |
| C. keroseneae | | | | T22 | | T106 |

FIG. 30

Strain Differentiation (strain-level) of Select/Representative Species (*Bacillus*, *Pseudomonas*, *Penicillium*, *Aspergillus*, and *Candida*).

| Strains detection | Ribosomal coding regions 16S, 23S | Ribosomal coding regions 16S | Internal transcribed spacer regions and ribosomal coding region 18S-ITS1-5.8S-ITS2-28S | Non-ribosomal target | Internal transcribed spacer regions and ribosomal coding regions 18S-ITS1-5.8S-ITS2-28S |
|---|---|---|---|---|---|
| Bacillus species | T14 | mix | | Tubuline | |
| B. cereus Strain SWH-15 | T14 | T107 | | | |
| B. cereus strain DRB11 | T14 | T108 | | | |
| B. subtilis Strain M03 | T14 | T109 | | | |
| B. subtilis Strain EG1 | T14 | T110 | | | |
| B. subtilis Strain AS2 | T14 | T111 | | | |
| Pseudomonas species | T7 | mix | | | |
| P. aeruginosa Strain 6A (ha4) | T7 | T112 | | | |
| P. aeruginosa Strain R8-763-1 | T7 | T113 | | | |
| P. aeruginosa Strain IFS | T7 | T114 | | | |
| P. aeruginosa Strain M002 | T7 | T115 | | | |
| P. aeruginosa Strain Lipdsm-S-ASA | T7 | T116 | | | |
| P. aeruginosa Strain 198-PA-2011 | T7 | T117 | | | |
| P. aeruginosa Strain R7-734 | T7 | T118 | | | |
| P. aeruginosa Strain RJ-1 | T7 | T119 | | | |
| P. aeruginosa Strain DSM 50071T | T7 | T120 | | | |
| P. aeruginosa Strain SJTD-1 | T7 | T121 | | | |
| P. putida Strain AK5 | T7 | T122 | | | |
| P. putida Strain E41 | T7 | T123 | | | |
| P. otitidis Strain B1f | T7 | T124 | | | |
| P. otitidis Strain R6-430 | T7 | T125 | | | |
| Penicillium species | | | | | mix |
| P. chrysogenum Strain ACM 33826 | | | | T19 | T126 |
| P. sp. Strain RRA1 | | | | T19 | T127 |
| P. sp. Strain RRA2 | | | | T19 | T128 |
| Aspergillus species | | | T21 | | mix |
| A. terreus Strain CICC 2455 | | | T21 | | T129 |
| A. niger Strain BS-A5 | | | T21 | | T130 |
| A. fumigatus Strain WM 06.357 | | | T22 | | T131 |
| Candida species | | | T23 | | mix |
| C. kerssenerae Strain IM1 393605 | | | T23 | | T132 |
| C. kerssenerae Strain IM1 393606 | | | T23 | | T133 |

FIG. 31

Assay for Microbial Prospecting based on detection of light hydrocarbon-oxidizing microorganisms (*Alcanivorax, Brevibacterium, Corynebacterium, Flavobacterium, Mycobacterium, Nocardia, Pseudomonas,* and *Rhodococcus*).

| Microbial Prospecting | Methane monooxygenase component A alpha chain | Ethene monooxygenase (alpha subunit) | Propane monooxygenase (large hydroxylase subunit) | Butane monooxygenase (alpha hydroxylase subunit) |
|---|---|---|---|---|
| | *mmoX* | *etnC* | *prmA* | *bmoX* |
| Methane-oxidizing microorganisms | T134 | - | - | - |
| Ethene-oxidizing microorganisms | - | T135 | - | - |
| Propane-oxidizing microorganisms | - | - | T136 | - |
| Butane-oxidizing microorganisms | - | - | - | T137 |

MULTIPLEXED FUEL ANALYSIS

CROSS-REFERENCE TO PRIOR FILED APPLICATION

This application is a 35 U.S.C. § 371 national Stage Application of International Application No. PCT/US19/43968, filed on Jul. 29, 2019, which claims benefit of, and priority to an earlier filed provisional application 62/712,075 filed on Jul. 30, 2018, which is herein incorporated by reference in its entirety.

SEQUENCE LISTING

The instant application contains a Sequence Listing which has been submitted electronically in ASCII format and is hereby incorporated by reference in its entirety. Said ASCII copy, created on Sep. 22, 2021, is named 54862-057US1_SL.txt and is 36,585 bytes in size.

FIELD OF THE INVENTION

The invention relates to the detection of microbial contamination in sources of fuel through the use of multiplexed Rapid DNA assays.

BACKGROUND OF THE INVENTION

In this era of resource scarcity, it is critical to minimize waste. This is particularly true of energy resources, with their waste contributing to damage to the environment, to human health, and to the economy. Three of the most important sources of energy today, crude oil (petroleum), coal, natural gas, and their derivatives (including gasoline, diesel, and home heating oil) are non-renewable. Just as finding alternatives to hydrocarbon-based fuels is crucial to global energy use and the environment, minimizing waste of such fuels is crucial in global energy planning. For example, petroleum and its derivatives are subject to significant waste due to microbial contamination and biodegradation. Accordingly, prevention of this contamination and remediation following contamination are fundamental goals of the fuel industry.

Uncontrolled microbial contamination impacts all stages of the petroleum industry, from extraction and recovery to refining to storage through fleet operations and consumer use. Contamination can lead to the formation of sludge, which restricts the flow of fuel and the operation of mechanical parts (e.g. valves) and filters [Hill, E. C. Fuels. In Microbial Problems in the Offshore Oil Industry (1987), 219-230], corrosion of pipes and storage tanks [Videla, H. A. "The action of *Cladosporium resinae* growth on the electrochemical behavior of aluminium" In Biologically Induced Corrosion (1986), 215-222], and ultimately, in loss of product quality. Contamination is not limited to the fuel production—it is a significant issue for the end-user as well. For example, blocking of fuel lines and injectors can lead to failure of engine and system components.

Although the problem of microbial contamination has been recognized for over a century, it has been minimally studied and incompletely addressed. Microorganisms such as bacteria, viruses, fungi, and algae degrade fuel products and fuel systems. There exists today a significant unmet need for the rapid identification of microbial contaminants in many applications, including to develop effective prevention and remediation strategies, to trace the sources of contamination, to assist in fuel exploration, and to combat fuel theft.

Microorganisms require both water and nutrients to survive and proliferate. Water accumulates in fuel by a variety of mechanisms, including: (1) water may be present in fuel in situ-during processing, transport, or storage—as fuel is cooled, dissolved water may condense; (2) moisture may accumulate via the air above the fuel; and (3) water may be added as ballast or to purge the delivery system [Gaylarde C. et al. *Revista de Microbiologia* (1999) 30:01-10]. Since the specific gravity of water is typically greater than that of fuel, it sinks to low points in tanks and pipelines. In some cases, this allows ready drainage but in others, particularly underground tanks, removal of water is problematic. In effect, there is sufficient water for microbial proliferation wherever fuel is present. Finally, water may be added to fuel during certain types of theft, particularly when fuel is adulterated, whether to remove a portion of the "pure" fuel or to dilute it with less expensive components.

Microbes do not typically grow within fuel itself; instead they tend to become established at the interface between water and fuel (also on internal tank and system surfaces). At this interface, organisms produce various surfactants and lipopolysaccharides as well as nutrients and toxic metabolites—the unique set of conditions is amenable to a single species of microorganism to flourish, but typically a large number of bacterial and fungal species are present [Vigneron, A. et al. ISME J. (2017), 11(9):2141-2154; http://www.hpcdfuel.com/pdf/DOWfuel_training.pdf]. The resulting microbial community creates and lives within a slimy material called a "biofilm". Biofilms may be found on tank roofs, shells, at the fuel/water interface, and within bottom sludge/sediment [ASTM D6469-17. 2017. Standard Guide for Microbial Contamination in Fuels and Fuel Systems]. Biofilms are major contributors to the problems discussed above.

Crude oil contains a range of hydrocarbons, including aliphatic, aromatic, and heterocyclic compounds [Gaylarde, Ibid]. During refining, a variety of additives are utilized, including antioxidants, chelating agents, alcohols, surfactants, detergents, corrosion inhibitors, and fatty acid methyl esters. In tandem with metals, salts, nitrogen, and phosphorous, crude oil and the three major classes of fuel (gasoline, jet fuel, and diesel) contain sufficient nutrients to allow for the proliferation of microorganisms. Oxygen may be present as well, and growth may be under aerobic or anaerobic conditions.

The broad range of nutrients that may be present in a given crude oil or fuel (and during the many steps of processing, transport and storage) and the broad range of microbial contaminants that may be present leads to a unique set of growth conditions and microbial population in a given hydrocarbon fuel sample. It is also important to distinguish microbial from non-microbial processes. Several approaches to characterizing microbial populations have been developed:

Cell Culture. On solid media, pour-plate and spread-plate methods have been employed followed by colony counting. Since oils are not soluble in water or culture media, membrane filtration has also been applied [Rogers, M. R. and Kaplan, A. M. "A survey on the microbiological contamination in a military fuel distribution system." In: Society for Industrial Microbiology: Developments in Industrial Microbiology (1965), 6:80-94]. Alternatively, a thixotropic gel can be inoculated [ASTM 2017, Ibid]. In liquid media, cell counts may also be obtained and changes in color and turbidity can be measured. Problems with cell culture include time to result (which can be days to weeks or longer), the inability to culture fastidious microorganisms (most species cannot be cultured), the inability to identify cultured colonies, the need to do further work to identify cultured colonies, and contamination.

Dip-slides. Related to cell culture methodologies, dip-slides are slides covered with agar gels, typically one type that allows bacterial growth in one side and another for fungal growth on the other. [Bailey, C. A. and May, M. E. *Applied and Environmental Microbiology* (1979), 37(5): 871-877]. The slide is dipped into the desired fuel and incubated to allow microorganisms to grow. The procedure shares the limitations of cell culture methods and generally does not reveal specific organisms. Furthermore, the slides are best applied to aqueous samples-fuel present can lead to unreliable results. Lastly, the method is limited to growth of aerobic organisms, further diminishing its value.

Light and electron microscopy. Light microscopy can be utilized to visualize microbial cells (typically by Gram-staining). This is often performed following concentration of microbes on membrane filters with subsequent quantification using a microscope. Microscopy shares many of the limitations of cell-culture methods and requires significant technical expertise yet provides only a snapshot of a subset of microbial contaminants. Scanning electron microscopy is used in special circumstances but is too expensive and labor-intensive for routine use [Lawrence, J. R. et al. Analytical Imaging and Microscopy Techniques, Chapter 5 in Manual of Environmental Microbiology, American Society for Microbiology (1997)].

ATP measurement. Bioluminescence has been utilized to measure intracellular ATP concentration [Efremenko E. N. et al. *International Biodeterioration & Biodegradation* (2005), 56(2):94-100]. The assay is indirect and may lead to misleading results based on inhibition of activity of the reporter enzyme utilized in the assay. Although useful for estimating quantities of certain microorganisms, ATP measurement approaches are not well-suited for the identification of specific microbial species.

Detection of proteins, catalase, lipids, fatty acids, and other metabolic products. Acidic pH suggests the possibility of microbial presence. Similarly, testing oxygen concentration over time may indicate microbial activity (if the concentration is reduced over several hours). Nitrogen analysis (to detect nitrate-reducing bacteria) and sulfate analysis (detecting sulfides to suggest sulfate-reducing microbes) can also be performed. In general, these methods do not enable the identification of specific strains of microorganisms and merely provide evidence of the presence of microbes in general.

Antibody-based assays. Serologic assays using both polyclonal and monoclonal antibodies have been developed [Lopes, P. and Gaylarde, C. *International Biodeterioration & Biodegradation* (1996), 37(1-2):37-40]. These are limited in that they are labor-intensive, relatively insensitive, and can only detect specific organisms for which antibodies are available.

DNA Microarrays. DNA microarrays are typically sets of small oligonucleotide- or amplicon-containing spots. Each spot contains nucleic acids capable of binding a DNA or RNA target. The targets can include genomic DNA (e.g. for a gene of interest such as those related to sulfate reduction) or expressed RNA (sometimes in the form of cDNA). A major limitation of DNA microarrays is cross-hybridization, making it difficult to detect specific microbial species. The process lacks sensitivity and is also complex, requiring sophisticated laboratory equipment and trained technicians.

Amplification. The polymerase chain reaction (PCR) has been utilized to identify fuel microorganisms since 1985, soon after the technique was developed [Denaro, T. et al. "DNA Isolation of Microbial Contaminants in Aviation Turbine Fuel Via Traditional Polymerase Chain Reaction (PCR) and Direct PCR. AFRL-PR-WP-TR-2006-2049, Propulsion Directorate. Air Force Research Laboratory (2005)]. Denaro and co-workers isolated microorganisms from fuel. Container preparation included a non-phosphate detergent wash, multiple tap water and ASTM Type I de-ionized water rinses, 1:1 $HNO_3$ rinses, and oven drying. Two liters were collected from each sump and either mixed by shaking samples by hand or analyzed as separated fuel and water fractions. The samples were subjected to filtration and a series of drying steps. Each filter was then washed and the filtrate resuspended in water. When present, aqueous phase material was also analyzed, in this case by centrifugation, a series of washes, and final resuspension of the pellet in water.

The cells were then subjected to serial dilutions and heated to 99° C. for 10 minutes and used as substrate for amplification. Each dilution was subjected to amplification and agarose gel electrophoresis, and the dilution with the "most successful" post-amplification gel was selected for additional processing. The PCR "amplimers" were then cloned, and plasmid DNA from each clone was subsequently sequenced to identify the bacterial species. Denaro termed this work "direct PCR" because it was performed without cultivation. The PCR approach used [described in Rauch, M. E. et al. *J Ind Microbiol Biotechnol* (2006) 33:29-36] consisted of amplification using a single PCR primer pair in each reaction. Rauch describes 5 singleplexed primer pair reactions: 2 pairs targeting the bacteria 16S Ribosomal RNA gene; 1 pair targeting the fungal 18S Ribosomal RNA gene; 1 pair targeting the Archaeal 16S rRNA gene; and 1 pair targeting the archaea catabolic gene for toluene, xylene degradation. In some cases, degenerative primers were utilized. The Denaro study does not indicate which of the Rauch primer pairs were used or the results from mixed fuel or separated fuel and water.

White and colleagues expanded on this work [White, J. et al. *Applied and Environmental Microbiology* (2011), 77(13): 4527-4538]. They isolated DNA from the combined fuel phase, fuel-water interface phase, and aqueous phase of aviation, marine, or automotive petroleum fuel. They then used nested PCR to generate amplicons: the first amplification was performed with a PCR primer pair targeting the v6 region of the bacterial 16S ribosomal RNA gene, and the second amplification utilized a pooled set of 5 forward and 4 reverse primers. The pooled PCR products were then purified on agarose gels and subjected to DNA sequencing. A similar approach was utilized for Denaturing Gradient Gel Electrophoresis—in this case using a first pair of 16S ribosomal RNA primers followed by amplification with a second pair of ribosomal RNA primers. The nested PCR product was then separated on a denaturing gel, and individual bands were cut out of the gel, eluted, re-amplified, and subjected to sequencing.

qPCR has also been utilized to assess bioburden in fuel. For example, the bacterial dissimilatory sulfite reductase (dsr) gene was used to develop a qPCR assay for oil field samples [Agrawal, A. and Lal, B. *FEMS Microbiol Ecol* (2009), 69:301-312]. Production water samples from five oil fields were collected, centrifuged at 17500 g for 15 min, and the pellet was resuspended. DNA was extracted by mechanically beating the cells with glass followed by an enzymatic lysis with lysozyme for 30 minutes, and SDS/Proteinase K treatment for 30 minutes. Next, the material was diluted in phosphate buffer and subjected to a second bead-beating step (30 seconds). The mix was subjected to centrifugation and the supernatant was further purified by a single extraction with phenol/chloroform/isoamyl alcohol. A 1 g quantity of acid-washed polyvinylpolypyrrolidone was added to the DNA solution to remove copurified humic acids, followed by incubation on ice. Polyvinylpolypyrrolidone was removed by centrifugation and DNA was ethanol-precipitated overnight. Following washes and centrifugation, the DNA pellet was resuspended and further cleaned by passing over a column. A standard curve was prepared based on a plasmid containing the appropriate dsrB fragment from *Desulfomicrobium norvegicum*. The quantification range of this assay was six orders of magnitude. Agrawal points out that the 16S ribosomal RNA approaches described above are limited by the inability to amplify and sequence all bacterial species-they state that looking at a single functional gene would provide more informative data.

Martin-Sanchez and colleagues described a similar qPCR assay, in this case for the fungus *Hormoconis resinae* [Martin-Sanchez, P, M. et al. *Biofouling* (2014), 32(6):635-644]. Diesel samples without water content were analyzed by filtering and subjecting the filtrate to DNA extraction by bead-beating, purification using phenol-chloroform, and ethanol precipitation. The resulting DNA solutions were quantified and diluted to 1:5 and 1:10 or to 1:50 and 1:100.

Massively Parallel Sequencing. Samples containing microbials can be subjected to DNA purification, and large-scale sequencing of 16S rRNA gene can provide an indication of the bacteria and archaea present within the samples. Other genes (such as the fungal ITS gene) can be sequenced as well. Although DNA sequencing provides some information on the microbials present in a sample, the primers utilized may bias the resulting sequence and make data interpretation problematic. The approach is much more labor-intensive than qPCR and even more expensive. It is a niche technology best-suited for the exploration of new drilling sites as opposed to widespread monitoring.

Taken together, the molecular biological analyses have several major weaknesses. First, the techniques are complex, require many manual manipulations and significant time to result (weeks to months or longer). Second, the techniques are not amenable to identifying a broad spectrum of bacteria, fungi, and archaea in a single reaction. Third, qPCR is extremely limited in that the technique allows only one or two types of organism to be quantified in a given reaction. Fourth, the systems are not sensitive—qPCR inherently is limited—at best to 100's of each species of organisms per assay (and typically orders of magnitude more), and sequencing is limited in that the limited number of primers utilized biases results against wide ranges of microorganisms. Fifth, the extensive time to transport fuel materials to a lab (fixed or mobile) and the extensive processing of fuel to isolate bacteria and extract or purify DNA can alter the microbial populations being interrogated, rendering artefactual results. Accordingly, these techniques are not particularly useful in the fuel industry today—the crude non-DNA based techniques (e.g. ATP assays and growth in liquid media) are utilized much more frequently, and microbial fuel contamination continues unabated to this day.

There exists a need for rapid, easily-conducted DNA-based assays for microbial contamination of fuel and other hydrocarbons that can be deployed in the field by non-technical users and that can generate actionable results quickly, ideally in less than two hours. It is necessary that such assays are capable of testing across a broad spectrum of microbes and using a wide range of sample types. It is desirable that the targets of said assays are based on needs in the field, ranging from general assays, to fuel-type specific assays, to assays based on identification at the species level, and to assays based on the particular strain of the contaminating species. It is also desirable that such an assay is capable of determining if remediation and decontamination efforts were successful. It is still further desired that the assay is capable of determining the origin of the fuel tested based on the characterization of the microbial population. It is still further desirable if the assay could be employed to localize the source of a given contamination through identifying specific contaminants in the tested fuel. It is still further desirable that the assays could be employed to assist exploration.

BRIEF DESCRIPTION OF THE FIGURES

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 6A, FIG. 6B, and FIG. 6C show detection of 100 copies of *B. cereus* (NRRL B569, ATCC 10876) in gasoline in low water content (FIG. 6A, from Example 3), high water content (FIG. 6B, from Example 4), and mixed fuel/direct oil sample collection (FIG. 6C, from Example 5).

FIG. 7A, FIG. 7B, and FIG. 7C show detection of 100 copies of *B. cereus* (NRRL B569, ATCC 10876) in JetA/JP1 aviation fuel in low water content (FIG. 7A, from Example 3), high water content (FIG. 7B, from Example 4), and direct oil without artificial water bottom (FIG. 7C, from Example 5).

FIG. 8A, FIG. 8B, and FIG. 8C show detection of 100 copies of *B. cereus* (NRRL B569, ATCC 10876) in heavy duty motor oil SAE30 (FIG. 8A), kerosene (FIG. 8B), and 100 LL aviation fuel (FIG. 8C).

FIG. 9A, FIG. 9B, and FIG. 9C show detection of 10 copies of *B. cereus* (NRRL B569, ATCC 10876) in diesel (FIG. 9A), gasoline (FIG. 9B), and control 1×PBS (FIG. 9C) with 4 of the 6 expected MLST peaks observed.

FIG. 10A, FIG. 10B, and FIG. 10C show detection of 1000 copies of *B. cereus* (NRRL B569, ATCC 10876) in gasoline with low water content (FIG. 10A, from Example 3), high water content (FIG. 10B, from Example 4), and direct oil processing without artificial water bottom (FIG. 10C, from Example 5) analyzed in ANDE 6C instrument and using an I-Chip.

fuel samples.

FIG. 39A with DNaseI treatment and FIG. 39B without DNaseI treatment.

FIG. 40A with DNaseI treatment and FIG. 40B without DNaseI treatment.

FIG. 44A shows results when processed with just the standard rapid chemical lysis. FIG. 44B shows results when processed with microbeads coupled with the standard guanidinium-based extraction.

FIG. 48 shows representative sequences of primers designed for the General Fuel 6-plex Assay, Expanded Fuel 16-plex Assay, and Specific Detection of Select *Pseudomonas* Species (*P. aeruginosa* and *P. putida*).

DETAILED DESCRIPTION OF INVENTION

Figure 1:
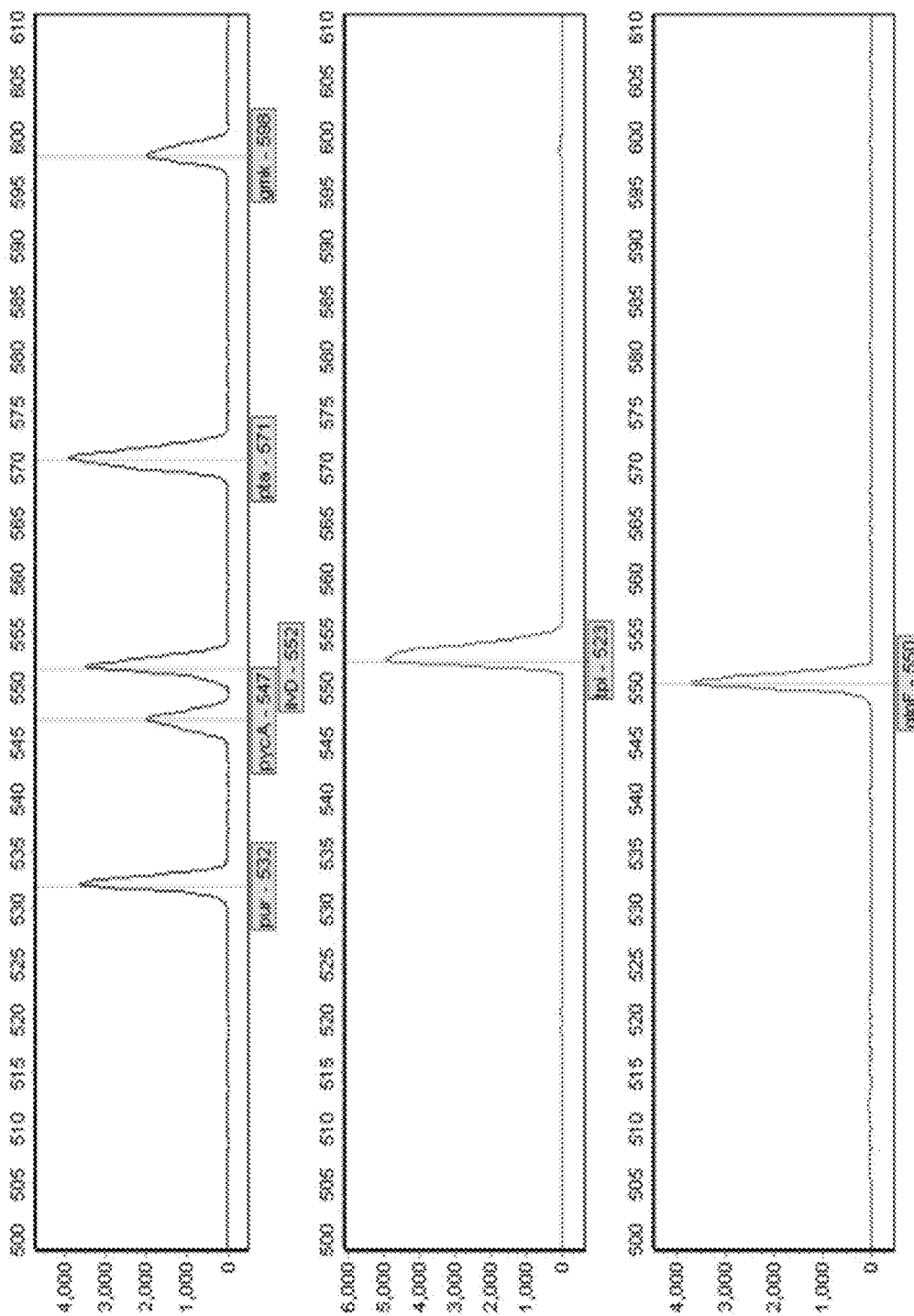
FIG. 1 shows the electropherogram resulting from 100 copies (purified DNA from *B. cereus* type strain ATCC 14579) input to PCR and simultaneous amplification of the 7 loci in a 7 μl reaction using microfluidic chip and rapid thermal cycler.
Figure 2:
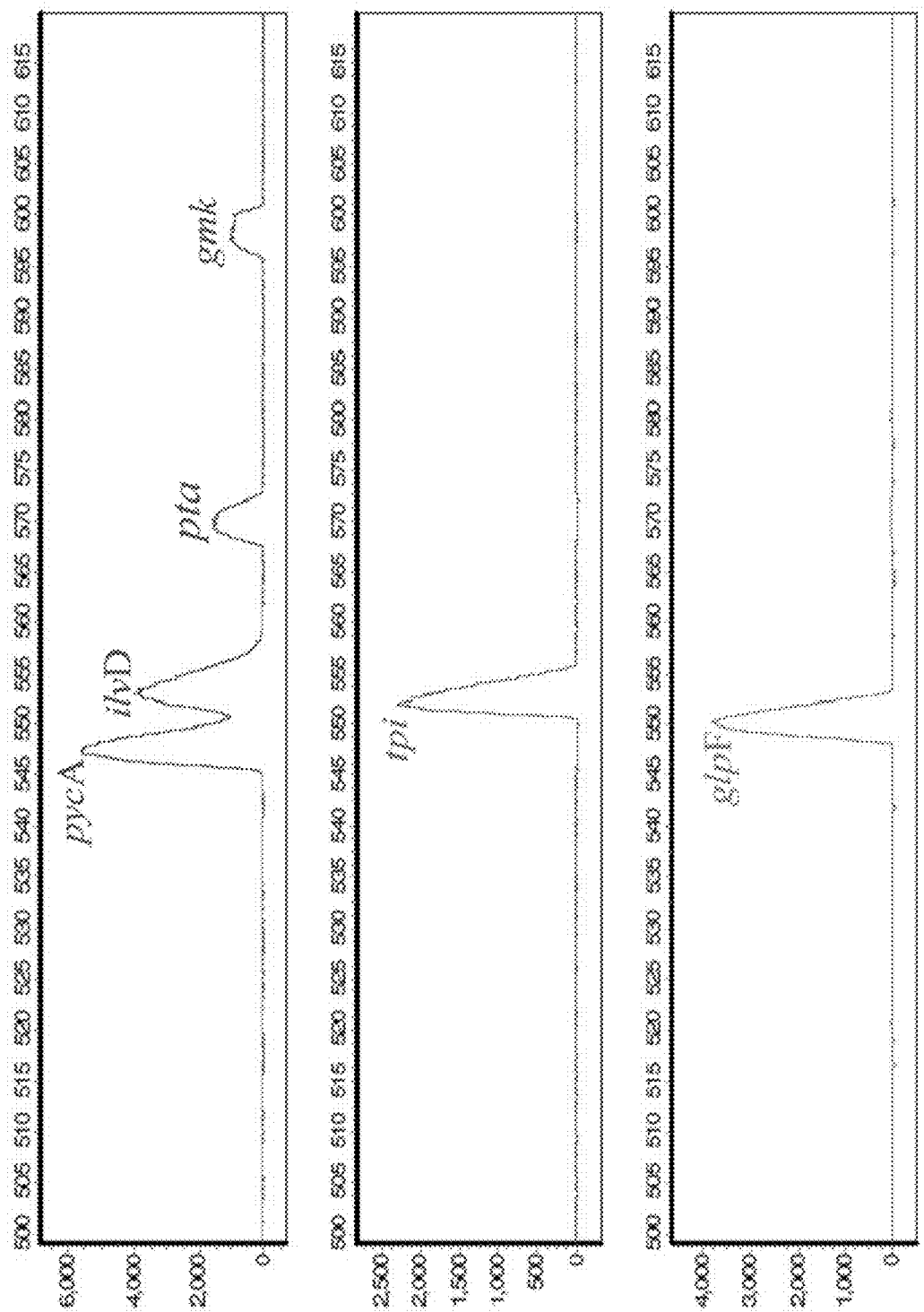
FIG. 2 is a representative electropherogram resulting from the microfluidic amplification and S&D of bacterial suspension (*B. cereus* NRRL B569, ATCC 10876) following a silica-based rapid DNA purification.

Characterizing the microbial population is important in a wide range of applications, in a wide range of fuel types, and throughout the various stages of the fuel industry, from discovery to extraction, from refining to transport to end use, and including remediation and recovery of stolen materials. One aspect of the invention is to present multiplexed assays, including multiplexed Rapid DNA assays, to detect microbial contamination. Uncontrolled microbial contamination impacts all stages of the petroleum industry, from extraction and recovery to refining to storage through fleet operations and consumer use. Contamination can lead to the formation of sludge, which restricts the flow of fuel and the operation of mechanical parts (e.g. valves) and filters, and ultimately, in loss of product quality. Contamination is not limited to the fuel production—it is a significant issue for the end-user as well. For example, blocking of fuel lines and injectors can lead to failure of engine and system components, especially critical in jet fuel. In general, microbial contamination of fuel falls into two general classes: the first is fuel degradation or biodeterioration, which impacts fuel performance; the second is infrastructure damage, whether due to corrosion or to fouling. As summarized by Passman, "fouling includes the development of biofilms on system surfaces, consequent flow-restriction through small diameter piping, and premature filter plugging." [Passman, F. J. *International Biodeterioration & Biodegradation* (2013), 81:88-104.] The assays of the invention can be applied to diagnose or characterize microbial contamination in fuel, whether or not separated into an aqueous phase, on aqueous/fuel interfaces, on unseparated fuel, on fouled regions including biofilms, and in corroded regions of storage or transport systems.

An enormous advantage to identifying contaminants in fuel using the teachings of the instant invention is the ability to use that information to identify the source of that contamination (e.g. a given component in a pipeline, a storage tank, or a delivery truck). The economic cost of contaminated fuel is enormous, and the teachings of the invention allow the source to be detected accurately, precisely, and quickly. By simultaneously interrogating a sample for a large number of microbial species and strains, the source of contamination can be identified and the contaminants can be eradicated.

In addition to identifying contamination, the teachings of the invention may be applied to identifying a given container of fuel. Fuels contain characteristic microbial populations, based in part on their origin and handling. Fuel theft is an enormous problem, with the annual losses due to theft estimated at over $100 billion annually. Theft and adulteration occur at all stages, from production, to transport, to refining, and to distribution. Even when stolen fuel is recovered, it is often difficult to determine its source and rightful owner. By monitoring the microbial fingerprint of a given fuel output, the teachings of the invention enable the forensic identification and protection of fuel. The presence of certain microbial species and strains as well as their quantitation are specifically contemplated herein.

The teachings of the invention may be applied to the identification of viable fuel deposits. Oil and gas exploration is extremely costly and time-consuming, and methods to increase the likelihood of identifying a site for a successful well are taught herein. The teachings are based on multiplexed assays for "indicator species," microbial species and strains that are found colocalized with fuel deposits. The genesis of indicator species is that light hydrocarbons from oil and gas deposits seep to the surface (whether land- or ocean-based), and characteristic microbials utilize these nutrients. Microbial species oxidize hydrocarbons including methane, ethane, propane, and butane [Rasheed, M. et al. *J Petrol Sci Eng* (2012), 84-85:33-41]. Indicator species include *Brevibacterium, Corynebacterium, Flavobacterium, Mycobacterium, Nocardia, Pseudomonas,* and *Rhodococcus*.

Furthermore, the teachings of the invention can be applied to assessment of the efficacy of remediation to remove contaminants. The assays presented herein can indicate the success of biocide application by demonstrating that the contaminating microbes of interest are no longer viable following treatment. For example, for certain microorganisms, following biocide treatment, the assays of the invention show reduction or absence of genomic DNA and RNA. Similarly, as most messenger RNAs have much briefer half-lives than DNA and must be produced by living cells, the rapid multiplexed RT (reverse transcription)-PCR assays of the invention allow amplification of reverse-transcribed samples. The presence of a given pattern of mRNA species in pre-treatment is then compared to that post-treatment, with their reduction or absence an indicator or successful eradication. The same approach is applicable in bioremediation.

There are an enormous number of microorganisms that can be present in fuel, and some species may be more deleterious than others. Similarly, the set of species indicative of the presence of oil deposits in a given region or the set of species that characterize fuel from a given source will all vary. In short, the number and types of microorganisms of interest in a given application will be defined by that application. Similarly, in some cases, it is insufficient to merely identify microbial species-strain typing can be critical in assessing fuel samples. In fingerprinting a sample of fuel or assessing the effectiveness of remediation, or searching for sources of contamination, for example, strain-typing may provide useful information.

Broadly speaking, the microorganisms that can be detected in this invention include species and strains of fungi (e.g. *Aspergillus, Hormoconis resinae*); yeast (e.g. *Candida, Aureobasidium*); Aerobic bacteria (e.g. *Pseudomonas, Flavobacterium*); Anaerobic bacteria (e.g. *Desulfovibrio, Desulfobacula*); and Archaea (e.g. *Thermococcus*, Methanogens). The large number of species is of course dwarfed by the number of extant strain types, and the teachings of the instant invention allow interrogation of more than 1, more than 2, more than 3, more than 4, more than 5, more than 6, more than 7, more than 8, more than 9, more than 10, more than 12, more than 15, more than 20, more than 30, more than 40, more than 50, more than 60, more than 75, more than 100, more than 150, more than 200, more than 250, more than 500, more than 1000, more than 2500, or more than 5000 species and strains in a multiplexed PCR reaction, typically followed by electrophoretic separation and detection of the separated fragments. The number of loci interrogated from a given species or strain type may be more than 1, more than 2, more than 3, more than 4, more than 5, more than 6, more than 7, more than 8, more than 9, more than 10, more than 20, more than 30, more than 40, more than 50, more than 100, more than 150, more than 200, more than 250, more than 500, more than 1000, more than 2500, or more than 5000 sets of primer pairs.

Assays of the invention may be utilized for initial screening purposes in which a small or large set of species/strains is interrogated and followed by a more specific assay of the invention based on the screening results. Alternatively, small or large numbers of microorganisms may be interrogated in specific screens, again using a multiplex with a varying number of sites interrogated. The instant invention provides a wide range of assays as will be seen from the Examples below. The invention includes assays based on the presence of DNA and RNA sequences, the size of such sequences, the presence of one or more SNPs in DNA and RNA sequences, and the sizes of such sequences. The methods provided by the invention are capable of multiplex amplification in applications in addition to those utilizing the chips and thermal cyclers described herein. For example, the use of thin walled tubes in conventional thermal cyclers (for example block based thermal cyclers and the Roche Light-Cycler™) and the use of amplification methods other than temperature cycled PCR (for example isothermal PCR or rolling circle amplification) are specifically contemplated. Similarly, the assay can be performed using amplification methods including but not limited to conventional PCR, real-time PCR, strand displacement amplification, multiple displacement amplification, RT (Reverse transcription)-PCR, quantitative PCR, nested PCR, and isothermal PCR (e.g. loop-mediated isothermal amplification; strand displacement amplification; helicase-dependent amplification; and nicking enzyme amplification). Oligonucleotide primers of the invention include but are not limited to unlabeled, single-labelled, and multi-labelled primers, DNA-based primers, RNA-based primers, fluorescent PCR primers and probes including TaqMan probes, molecular beacons, dual hybridization probes, Eclipse probes, Amplifluor (SNP) probes, Scorpion PCR primers, LUX PCR primers, and QZyme PCR primers, modified base primers (e.g. using 2-aminopurine, 2,6-diaminopurine, 5-bromo dU, deoxy and dideoxy modifications, locked nucleic acids, and custom modifications), and primer extension primers. These methods, materials, and their variants can be applied to detect and characterize any type of nucleic acid, whether DNA- or RNA-based. The assays are performed in a testing chamber, including a fully-integrated biochip or a biochip component, or a laboratory test tube, well-plate or similar item.

Assays of the invention may be applied to a wide range of sample types and hydrocarbon reservoirs, including but not limited to: oil in pipelines, wellheads, pipeline tanks, storage tanks (above-and underground), and tankers; returns from boreholes (including sealed samples of oil saturated cuttings [ground up rock] taken form drilling wells); fuels in underground deposits (including oil, tar, coal, and natural gas); hydraulic fracturing liquids (including various points along the collection path); biofilms on system surfaces; large- and small-diameter piping; filters and tank gauges and other devices connected to hydrocarbon systems; fuel distribution systems (including refineries, ships, tank trucks, bulk tank farms); engine tanks (and other equipment at user sites); sediments associated with natural gas; soil, sand, and ocean sediment and mud near potential drilling sites and remediation sites; soil near fuel leaks; fresh water, ocean water, lens and other underground water; coal in situ; coal water; coal stockpiles; soil, rocks, and water containing or saturated with hydrocarbons; and corroded metals (including "coins").

These sample types of the invention may be collected during a wide range of times, including: pre-biocide, during biocide, and post-biocide treatment; remediations in general; products and byproducts of manufacture; prior to, during, and following microbial enhanced oil recovery; prior to refining, during refining, and following refining; prior to, during, and following exploration and drilling; prior to, during, and following exploration and hydraulic fracturing; prior to, during, and following exploration and coal mining; prior to, during, and following storage; and prior to, during, and following utilization. Similarly, multiple samples, separated spatially and temporally, may be assayed to enable contamination to be tracked to a source.

The assays of the invention may be employed in the field, outside of conventional laboratories. For field-forward applications, it is preferable that the assays are performed using a Rapid DNA identification system, including an instrument, consumable, and analysis software. To allow DNA analysis to be performed by a nontechnical operator outside of the laboratory (thereby reducing time to obtain and take action on the result), the system should not require the operator to perform manual processing steps such as reagent loading, assembly, or maintenance. Furthermore, the system should have minimal space and environmental requirements; processes should be performed in a single Rapid DNA instrument, avoiding the need for centrifuges, thermal cyclers, and electrophoresis instruments. Similarly, the system should not require a controlled laboratory environment or separated pre- and post-PCR environments as in routine in conventional laboratories. It is preferable that the Rapid DNA system is ruggedized; the instrument and biochip consumable must withstand transport and field-forward operation without the need for recalibration. Preferably, the system will operate with a unitary biochip consumable; as described in co-owned U.S. Pat. Nos. 9,354,199; 9,314,795, and 8,720,026 (which are hereby incorporated by reference in its entirety) to minimize operator time, training, and potential for error, a single chip containing all necessary materials and reagents should be utilized. The chip should be closed and readily disposable to minimize sample contamination and user exposure. Finally, the system should have data and sample security: as the results of the assays of the invention can have a profound economic value, it is critical that data security is maintained. The ANDE Rapid DNA system is characterized by all these features as described in co-owned U.S. Pat. Nos. 10,191,011; 9,606,083; 9,523,656; 8,206,974; 8,173,417; and 9,889,449 (each of which is incorporated by reference in its entirety); and [Tan, E. et al. Investig Genet (2013), 4:16].

Another major benefit of the instant invention is the analytical software that enables DNA or RNA data to be interpreted essentially immediately in the field, with straightforward and actionable results presented to the nontechnical user (while retaining a detailed report of all results for later review and compilation into databases by a technical user, if desired). The amplicons of the invention are separated by fragment size and the fluorescently-labelled tags (or dyes) present on primers. Fragment size separation is accomplished by electrophoresis, preferably microfluidic electrophoresis as exemplified by the ANDE A-Chip and I-Chip. In the ANDE system, fluorescently labelled tags are separated optically using a wavelength separation module and detector modules consisting of (1) dichroic mirrors with discrete photomultiplier tubes or (2) a spectrograph with a linear array photomultiplier, as described in co-owned U.S. Pat. Nos. 9,366,631; 8,018,593; and 9,889,449 (which are hereby incorporated by reference in their entireties).

The raw data generated during separation and detection is first subjected to automated signal processing. Processing consists of a series of functions including raw data capture, peak identification, and placement of fragments into separate dye colors. The baseline subtraction algorithm applies a sliding window across the raw electropherogram and at each point determines the minimum signal strength within the window. Applying this algorithm to the raw data results in the generation of the signal baseline. This baseline is subtracted from the raw data to generate a baseline-subtracted electropherogram. Spectral separation is performed by: (1) applying a peak-finding algorithm to identify peaks on the baseline-subtracted electropherogram; (2) determining the ratio of the signal strengths of the detectors for each peak; (3) grouping the peaks by their detector (color) ratios into a color ratio matrix; and (4) applying a color correction matrix (the inverse of the color ratio matrix) to the baseline-subtracted electropherogram to generate a spectrally separated electropherogram. The resulting electropherogram displays the signals from the detectors of the instrument.

The assays of the invention may be employed in conventional laboratories. In these settings, the fuel sample of interest may be subjected to processes to isolate microorganisms and to purify nucleic acids from the microorganisms. Whether or not they are isolated or purified, the nucleic acids in the sample are amplified using one of the techniques noted above, and the resulting amplicons are detected. This may occur, for example, using an electrophoresis system such as a capillary or microfluidic electrophoresis system. Laboratories typically require sophisticated equipment and highly-skilled operators, and may be distant from the source of the fuel samples, requiring transportation (which can alter the microbial composition of the samples). Laboratories may be built near to the source of samples, although typically mobile labs have fewer capabilities than fixed labs and may be difficult to service. Regardless of location, equipment, personnel, and time requirements (including sample transport time and conditions) may be practical limitations to quickly obtaining actionable results.

Accordingly, Rapid DNA Identification approaches offer the ability to overcome these limitations. Rapid DNA identification is the fully automated generation and interpretation of nucleic acid features of a sample, in less than two hours, less than 110 minutes, less than 105 minutes, less than 100 minutes, less than 95 minutes, less than 90 minutes, less than 60 minutes, less than 45 minutes, less than 30 minutes, or less than 15 minutes. The impact of rapid DNA technology is evidenced by the fact that the Department of Defense, the Federal Bureau of Investigation (FBI), and the Department of Homeland Security have collaborated to develop a series of requirements for human rapid DNA Identification systems [Ben Riley (2012) U.S. Department of Defense Biometric and Forensic Technology Forum. Center for Strategic and International Studies. https://www.csis.org/events/us-department-defense-biometric-and-forensic-technology-forum]. Furthermore, the FBI's establishment of the Rapid DNA Index System (RDIS) [Callaghan, T. Rapid DNA instrument update & enhancement plans for CODIS. (2013); http://docplayer.net/4802515-Rapid-dna-instrument-update-enhancement-plans-for-codis.html], and the unanimous passage by the U.S. House of Representatives and Senate of the U.S. Federal Rapid DNA Act of 2017 [https://www.govtrack.us/congress/bills/115/hr510/text] demonstrate that human DNA ID generation outside the laboratory will become routine-advanced and actionable DNA results will be generated and utilized by nontechnical users in police stations throughout the US.

The ANDE® 6C Rapid DNA system [Carney, C. et al. *Forensic Sci Int Genet* (2019), 40: 120-130; Grover, R. et al. Int J Legal Med (2017), 131(6):1489-1501] is a fully integrated, ruggedized system capable of field-forward operation by a nontechnical operator following minimal training. For human identification, the system employs a multiplexed PCR reaction to interrogate 27 human loci and is termed the FlexPlex assay [Grover, Ibid.]. Similar to its predecessor, the ANDE 4C Rapid DNA system, [Tan, Ibid; Turingan R. S. et. al *Investigative Genetics* (2016) 7:2; Della Manna, A. et al. *Forensic Science International: Genetics* (2016), 25:145-156; Selden, R. and Davis J. *FBI National Academy Associates Magazine* (2018], it employs a reagent-containing, single disposable microfluidic chip, a fully integrated instrument, and automated data processing and Expert System software to generate DNA IDs. Following insertion of samples into a consumable microfluidic chip and of the chip into the instrument, the ANDE system performs all required processes for DNA ID generation for each sample including DNA extraction and purification, PCR amplification, electrophoretic separation, fluorescence detection, and data analysis by the on-board expert system.

In May 2018, the ANDE 6C Rapid DNA system became the first rapid DNA system to receive the FBI's National DNA Index System approval under the CODIS 20 standard [FBI Rapid DNA General Information, https://www.fbi.gov/services/laboratory/biometric-analysis/codis/rapid-dna].

The ANDE system incorporates privileges for a tiered group of users, including: Operator (typically a non-technical user that does not have access to DNA ID yet may be informed of process results and suggested next steps); Admin (typically an individual that is given access to DNA ID data); and SuperAdmin (typically a more senior individual that is given privileges to adjust user-configurable settings to reflect corporate policies). Other tiers may be added (or removed) based on application and operational requirements.

Although the ANDE Rapid DNA Identification system is particularly well-suited to the teachings of the invention, other rapid DNA systems (including those with manual steps) or so-called "modified" rapid dna systems (typically requiring manual data analysis) may also be utilized.

The system described herein is capable of analyzing essentially any biological or environmental sample, for example, ranging from those typically with high DNA content to samples typically with low DNA content. To be clear, any sample type may have high or low content of DNA—the quantity of the sample collected and the conditions under which the samples were stored directly impact the quantity of DNA of the sample. Similarly, the system described herein is capable of analyzing essentially any biological or environmental sample, for example, ranging from those typically with high RNA (mRNA, rRNA, and/or tRNA) or total nucleic acid content to samples typically with low RNA or total nucleic acid content.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Example 1

Multi-Locus Sequence Typing (MLST) targets were used for amplification and detection of *B. cereus*. The *Bacillus cereus* sensu lato group is a polyphyletic species of aerobic, gram-positive bacteria commonly found in soil and includes *B. cereus, B. anthracis, B. thuringiensis, B. mycoides* and B. weihenstephanensis [Read, T. et al. PLoS ONE (2010), 5(5):e10595. doi:10.1371/journal.pone.0010595]. The *Bacillus* MLST scheme uses internal fragments of the seven house-keeping genes namely: glpF (glycerol uptake facilitator protein), gmk (guanylate kinase, putative), ilvD (dihydroxy-acid dehydratase), pta (phosphate acetyltransferase), pur (phosphoribosylaminoimidazolecarboxamide), pycA (pyruvate carboxylase), and tpi (triosephosphate isomerase). Sequences of the primer pairs are publicly available from the *Bacillus* MLST website (https://pubmlst.org/bcereus/info/primers.shtml). Primers were then labeled with fluorescent dyes (FAM-blue, JOE-green, ROX-red) to distinguish amplicons by color in addition to size polymorphisms. FIG. 1 shows the electropherogram resulting from 100 copies (purified DNA from *B. cereus* type strain ATCC 14579) input to PCR and simultaneous amplification of the 7 loci in a 7 μl reaction using microfluidic chip and rapid thermal cycler. The multiplexed amplification was completed in approximately 20 minutes.

Example 2

This example demonstrates Rapid DNA purification methods that are effective for processing microbial contaminants that affect the quality of oil products. Such microorganisms belong to various domains of life, including prokaryotes (bacteria—both aerobic and anaerobic, and archaea) and eukaryotes (fungi and yeast). The *Bacillus* genus is one of many bacteria present in contaminated oil samples. With the multiplex assay developed using MLST targets presented in Example 1, *B. cereus* was selected as representative organism for Rapid DNA purification. In addition, fuel aliquots extracted from low points in fuel reservoirs and storage tanks could be primarily water or mineralized salt solutions. A bacterial suspension was prepared in aqueous solution of 1×PBS to mimic such scenarios.

A 100 μl bacterial suspension containing 100 cells was placed on a swab for purification using guanidinium-based lysis in a tube-based column format. Purification did not require any heat incubation. Guanidinium-based lysis solution and proteinase K were simply added to the swab and vortexed for 10 seconds. Ethanol was then added to the lysate and the mixture was transferred to a silica column. The DNA bound to the silica membrane was then washed with an alcohol-based solution and then finally eluted in Tris-EDTA buffer in 300 μl [Read, Ibid]. The purified DNA was concentrated to approximately 25-30 μl using a 100K ultrafiltration device and then used directly for rapid DNA amplification. Amplified products were cleaned-up using a 30K ultrafiltration device prior to microfluidic separation and detection. FIG. 2 is representative electropherogram resulting from the microfluidic amplification. Six of the 7 MLST loci were observed; the pur gene was not detected using *B. cereus* NRRL B569 (ATCC 10876) due to mutations in the primer binding region in this strain. Other *B. cereus* strains generate all seven targets.

Example 3

This example demonstrates detection of prokaryotic (bacteria and archaea) and eukaryotic (fungi and yeast) microorganisms in oil samples having low water content. A 100 μl of microbial suspension in 1×PBS containing 100 microbial cells (in this case, *B. cereus* NRRL B569, ATCC 10876) was added to 900 μl each of the different oil types (1 diesel, 3 grades/types of gasoline, 1 kerosene, 12 grades/types of motor oil, and 2 types of aviation fuels).

| # | Brand | Vehicle type | SAE viscosity gradient |
|---|---|---|---|
| 1 | STP | General Use | 20W-50 |
| 2 | STP | General Use | 30_Heavy Duty |
| 3 | STP | Gasoline engines | 5W-20 |
| 4 | STP | Gasoline engines | 5W-30 |
| 5 | STP | Gasoline engines | 10W-30 |
| 6 | STP | High Mileage (>75000) | 10W-40 |
| 7 | STP | General Use (Full Synthetic) | 5W-40 |
| 8 | STP | Gasoline engines (Full Synthetic) | 0W-20 |
| 9 | Pennzoil | High Mileage (>75000); Full Synthetic | 5W-20 |
| 10 | Valvoline | Race cars (high zinc) | 20W-50 |
| 11 | Castrol | Motorcycle | 10W-40 |
| 12 | Mobil | Motorcycle (Full Synthetic) | 20W-50 |

3 Types of Gasoline:
  Grade 87
  Grade 89
  Grade 91 or 93
2 Types of Aviation Fuel:
  Jet-A (refined kerosene)
  100 LL (100 Low Lead)

Figure 3:
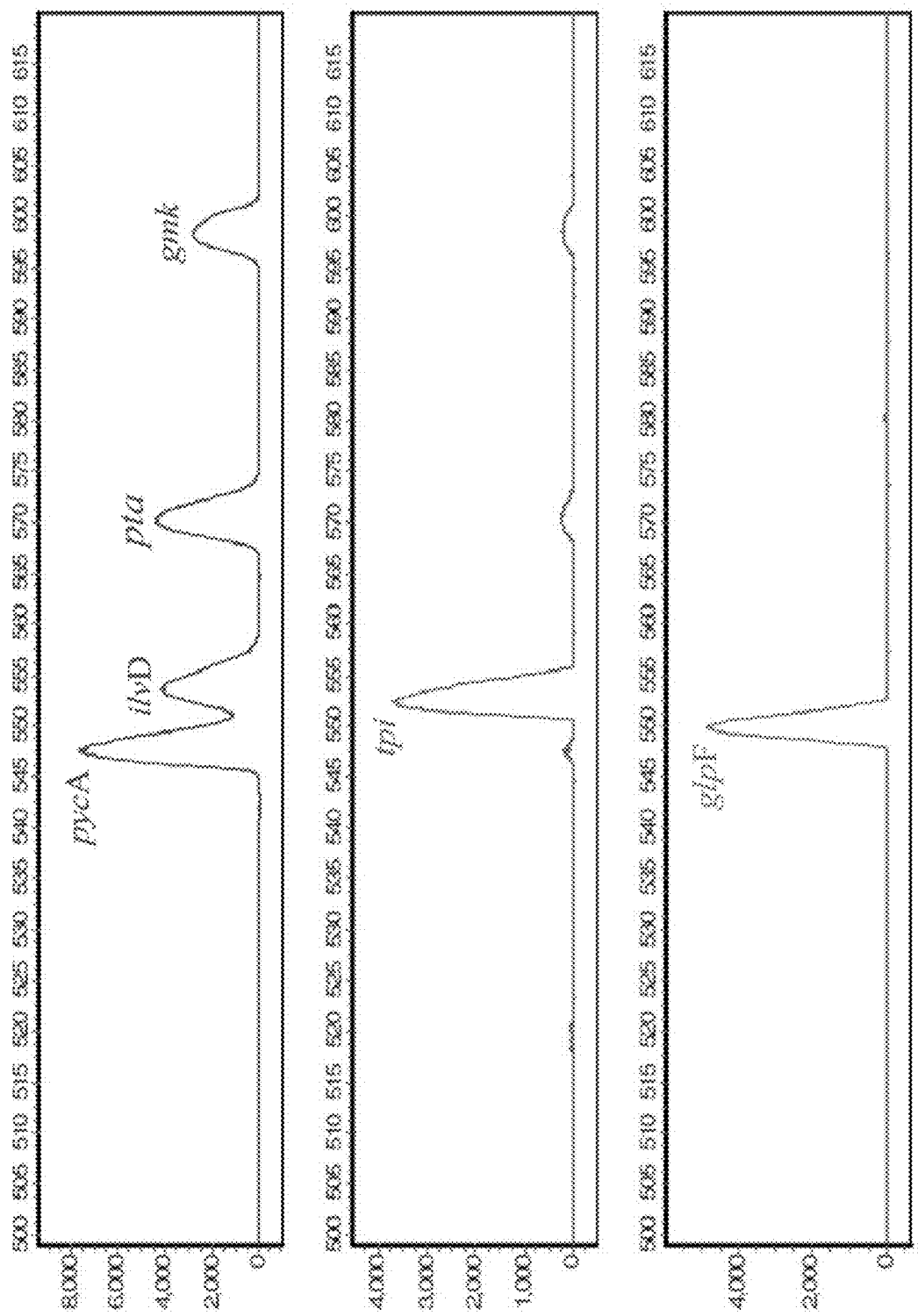
FIG. 3 is a representative electropherogram from the aqueous phase collection of *B. cereus* (NRRL B569, ATCC 10876) spiked in diesel having low water content.
Figure 4:
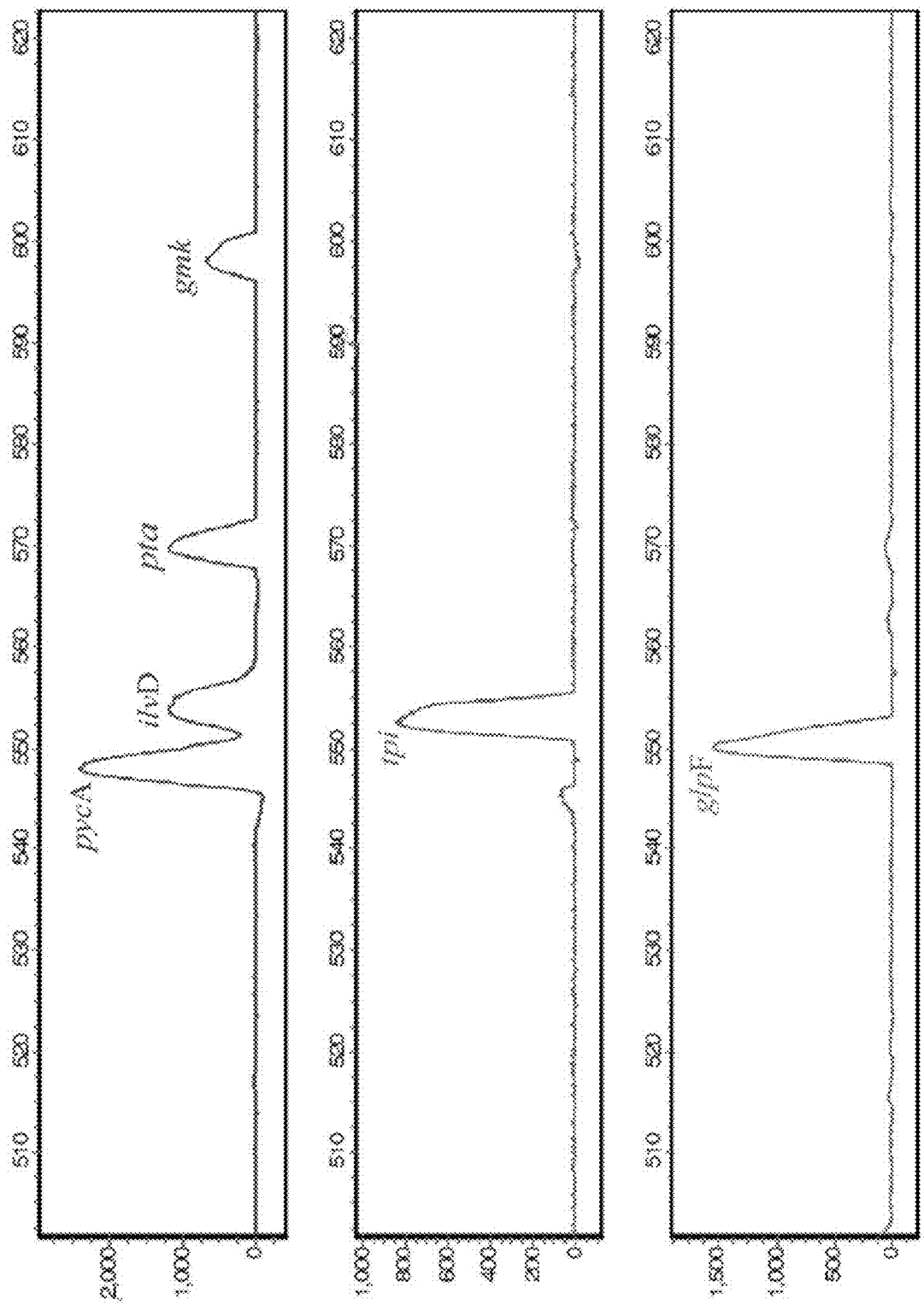
FIG. 4 is a representative electropherogram from the aqueous phase collection of *B. cereus* (NRRL B569, ATCC 10876) spiked in diesel having high water content.
Figure 5:
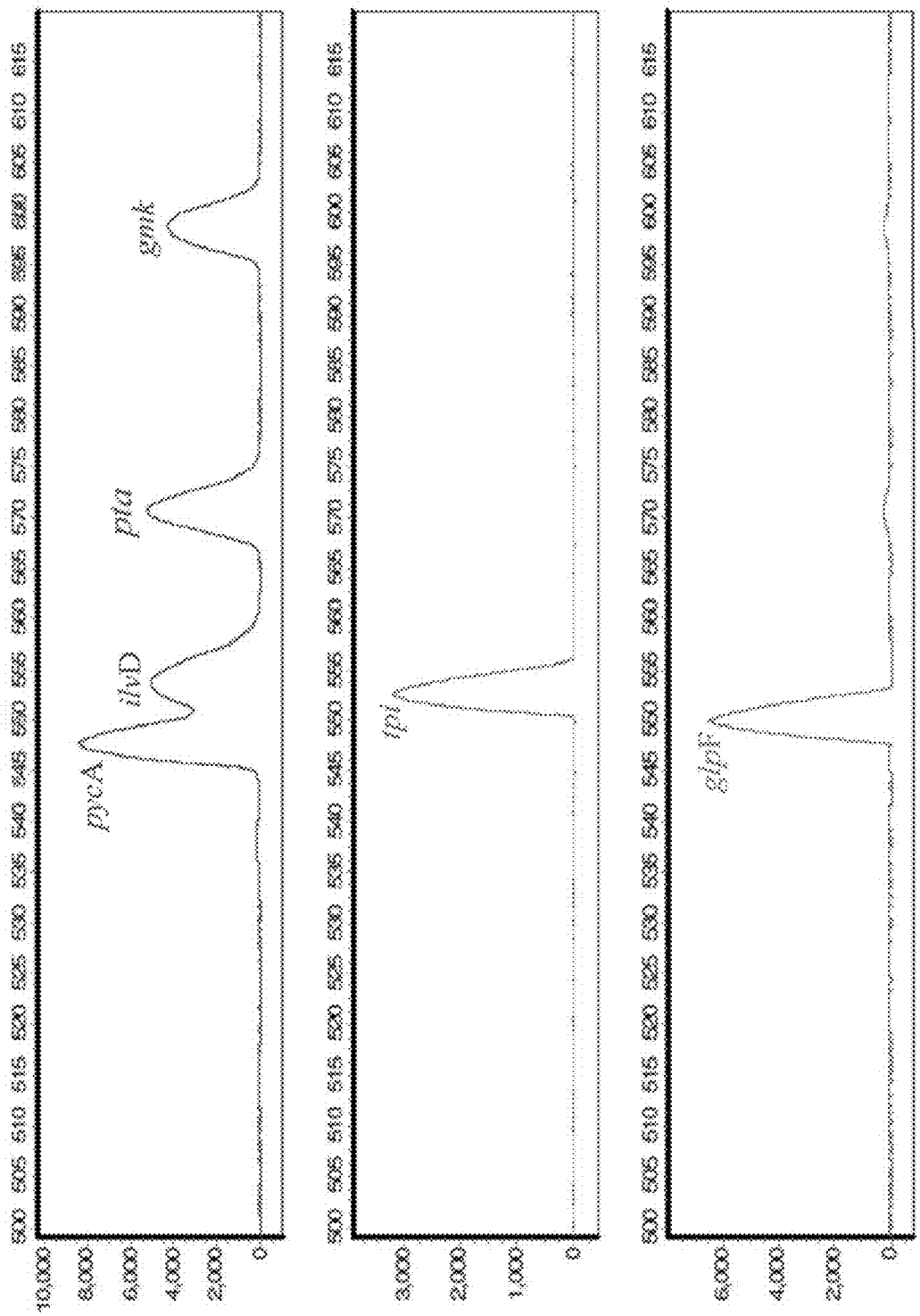
FIG. 5 is a representative electropherogram from the mixed fuel/direct oil collection of *B. cereus* (NRRL B569, ATCC 10876) spiked in diesel.
Figure 6A:
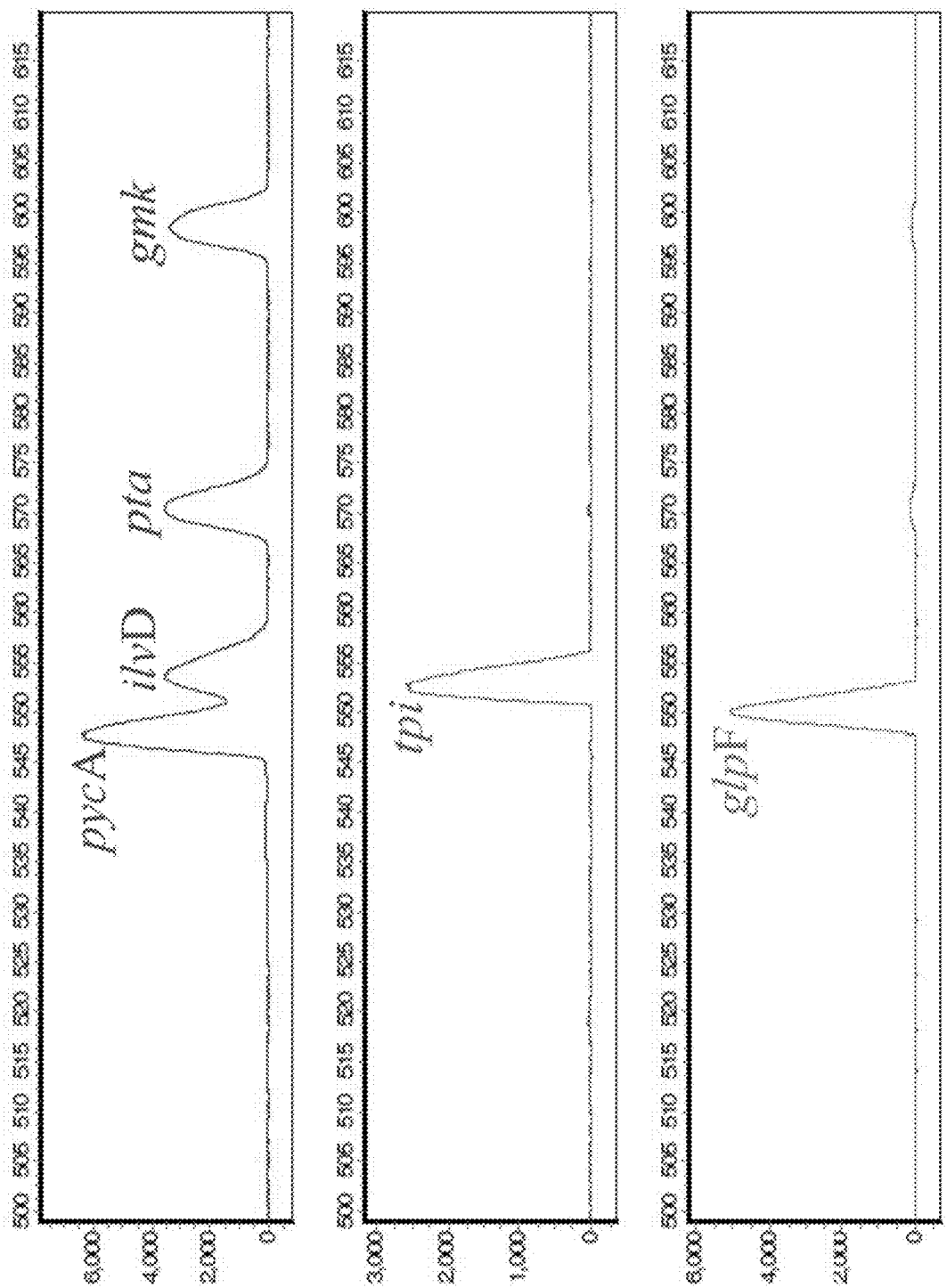
Figure 6B:
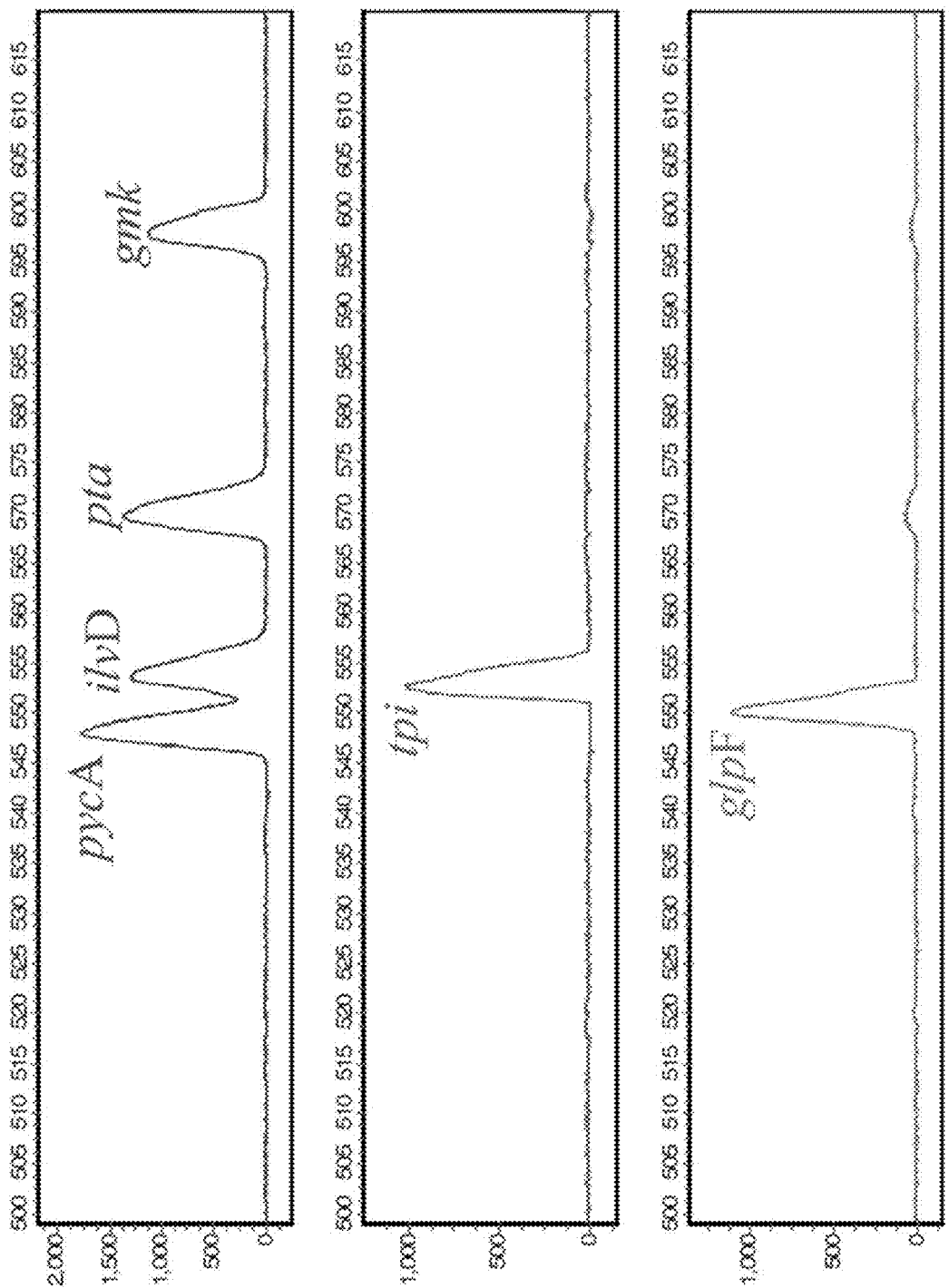
Figure 6C:
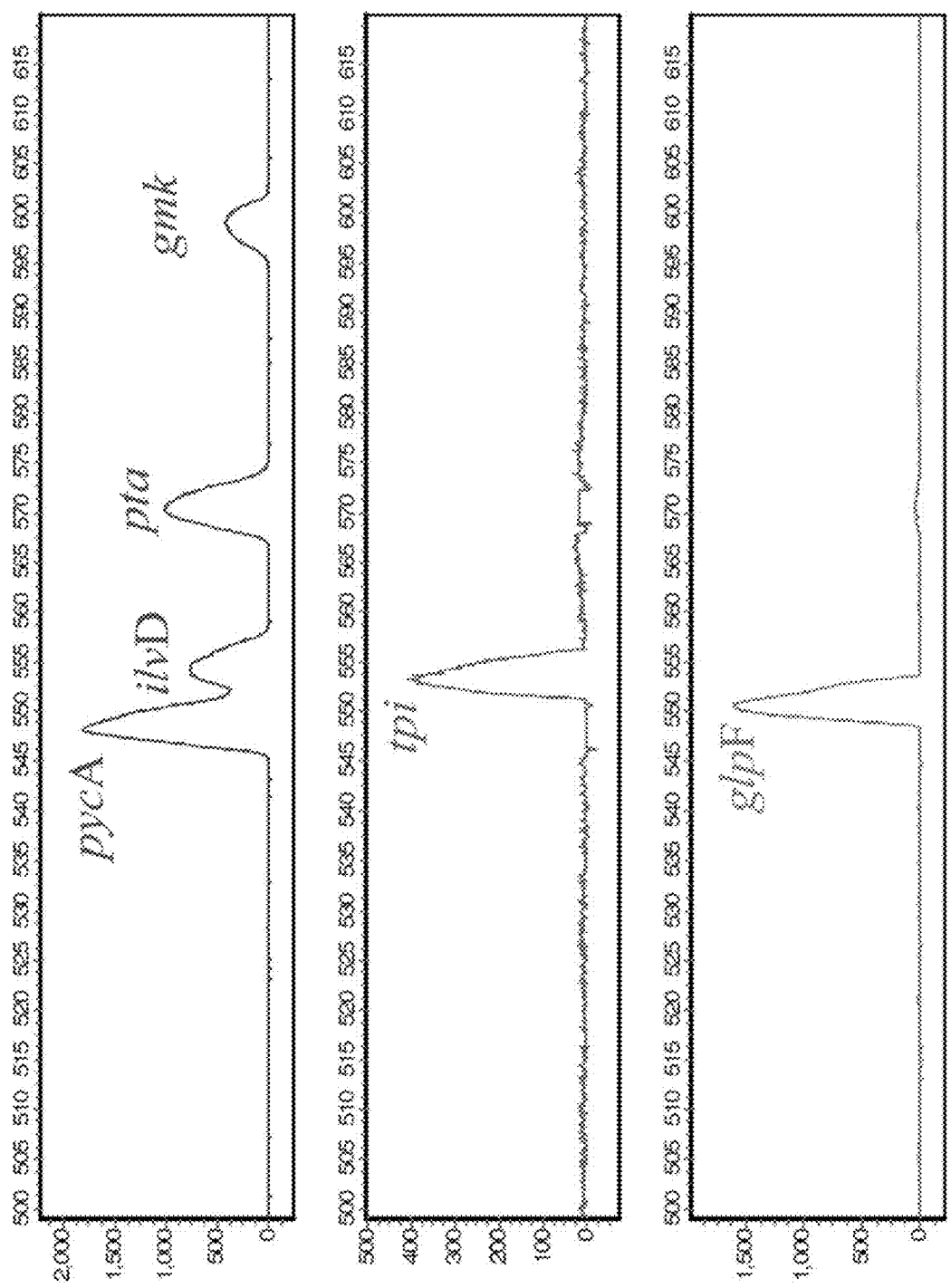
Figure 7A:
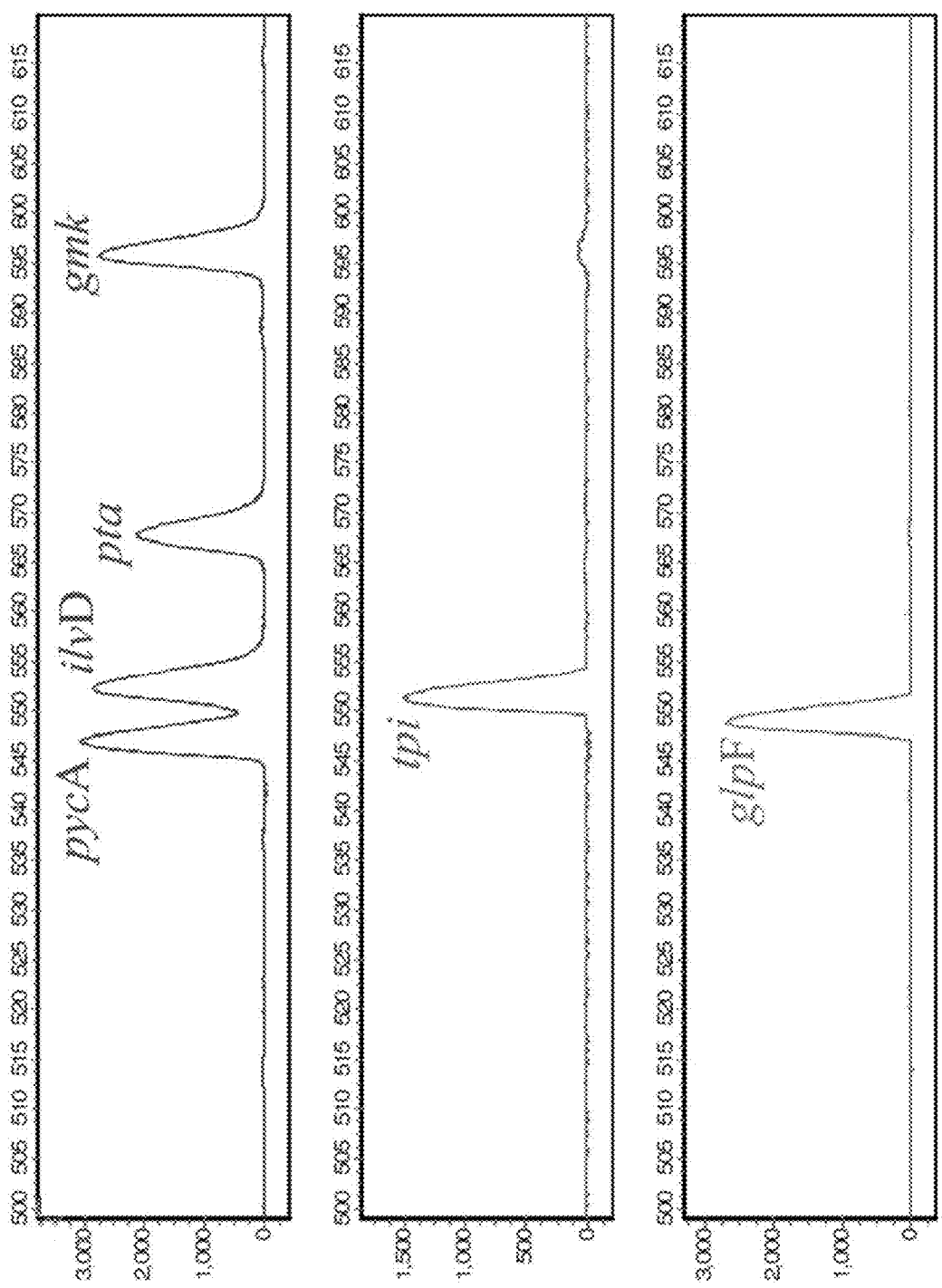
Figure 7B:
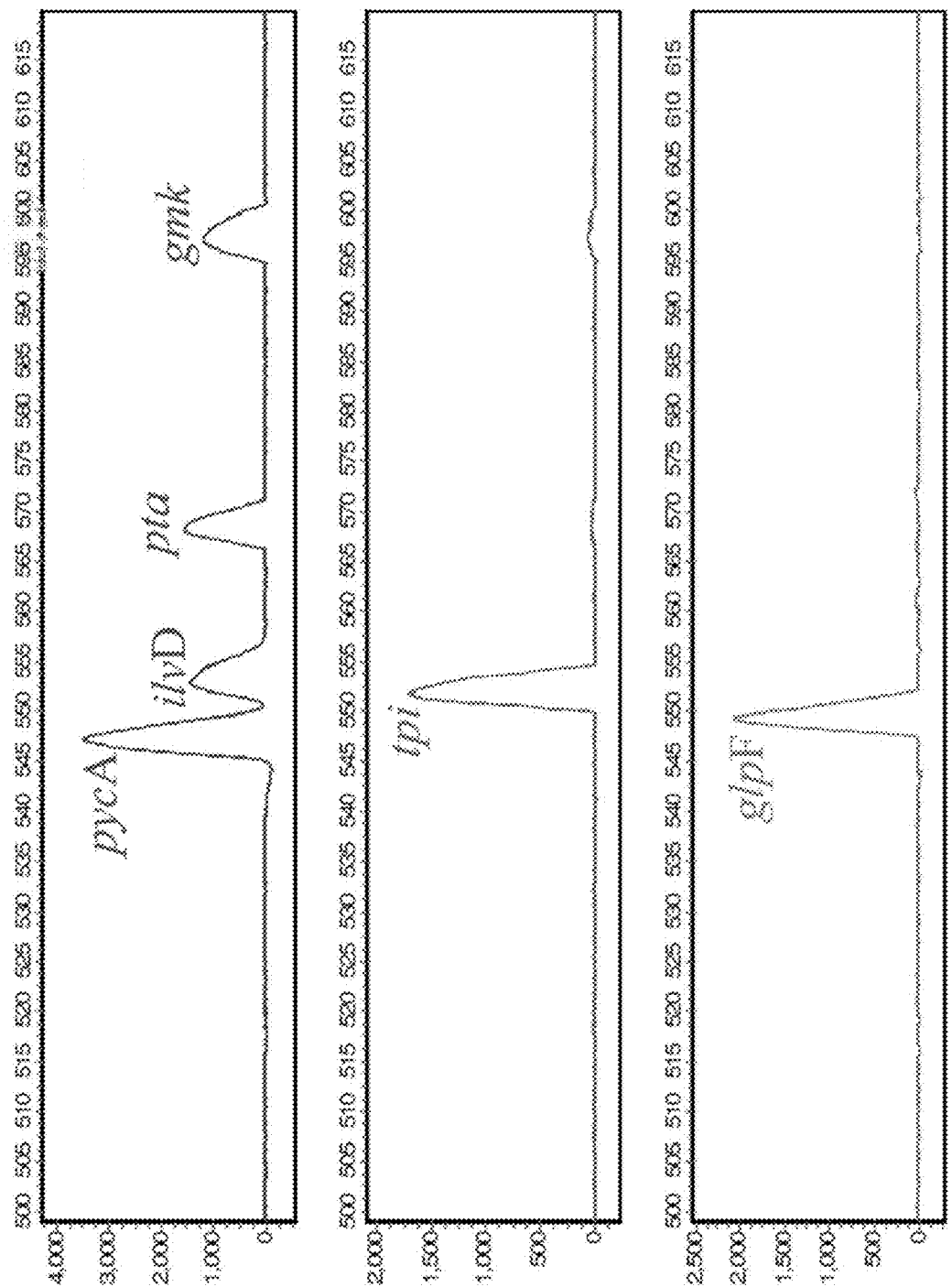
Figure 7C:
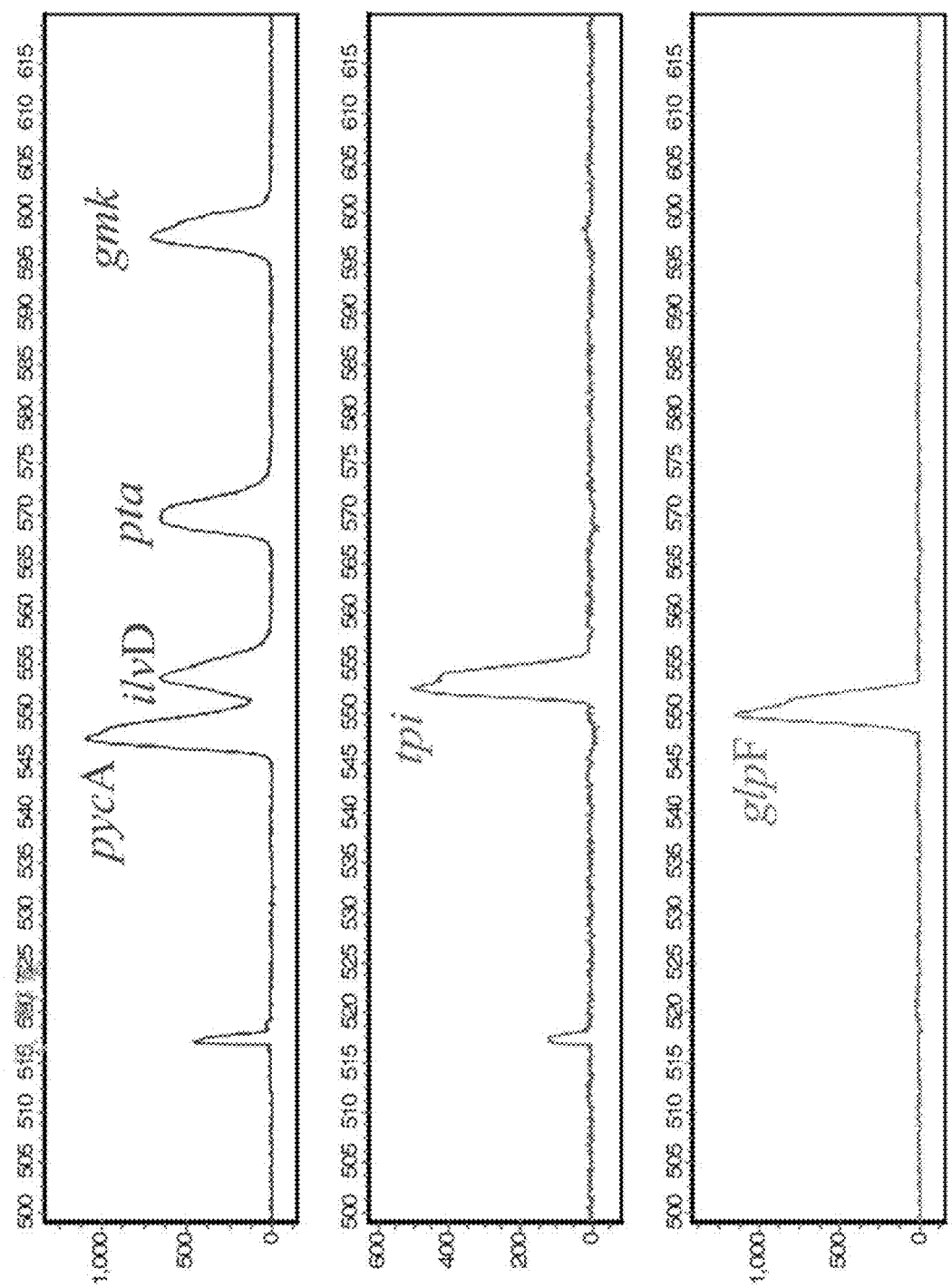
Figure 8A:
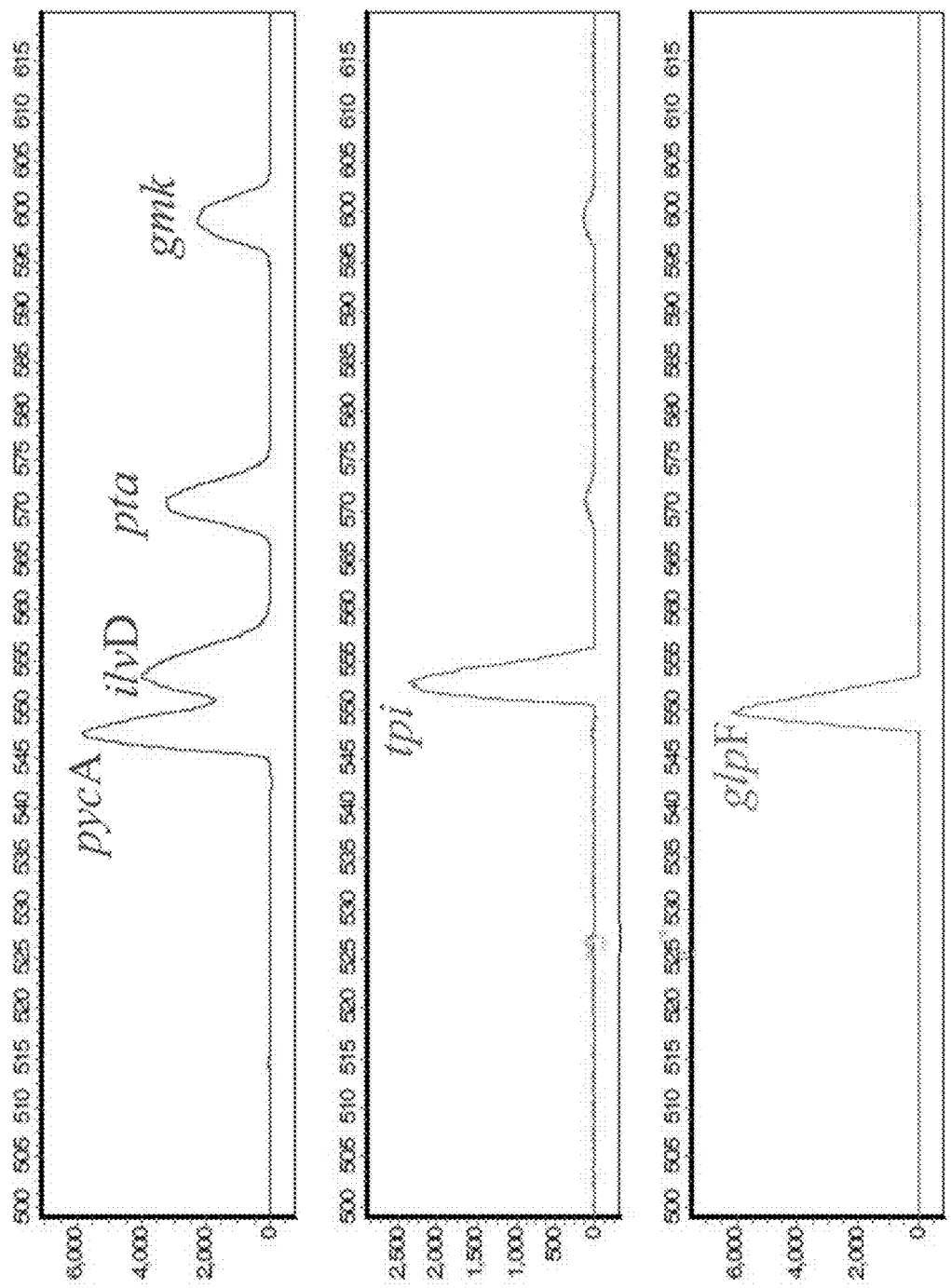
Figure 8B:
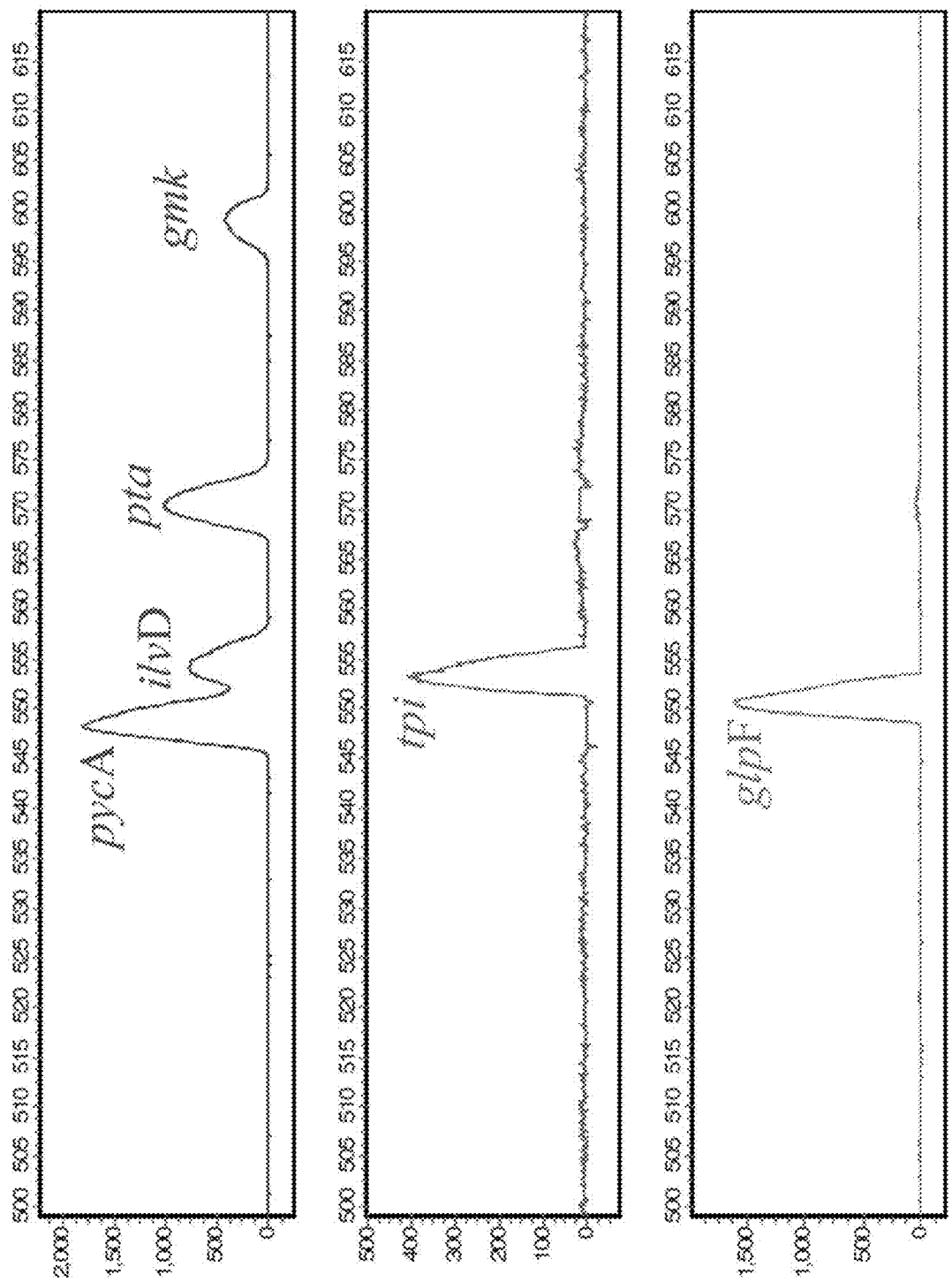
Figure 8C:
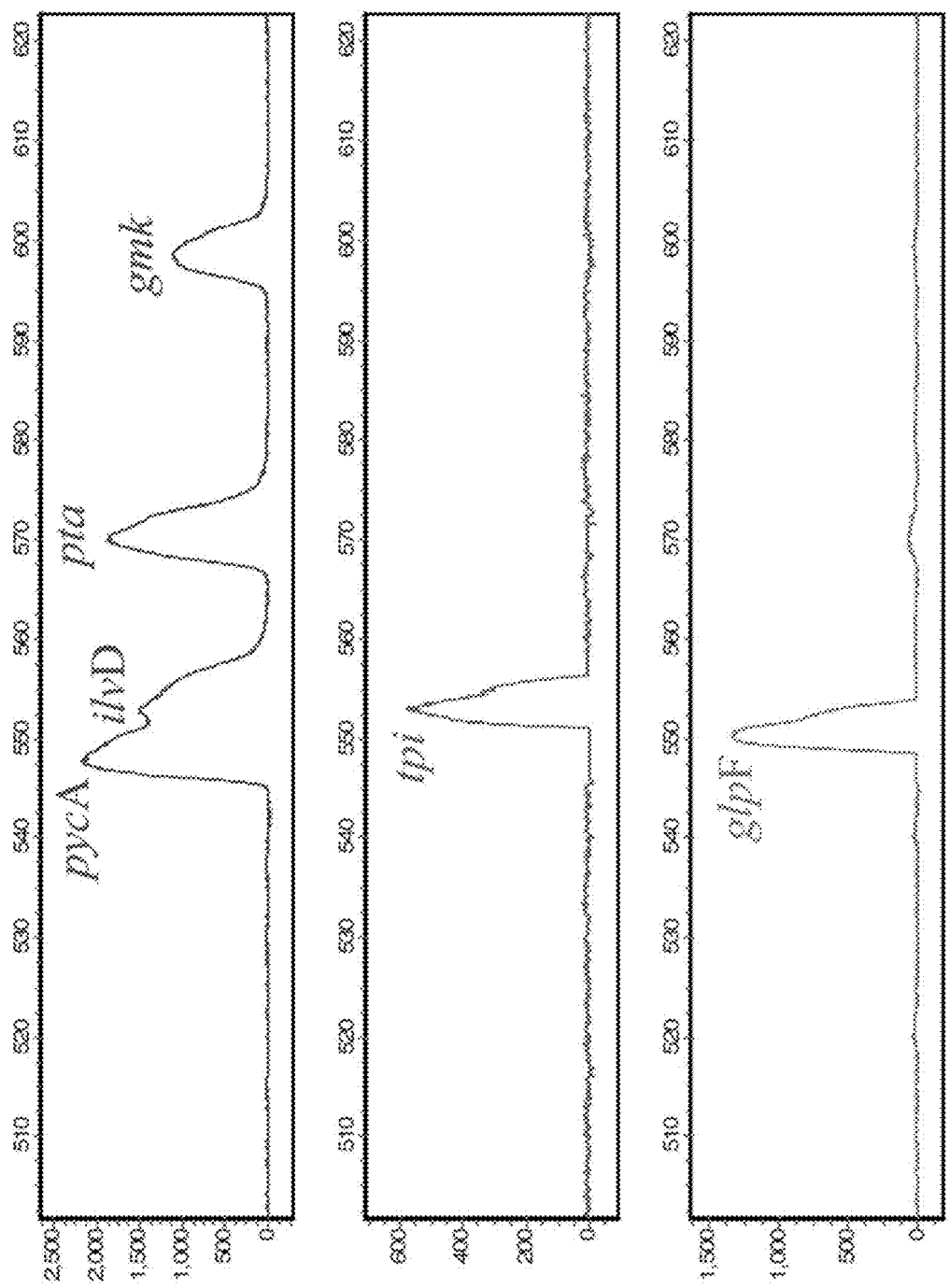
Figure 9A:
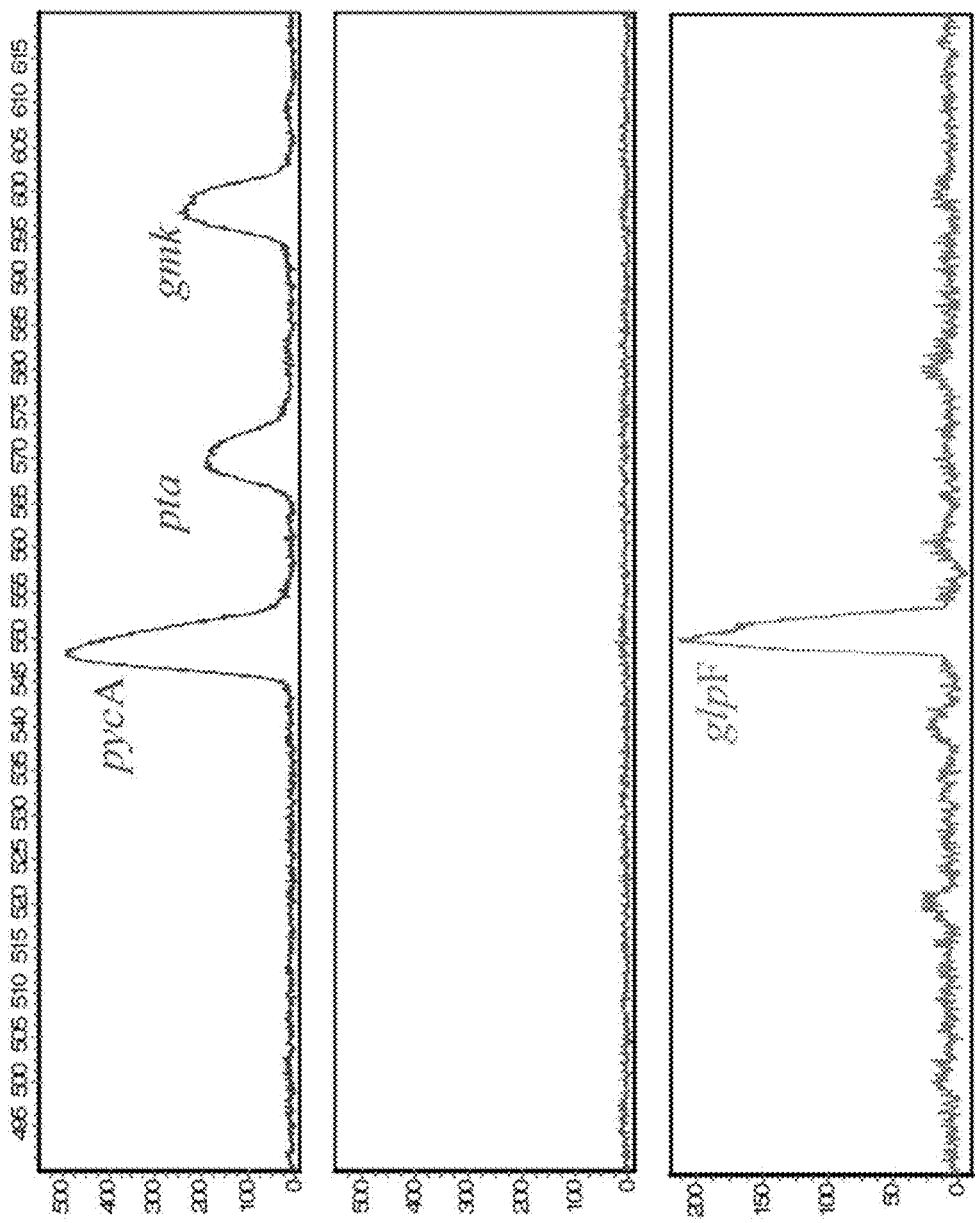
Figure 9B:
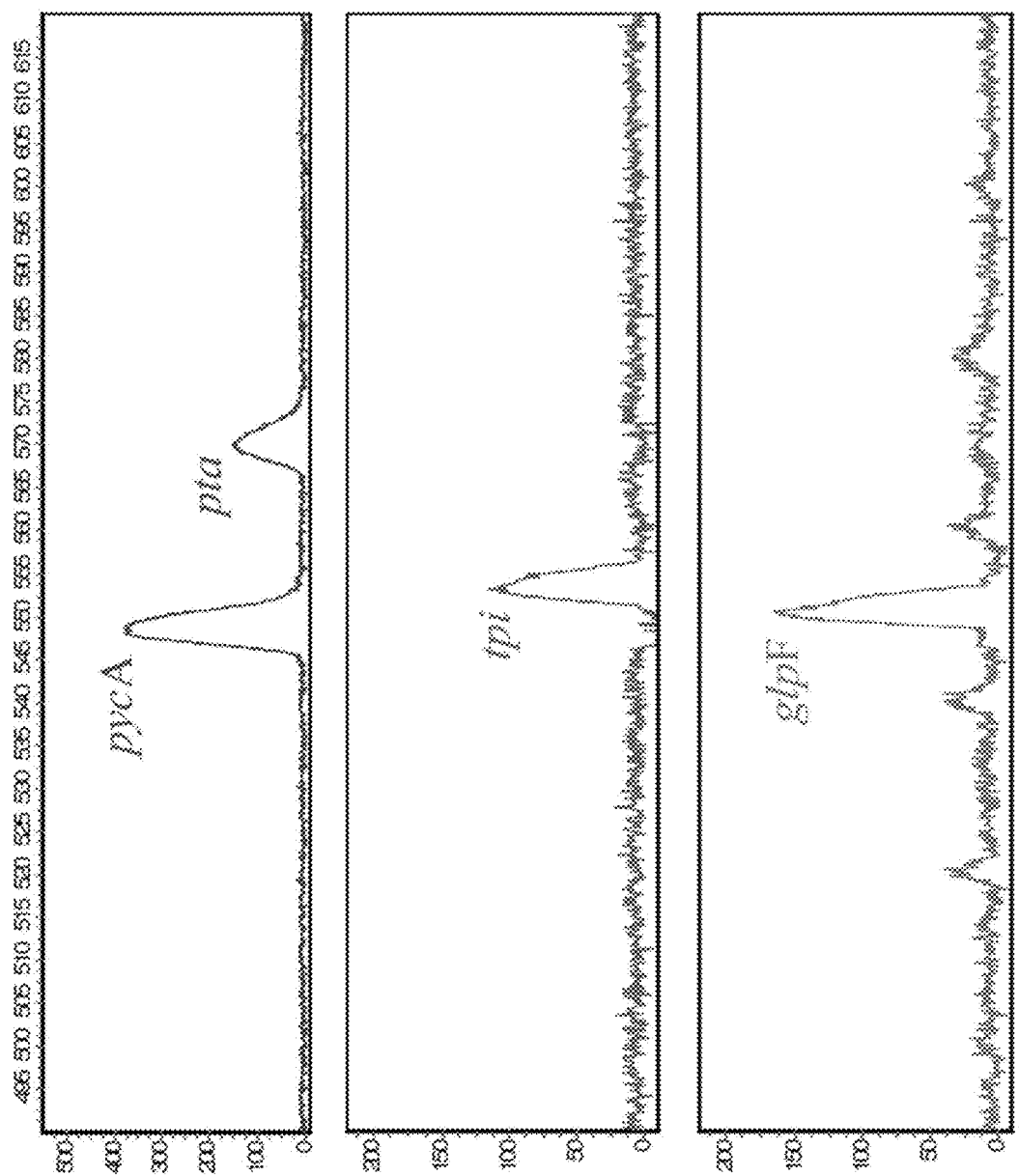
Figure 9C:
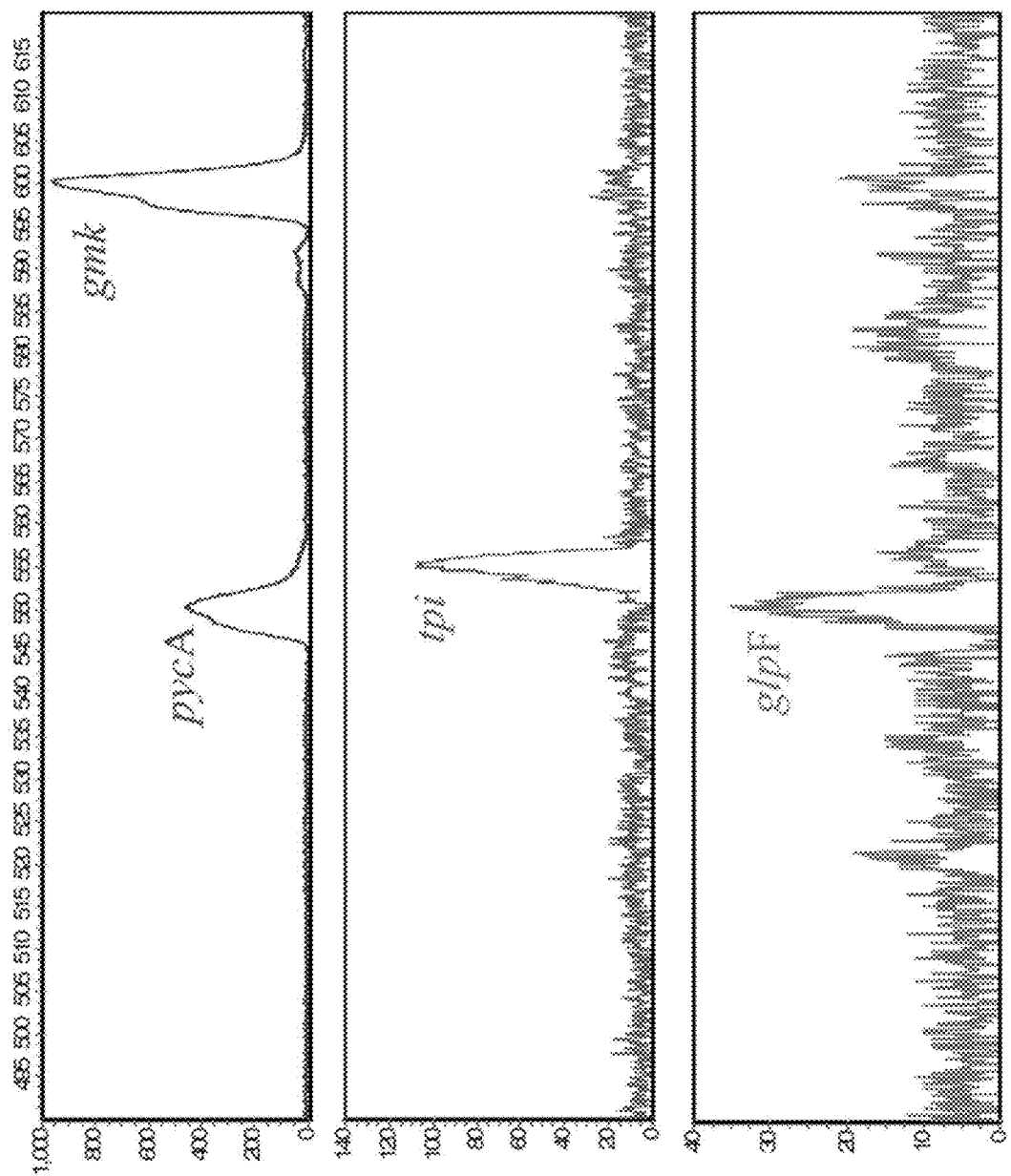
Figure 10A:
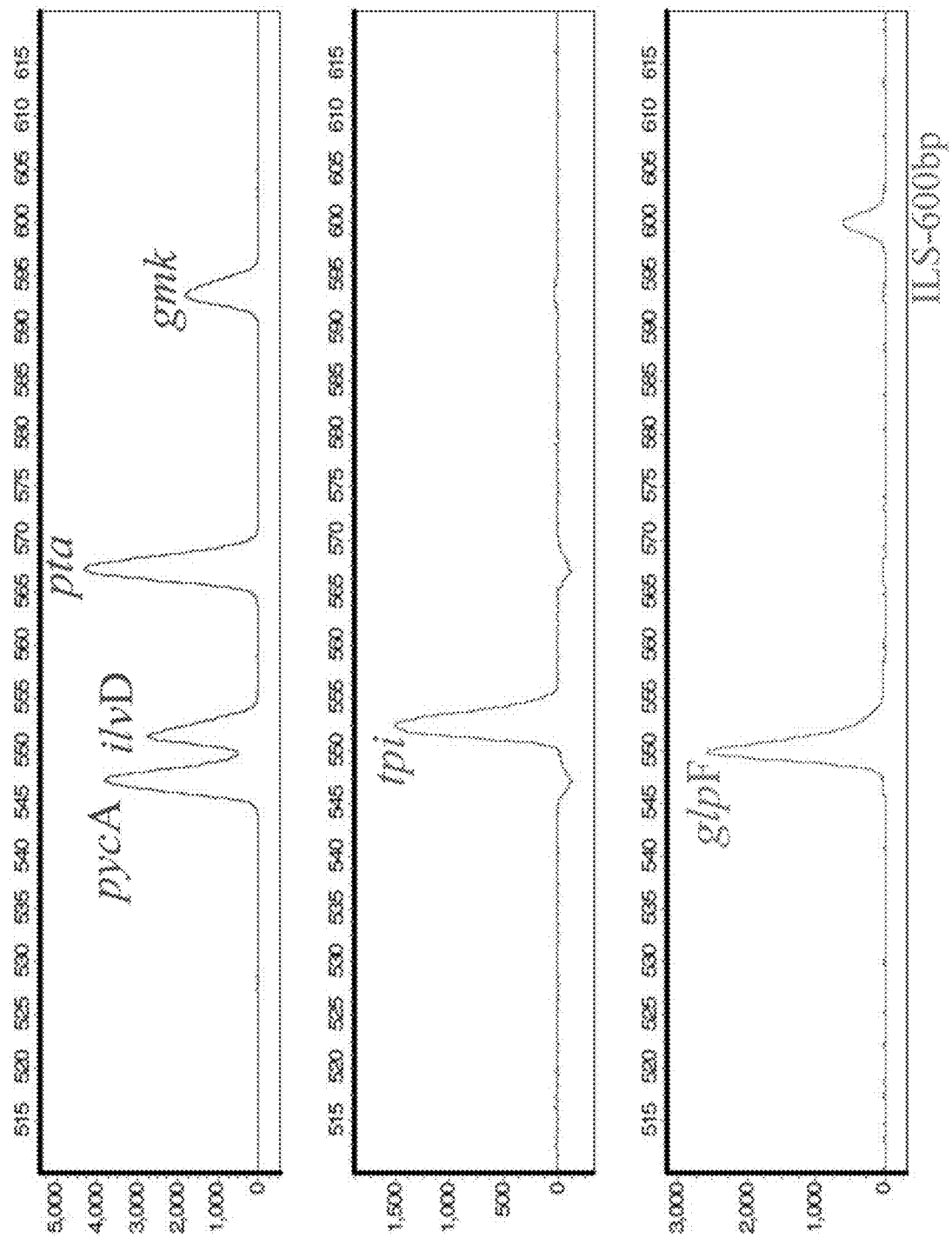
Figure 10B:
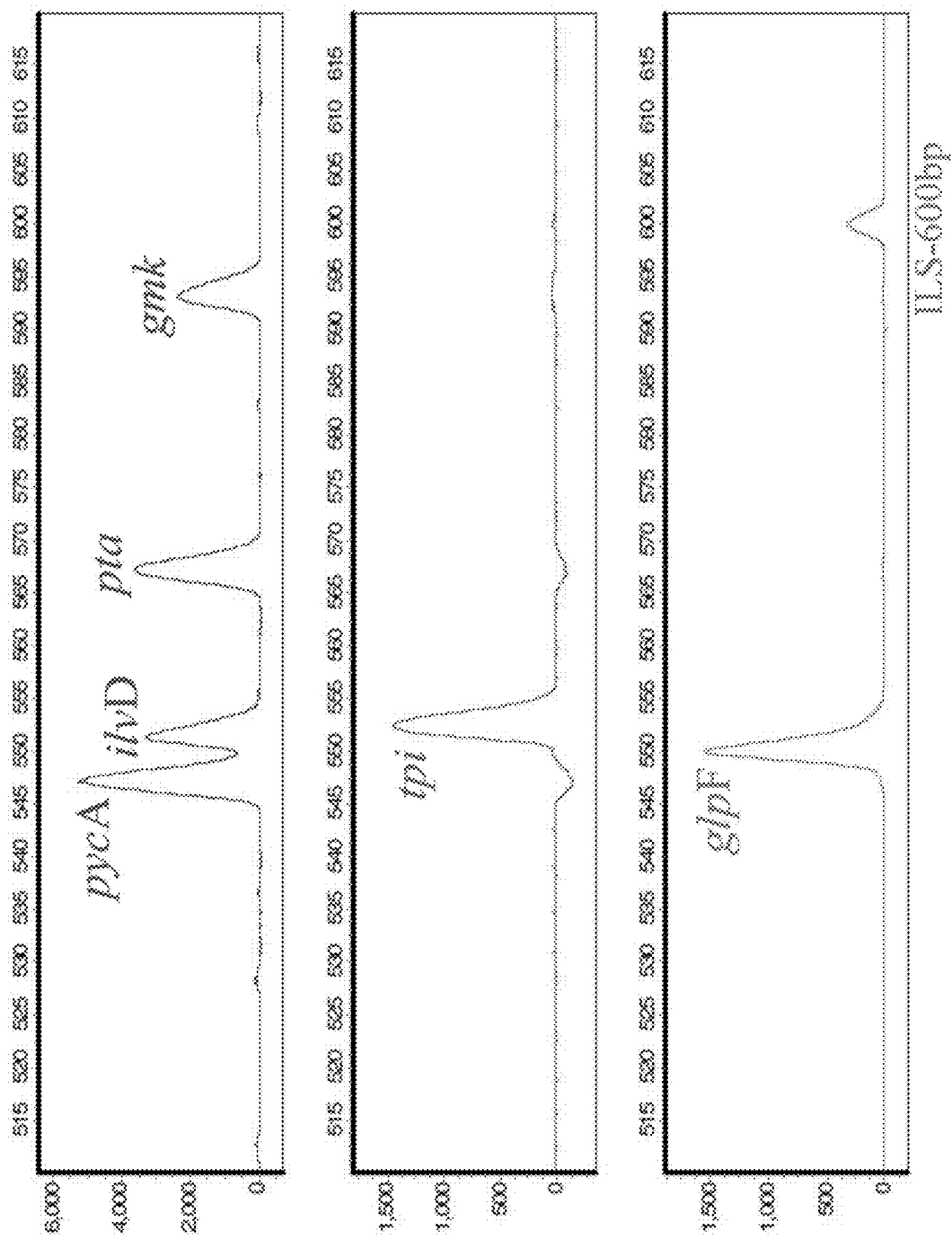
Figure 10C:
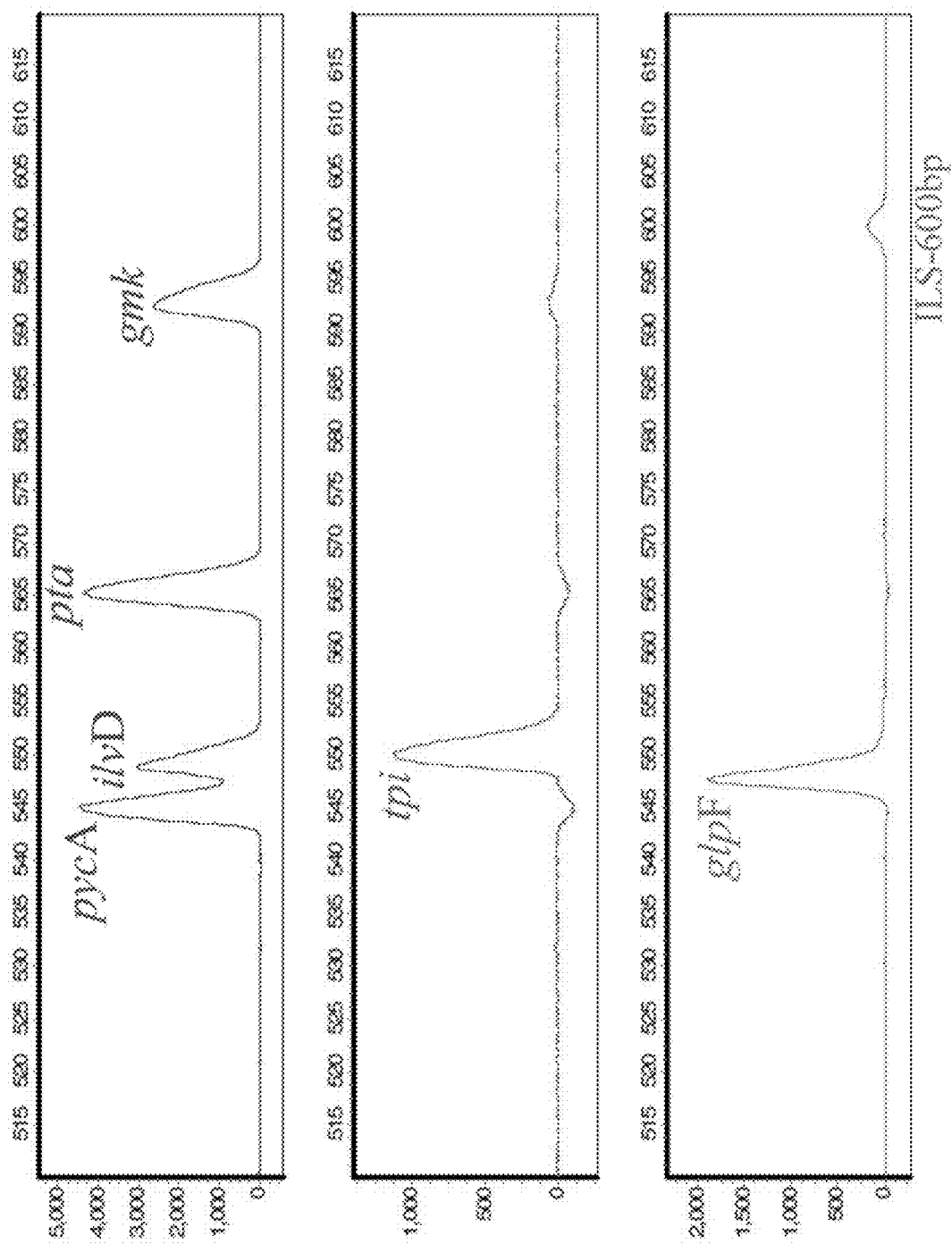
Figure 11A:
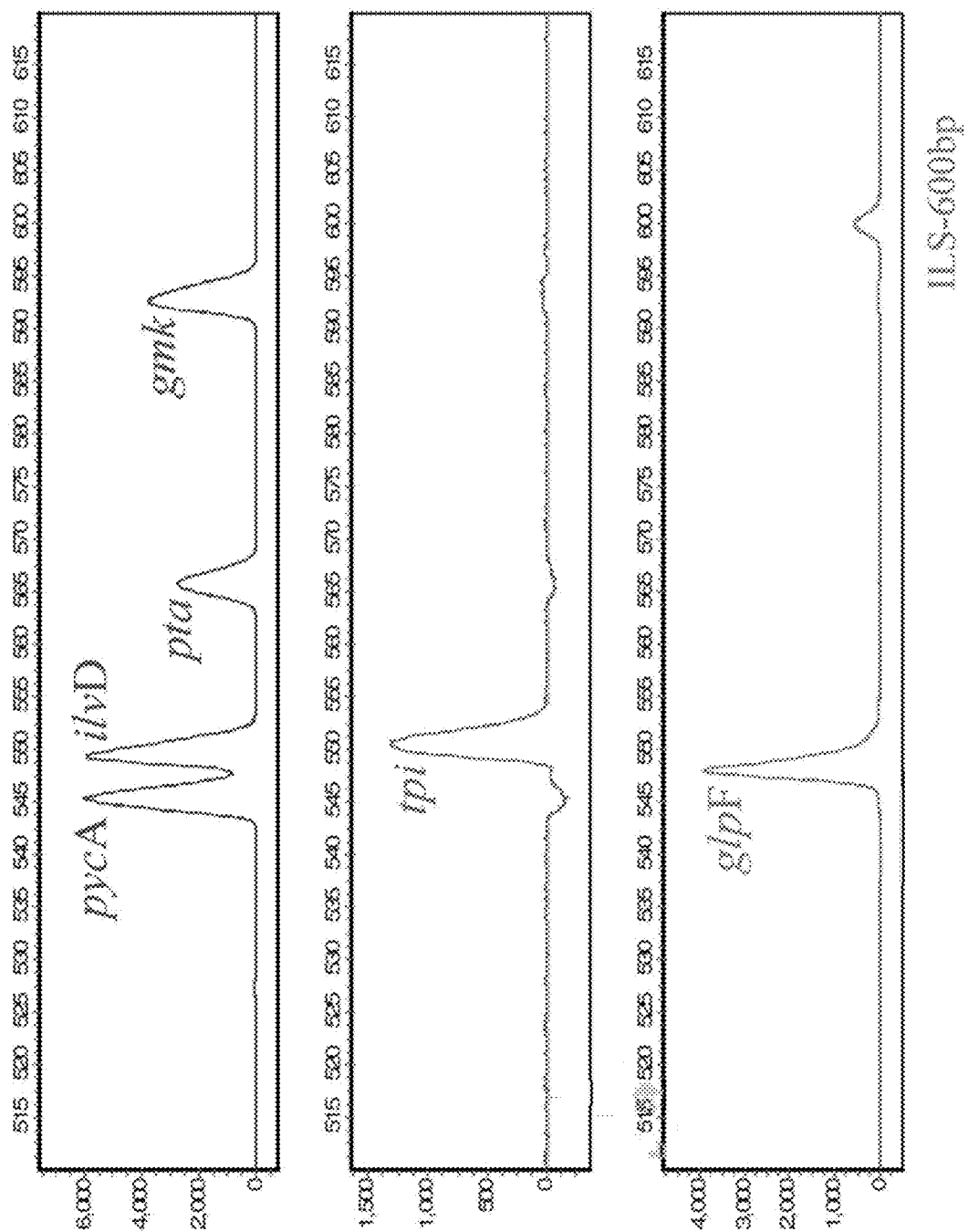
FIG. 11A, FIG. 11B, and FIG. 11C show detection of 1000 copies of *B. cereus* (NRRL B569, ATCC 10876) in JetA/JP1 aviation fuel with low water content (FIG. 11A, from Example 3), high water content (FIG. 11B, from Example 4), and direct oil processing without artificial water bottom (FIG. 11C, from Example 5)
Figure 11B:
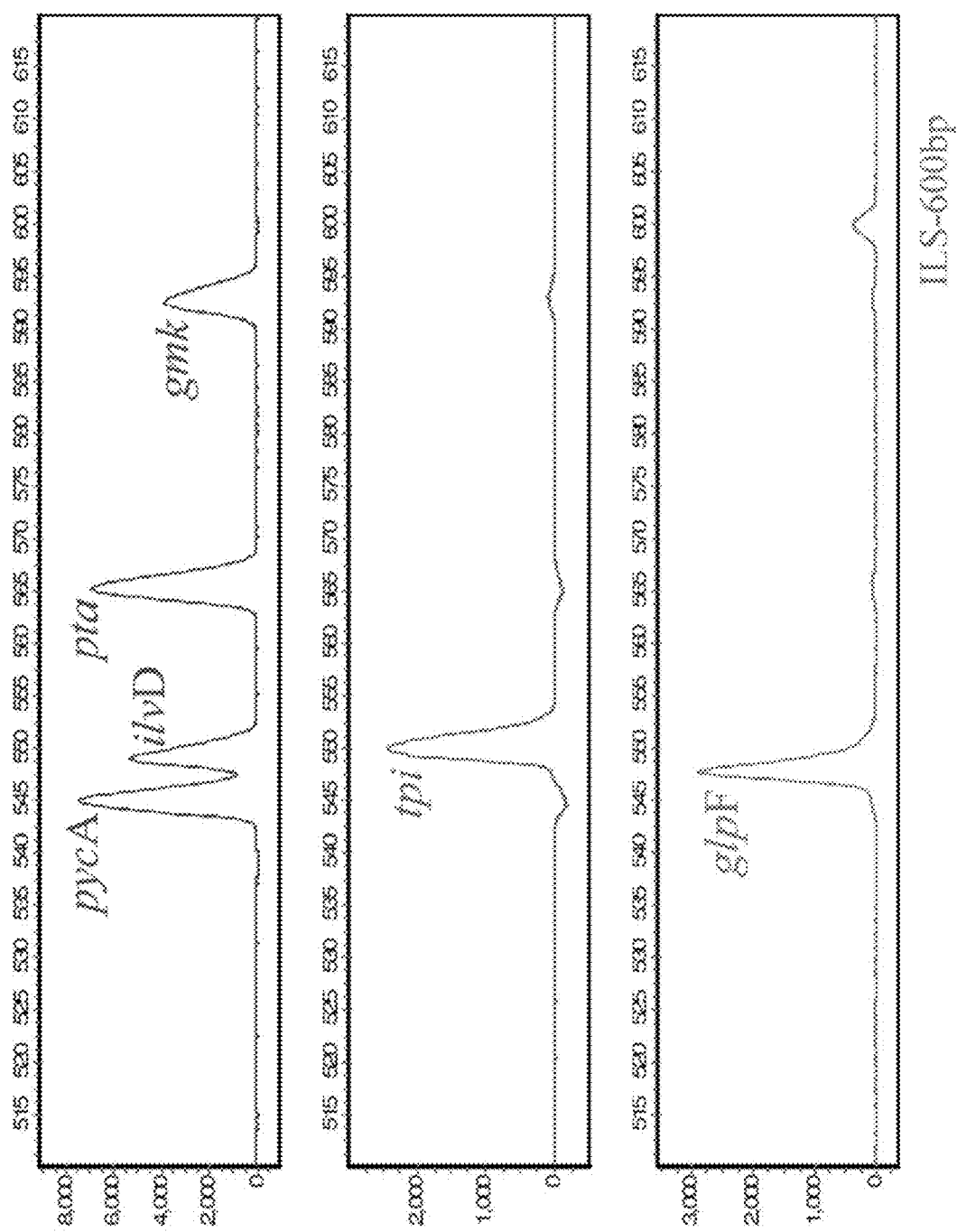
Figure 11C:
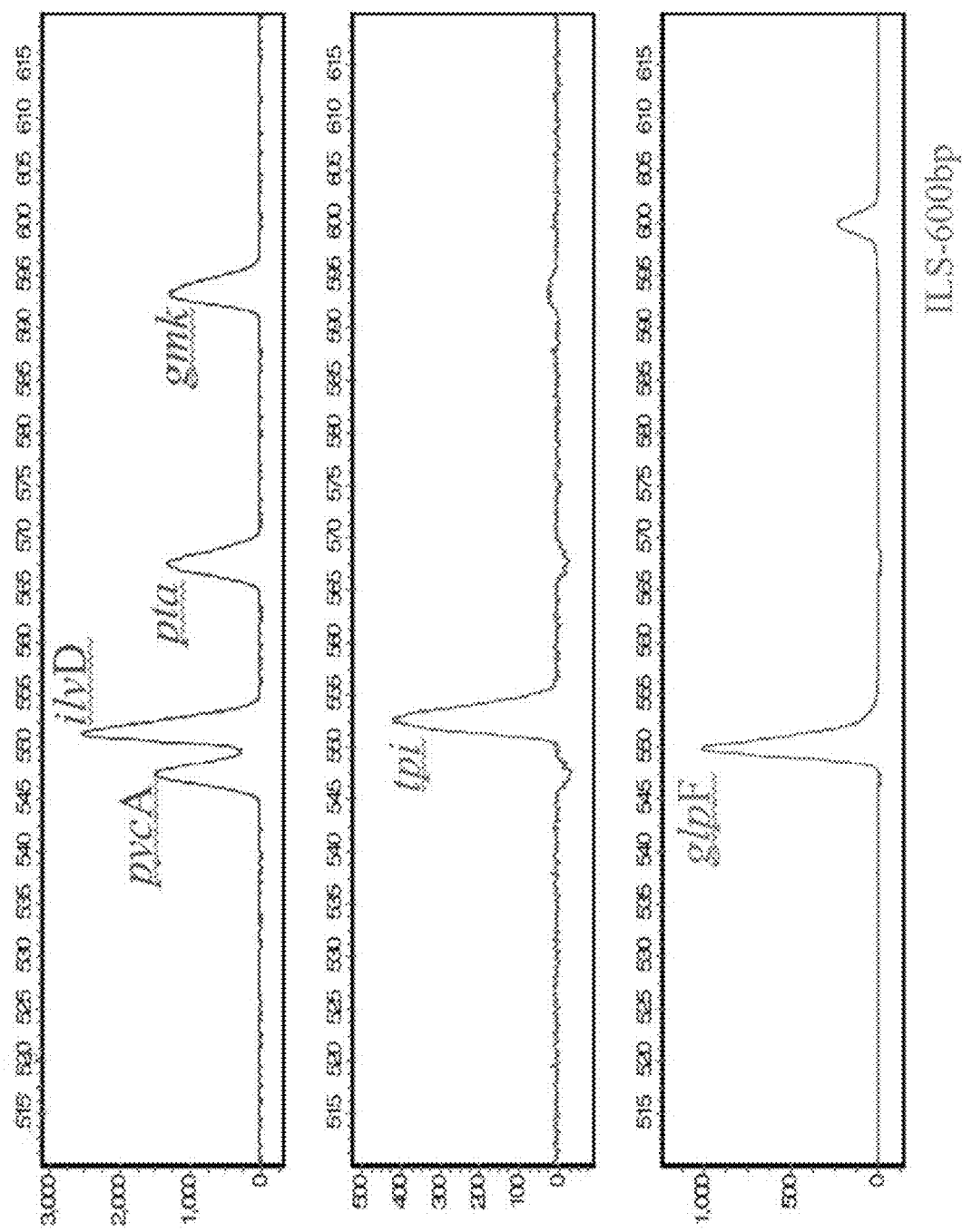
Figure 12A:
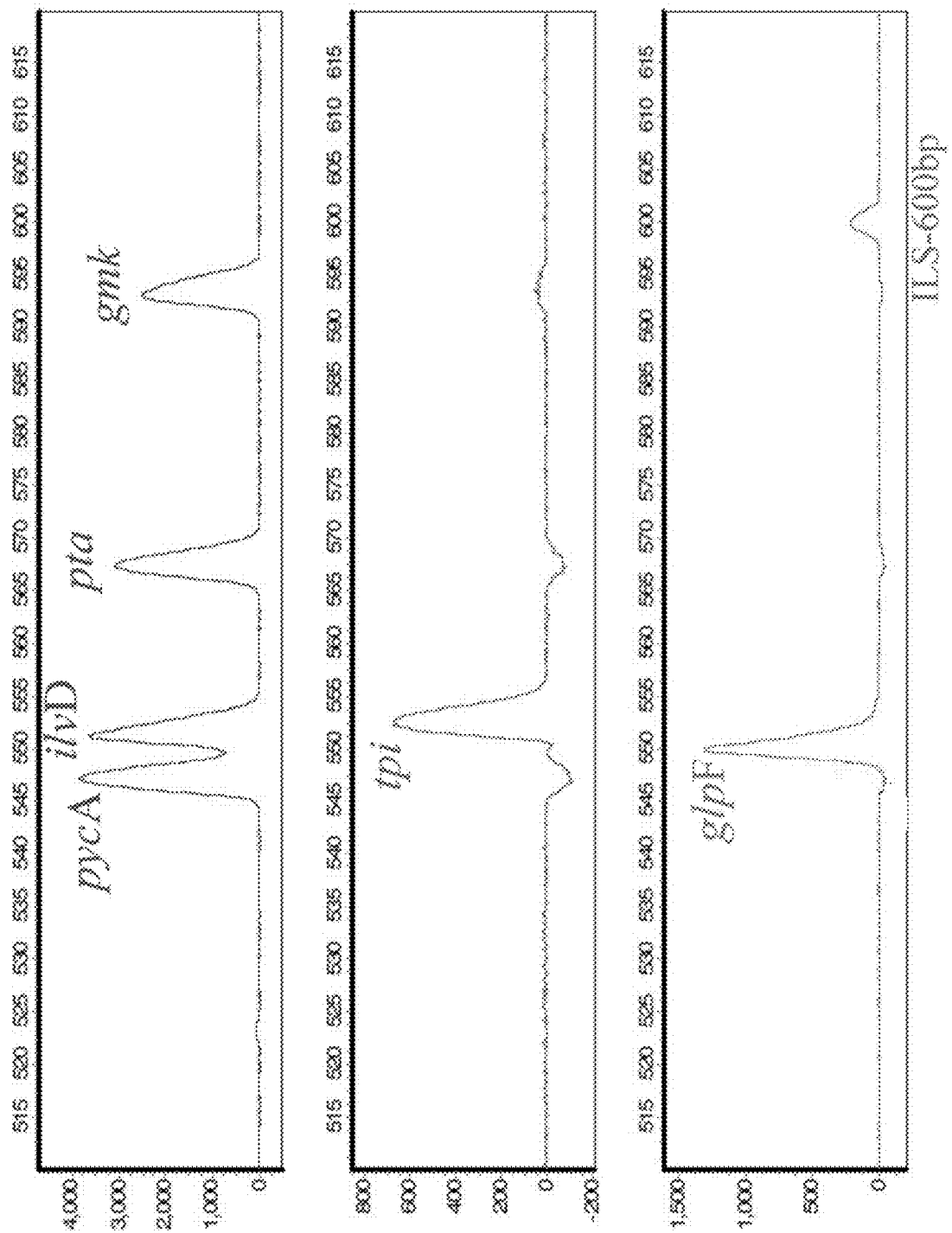
Figure 12B:
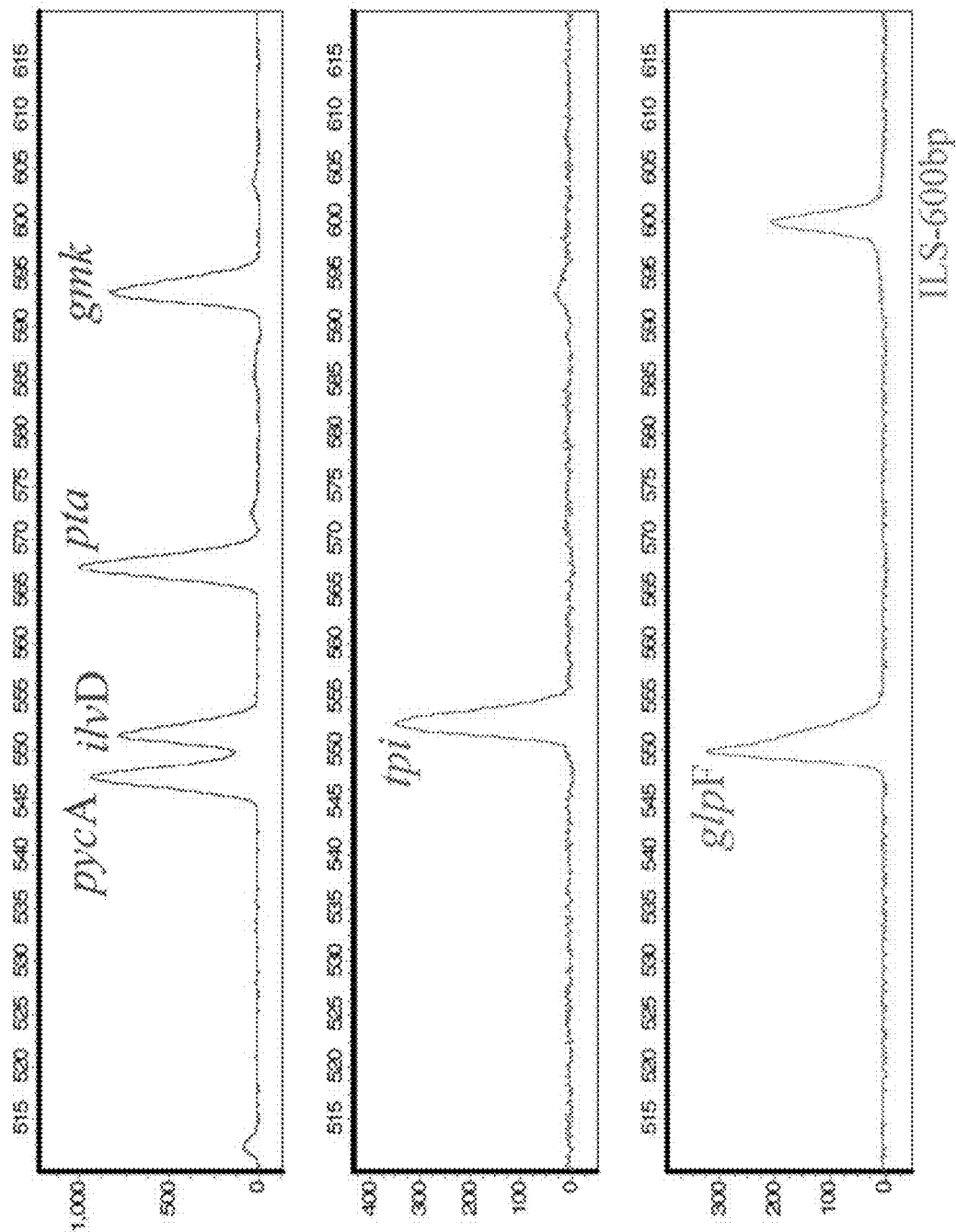
Figure 12C:
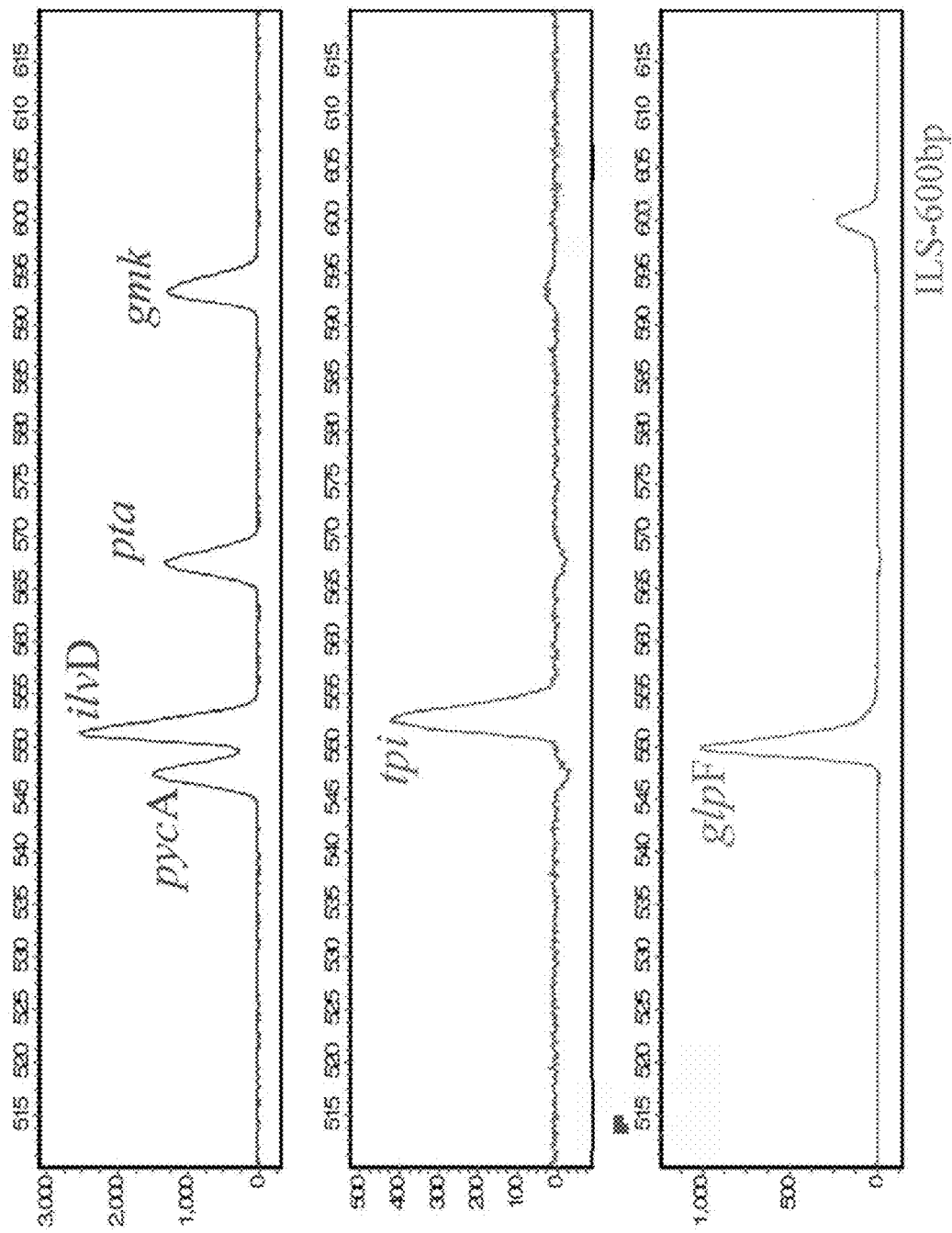

Samples were mixed thoroughly by multiple inversions and then centrifuged at 1,200×g for 5 minutes to separate the two phases. The entire aqueous phase including the thin layer of fuel:water interface (which, taken together, contains a significant fraction of the bacteria) was collected and then spiked on a swab for Rapid DNA purification as described in Example 2. FIG. 3 is a representative electropherogram from the aqueous phase collection of *B. cereus* spiked in diesel. As noted, 6 of the 7 MLST loci were observed; the pur gene was not detected using *B. cereus* NRRL B569 (ATCC 10876) due to mutations in the primer binding region in this strain. The fuel:water interface is processed, purified, and analyzed similarly.

Example 4

This example demonstrates detection of prokaryotic (bacteria and archaea) and eukaryotic (fungi and yeast) microorganisms in oil samples having high water content. A 500 μl of microbial suspension in 1×PBS containing 100 microbial cells (in this case, *B. cereus* NRRL B569, ATCC 10876) was added to 500 μl each of the different oil types (1 diesel, 3 grades/types of gasoline, 1 kerosene, 12 grades/types of motor oil, and 2 types of aviation fuels). Samples were mixed thoroughly by multiple inversions and then centrifuged at 1,200×g for 5 minutes to separate the two phases. The entire aqueous phase including the thin layer of fuel: water interface (which, taken together, contain essentially all of the bacteria) was collected and the bacterial cells were pelleted by centrifugation at 20,000×g for 5 minutes at 4 C. The pelleted cells are reconstituted in 1001 of 1×PBS. The mixture was then spiked on a swab for Rapid DNA purification as described in Example 2. Amplified products were cleaned using a 30K ultrafiltration device prior to microfluidic separation and detection. FIG. 4 is a representative electropherogram from the aqueous phase collection of *B. cereus* spiked in diesel. As noted, 6 of the 7 MLST loci were observed; the pur gene was not detected using *B. cereus* NRRL B569 (ATCC 10876) due to mutations in the primer binding region in this strain. The fuel:water interface can also be processed, purified, and analyzed similarly.

Example 5

This example demonstrates detection of prokaryotic (bacteria and archaea) and eukaryotic (fungi and yeast) microorganisms in oil samples having minimal to no water content. This is a direct analysis of fuel samples without the need for phase separation or creation of an artificial water bottom. A 10 μl of microbial suspension in 1×PBS containing 100 microbial cells (in this case, *B. cereus* NRRL B569, ATCC 10876) was added to 100 μl each of the different oil types (1 diesel, 3 grades/types of gasoline, 1 kerosene, 12 grades/types of motor oil, and 2 types of aviation fuels). Samples were mixed thoroughly by multiple inversions and the entire mixture was spiked on a swab for Rapid DNA purification as described in Example 2. Amplified products were cleaned using a 30K ultrafiltration device prior to microfluidic separation and detection. FIG. 5 is a representative electropherogram from the mixed fuel/direct oil collection of *B. cereus* spiked in diesel. As noted, 6 of the 7 MLST loci were observed; the pur gene was not detected using *B. cereus* NRRL B569 (ATCC 10876) due to mutations in the primer binding region in this strain.

The ability to assay for microbial contamination on fuel samples directly (without separating the aqueous phase for analysis) is a considerable advantage in the field. This advantage applies to fuel with no water content, minimal water content, or substantial water content-all regardless of the specific contaminants being detected and assays being utilized. For example, a nontechnical operator can simply place a swab into a sample to be tested and place the swab into an ANDE chip for Rapid DNA identification. Similarly, these advantages apply to the assay of contaminants in biofilms and the other sample types taught in the instant invention.

Example 6

The cleaned, amplified products prepared from gasoline as described in Examples 3-5 were separated and detected microfluidically. FIG. 6 shows detection of 100 copies of *B. cereus* in gasoline in low water content (A, from Example 3), high water content (B, from Example 4), and mixed fuel/direct oil sample collection (C, from Example 5).

Example 7

The cleaned-up amplified products prepared from JetA/JP1 aviation fuel as described in Examples 3-5 were separated and detected microfluidically. FIG. 7 shows detection of 100 copies of *B. cereus* in JetA/JP1 aviation fuel in low water content (A, from Example 3), high water content (B, from Example 4), and direct oil without artificial water bottom (C, from Example 5).

Example 8

The cleaned-up amplified products prepared from motor oil SAE30, kerosene, and 100 LL aviation fuel as described in Example 5 were separated and detected microfluidically. FIG. 8 shows detection of 100 copies of *B. cereus* in heavy duty motor oil SAE30 (A), kerosene (B), and 100 LL aviation fuel (C).

Example 9

This example demonstrates sensitivity of the assay wherein detection was performed using 10 microbial cells (in this case, *B. cereus* NRRL B569, ATCC 10876) in oil samples having minimal to no water content. This is a direct analysis of oil samples without the need for phase separation or creation of an artificial water bottom. A 101 bacterial suspension in 1×PBS containing 10 cells was added to 100l each of diesel, gasoline, and 1×PBS as control. Samples were mixed thoroughly as in Example 5. FIG. 9 shows detection of 10 copies of *B. cereus* in diesel, gasoline, and control 1×PBS with 4 of the 6 expected MLST peaks observed. Using the microfluidic PCR and separation systems, the limit of detection is approximately 1-2 microbial cells per sample.

The exquisite sensitivity of the assays of the invention offer the advantage of detecting relatively rare microbial species. Such rare contaminants may have disproportionate impact of MIC and fouling, for example, and the ability to detect them (before, during, and after biocides or during fuel exploration, or during identification of stolen fuel, for example) has significant value. Furthermore, the excellent limit of detection allows small volumes to be assayed. Prior to the instant invention, liters of fuel and water sample have been assayed; the teachings of the instant invention allow testing volumes of less than 0.01 microliters, less than 0.1 μl, less than 1.0 μl, less than 10 μl, less than 100 μl, less than 200 μl less than 1 milliliter, less than 1.5 ml, less than 2.0 ml, less than 5 ml, less than 10 ml, and less than 50 ml. For these volumes to be assayed and those greater than 50 ml, greater than 500 ml, greater than 1 liter, greater than 5 L, and greater than 50 L, it is possible to centrifuge, filter, or concentrate to remove the organic phase or otherwise reduce the sampling volume.

Example 10

This example demonstrates a Rapid DNA Identification of prokaryotic (bacteria and archaea) and eukaryotic (fungi and yeast) microorganisms in oil samples. Swabs were prepared as in Examples 3-5 and analyzed using the ANDE 6C instrument [Grover, Ibid., Carney, Ibid.] a ruggedized instrument that performs DNA purification, sample concentration, PCR amplification, and laser-induced separation and detection (S&D) and data processing and analysis without the need for human intervention. All the process steps required for DNA analysis are integrated in a single plastic consumable termed the I-Chip, which was preloaded with all required lyophilized and liquid reagents for purification, PCR amplification, and S&D. The I-Chip interfaces with the ANDE system via a single board computer which controls all subsystem functions (optical, electrophoresis, thermal, pneumatic, and ruggedization), performs data processing, and interfaces with the user. Swabs were simply inserted into the sample chambers of the I-Chip, and the I-Chip was inserted into the instrument for automated processing and data analysis.

The purification microfluidics in an I-Chip was designed to achieve efficient DNA recovery [Turingan (2016), Ibid]. First, cells were lysed in the swab chamber with a guanidinium-based lysis solution introduced at high pressure causing turbulent flow or chaotic bubbling. This turbulence around the swab promoted rapid lysis upon contact without the need for incubation (this can be accomplished with or without heating). From the swab chamber, the entire lysate was then passed through a purification filter to maximize purification yield. A highly efficient purification filter medium was incorporated to bind and achieve near quantitative recovery of DNA. Captured DNA was purified with multiple washes, eluted, and then transferred into a semi-permeable filtration membrane for concentration to approximately 10-fold. The membrane prevents DNA fragments from flowing through with application of sufficient pneumatic pressure. The purified and concentrated DNA was metered to a holding chamber to finally reconstitute a lyophilized PCR reaction mix which consisted of enzyme, dNTPs, buffered salt, and primers (in this case, the *B. cereus* MLST primers), prior to thermal amplification. Rapid microfluidic amplification was then followed by electrophoretic separation and laser-based detection of fluorescently-labelled amplified PCR fragments. Four swabs/samples were run simultaneously and the entire process from sample-in to results-out was completed in under 2 hours. FIG. 10 shows detection of 1000 copies of *B. cereus* in gasoline with low water content (A, from Example 3), high water content (B, from Example 4), and direct oil without artificial water bottom (C, from Example 5). The second peak is the 600 bp size standard marker from the orange channel (not shown).

Example 11

Similar to Example 10, this example demonstrates Rapid DNA Identification of 1000 copies of *B. cereus* in JetA/JP1 aviation fuel. FIG. 11 shows representative electropherograms with low water content (A, from Example 3), high water content (B, from Example 4), and direct oil without artificial water bottom (C, from Example 5). The second peak is the 600 bp size standard marker from the orange channel (not shown).

Example 12

This example demonstrates Rapid DNA Identification of 1000 copies of *B. cereus* in diesel (FIG. 12A), kerosene (FIG. 12B), and 100 LL aviation fuel (FIG. 12C) prepared from Example 5. The second peak is the 600 bp size standard marker from the orange channel (not shown).

Example 13

Major approaches employed currently for detection of microbial contamination of oil products include culturing of microorganisms filtered from oil products, and chemical approaches such as ATP measurement (as an indicator of viable microorganism biomass) and measurement of oxygen consumption (as an indication of activity of the heterotrophic aerobic microorganisms). Culturing methods require long periods of time for microbial growth, trained personnel, laboratory space and equipment, and have several limitations including the existence of viable but unculturable species, culturing environment favoring some species over others, and different behavioral pattern of an isolated culture when present in a complex consortium community [White, J. et al. *Appl Environ Microbiol* (2011), 77(13): 4527-4538; Kilbane, J. and J. Wylde. Investigation of Microorganisms in a West Texas Oilfield Using Growth and Genetic Testing. *SPE International Symposium on Oilfield Chemistry*; Hill, E. C. and G. C. Hill. *ECHA Microbiology Ltd*, Technical notes (2007)]. Although fast and relatively easier, measurement of ATP content does not provide any degree of differentiation and/or source of microbiological contamination. Measurement of oxygen elimination and other metabolic pathway detectors is applicable for detection of limited range of microbial contamination, requires separate tests for each pathway, and depends on prolonged incubation/growth in the test tube which can sometimes take up to several days [Bacteria testing: genetic methods, Gatekeeper, Chemical systems, materials & corrosion (2013); LaMotte Company, Biological Activity Reaction Test (BART). Microbiological Testing Products (2018)].

Some attempts were made to introduce faster, more sensitive, specific, and reliable method of detection based on genetic detection of various classes of microorganisms through amplification of particular targets, but these methods still require a multitude of laboratory equipment, highly trained personnel, and provide limited data as these mostly concentrate on one or two genetic targets. The assays described here are based on a highly multiplexed assay for 1) rapid detection for the presence of microbial contaminants and 2) rapid identification and simultaneous classification of contaminating microorganisms without the need for sequencing of isolated PCR amplicons. This general strategy have been previously tested and validated for rapid and sensitive detection and strain-typing of clinical pathogen for use at point-of-care diagnostics [Turingan, R. S. et al. *PLoS One* (2017), 12(5):e0178653. doi: 10.1371/journal.pone.0178653; Dean, D. et al, *PLoS One* (2012), 7(12): e51685. doi: 10.1371/journal.pone.0051685] and also detection of pathogenic microorganisms involved in bioterrorism attacks while providing discrimination from closely-related species and environmental background contaminants [Turingan, R. S. et al. *PLoS One*. (2013); 8(2):e56093. doi: 10.1371/journal.pone.0056093]. The assays of the present invention are designed to be specific to the target groups of species even if highly similar genes are present in other organisms. All assays are compatible with the ANDE Rapid DNA Identification system, which can be operated both in the field and the lab.

This example illustrates a general broad-spectrum assay presented in FIG. 13 for detecting microbial contamination with differential detection of the presence of the high-level taxonomic groups (bacteria, archaea, filamentous fungi and yeast) and major functional players in the oil extraction/fuel storage field such as sulfate-reducing bacteria and methanogenic archaea. Detection of the taxonomic groups is based on the targets located in various segments of the ribosomal RNA coding area of the respective organisms while detection of the functional groups relies on the presence of coding sequences of the appropriate genes. Presence of functional targets in addition to the purely taxonomic targets allows parallel functional identification of the major oil field and fuel quality compromising organisms for increased reliability and specificity. The genes encoding 16S (for prokaryotes) and 18S (for eukaryotes) components of the ribosomal subunits are utilized as they are well-studied phylogenetic targets due to relatively slow rates of evolution. For functional specificity detection, different targets intended to identify the presence of the microbial community likely participating in metabolic activities known to be very damaging to the performance of any type of petroleum product and/or to fuel storage areas and machineries. Major physiological targets include:

dsrB gene encoding β subunit of the dissimilatory (bi) sulfite reductase, a key microbial enzyme in both the reductive and the oxidative steps of the biogeochemical sulfur cycle in bacteria and archaea. Sulfate-reducing microorganisms (SRMs) are a serious problem to oil industries as they produce sulfide, which is highly reactive, corrosive, and toxic.

Methyl Coenzyme M Reductase A encoded by mcrA gene. This enzyme catalyzes the reduction of a methyl group bound to coenzyme-M, with the concomitant release of methane, which contributes to a significant microbially influenced corrosion. This enzyme is unique to and ubiquitous in Methane-Oxidizing Archaea.

It should be noted that the above physiological targets have highly variable sequences in different species, hence, ubiquitous detection of all of the species at once with just a single set of nondegenerate oligonucleotides is not optimal. Instead, some primers contain a number of variants that differ from one another by at least one critically positioned single nucleotide polymorphisms (SNPs) to ensure ubiquitous and strong amplification of these targets in all target microorganisms. An additional challenge is to ensure specificity so that 1) each target is amplified only when organisms of a particular kingdom are present while avoiding the orthologs (from different lineages) of such genes if they are present in non-target species, and 2) differentiation between target genetic sequences and paralogs that do not encode for the same functional genes within the same kingdom can be achieved.

Figure 48:
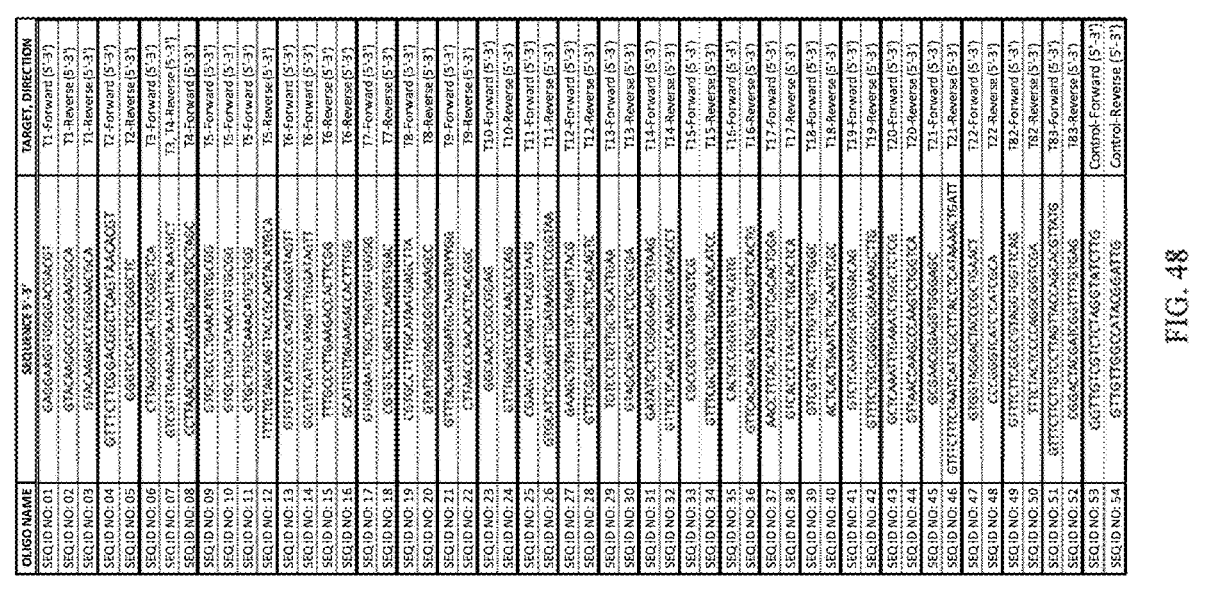

The assay presented in FIG. 13 as a table shows 6 different primer pairs (T1-T6, SEQ ID NOs: 1-16 listed in FIG. 48) for 4 target genes (16S, 18S, mcrA, and dsrB) that were combined in a single reaction for general identification and ubiquitous detection of bacteria, archaea, fungi, and yeast. Each primer pair (with sequences of forward and reverse members of the pair presented in FIG. 48) is designed for specific taxonomic group(s) of organisms. Some targets include more than 2 primers (degenerate primers) to allow efficient amplification of identical genes present in different organisms. Selection of the targets for each taxonomic group was performed so that it not only allows differentiation from all other microorganisms, but also to be inclusive for all members within the target group. Other targets can be added to this assay or replace targets already contained within the assay. Preferably, all the targets are in a single amplification assay, to allow an overall screening of the fuel type (whether separated or not separated, biofilm, region of corrosion, area of remediation etc.). Furthermore, the PCR assay can be lyophilized, consistent with long-term stability and storage at room temperature conditions (without requiring refrigerators or freezers). Finally, the assay is incorporated into an ANDE I-Chip [Turingan (2013), *Ibid*] or A-Chip [Tan, *Ibid.*] to allow sample-in to results-out Rapid DNA identification.

Figure 14:
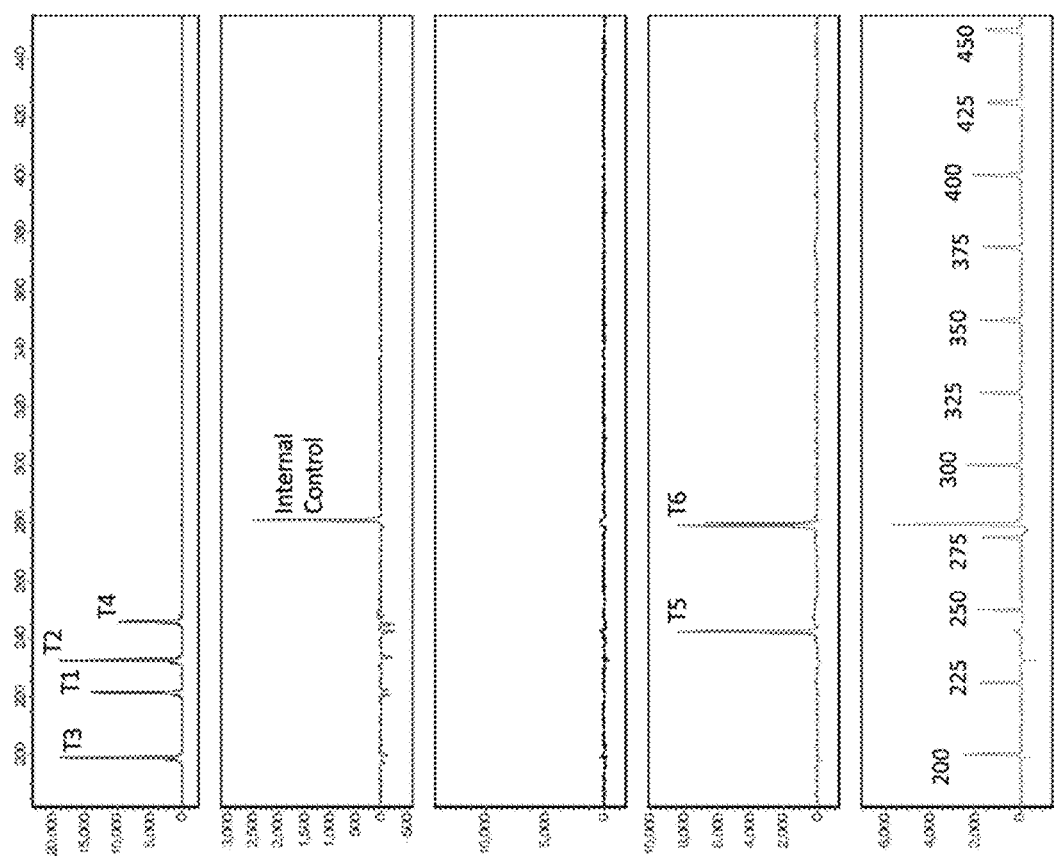

To develop the General Fuel 6-plex PCR Assay for the general identification and ubiquitous detection of bacteria, archaea, fungi, and yeast, a microfluidic PCR reaction was performed using a buffer (e.g. TE-4) spiked with representative microorganisms for each taxonomic group known to contaminate fuel samples and those that bear the physiological targets. For example, *Desulfovibrio vulgaris* is a bacterial species which is expected to generate the bacteria 16S amplicon (T1) and at the same time, contains dsrB gene for amplification of the physiological target responsible for sulphate reduction (T5). *Penicillium chrysogenum* belongs to the fungal family for amplification of the filamentous fungi 18S amplicon (T3); *Candida glabrata* belongs to the fungal family for amplification of the yeast 18S amplicon (T4); *Methanosarcina acetivorans* belongs to archaea family for amplification of the archaea 16S amplicon and at the same time, contains the mcrA gene for amplification of the physiological target responsible for methanogenesis (T6). FIG. 14 shows the simultaneous amplification and detection of the 6 targets of the General 6-plex Assay with TE-4 spiked with the representative microbes at 100 genome equivalents each as template. Primers for these targets were fluorescently-tagged with different commercially-available dyes to effectively visualize the amplicons—6-FAM or fluorescein is a blue dye used for T1, T2, T3, and T4; ROX or 6-carboxy-X-rhodamine is a red dye for T5 and T6; and JOE or 6-carboxy-4',5' dichloro-2',7'-dimethoxyfluorescein is a green dye for the internal control. The use of several fluorescent dyes is particularly valuable for the identification of multiple targets that are being interrogated in a single reaction, having a wide range of amplicon sizes for each target due to natural sequence variability, and also with amplicon sizing for different microorganisms that vary only by 1 or a few bases.

Figure 15A:
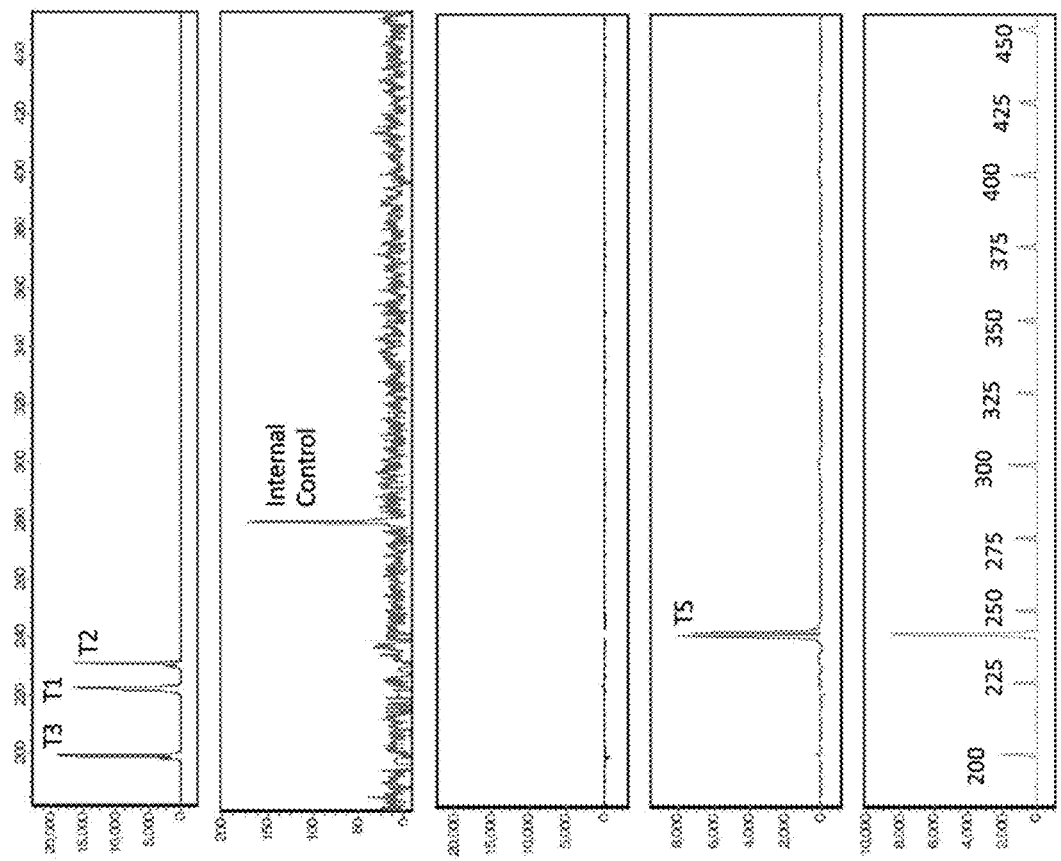
Figure 15B:
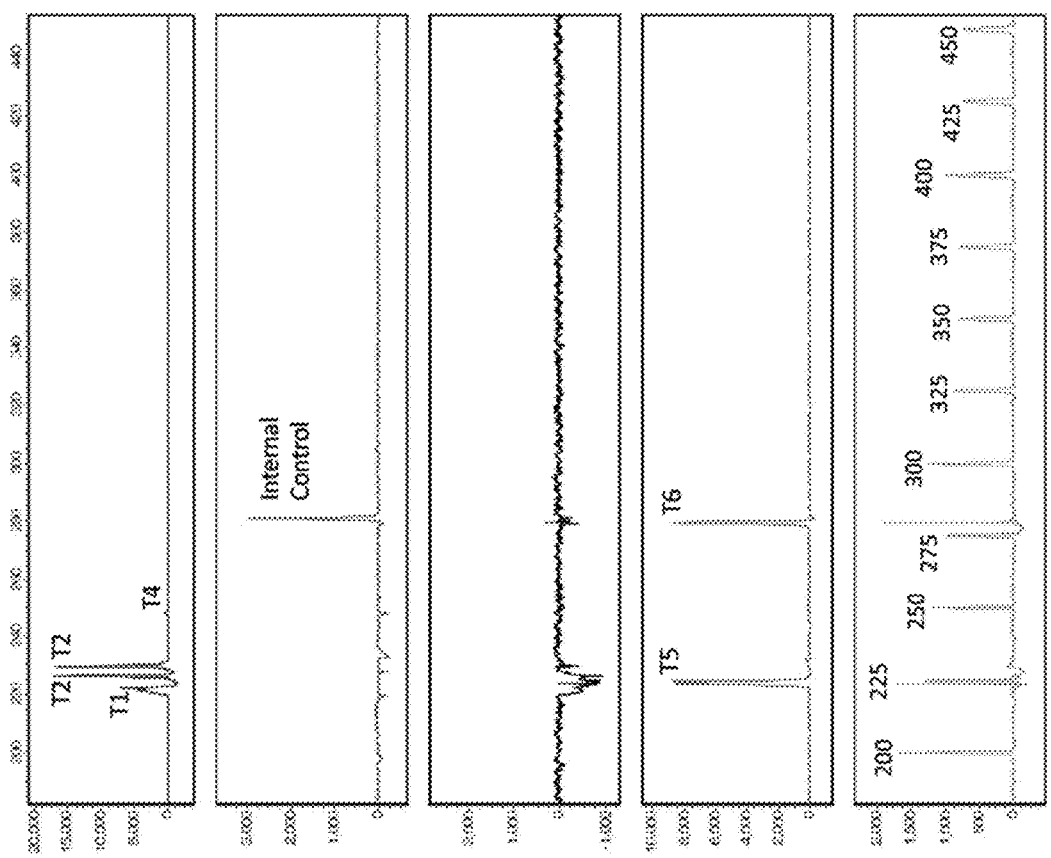
Figure 15C:
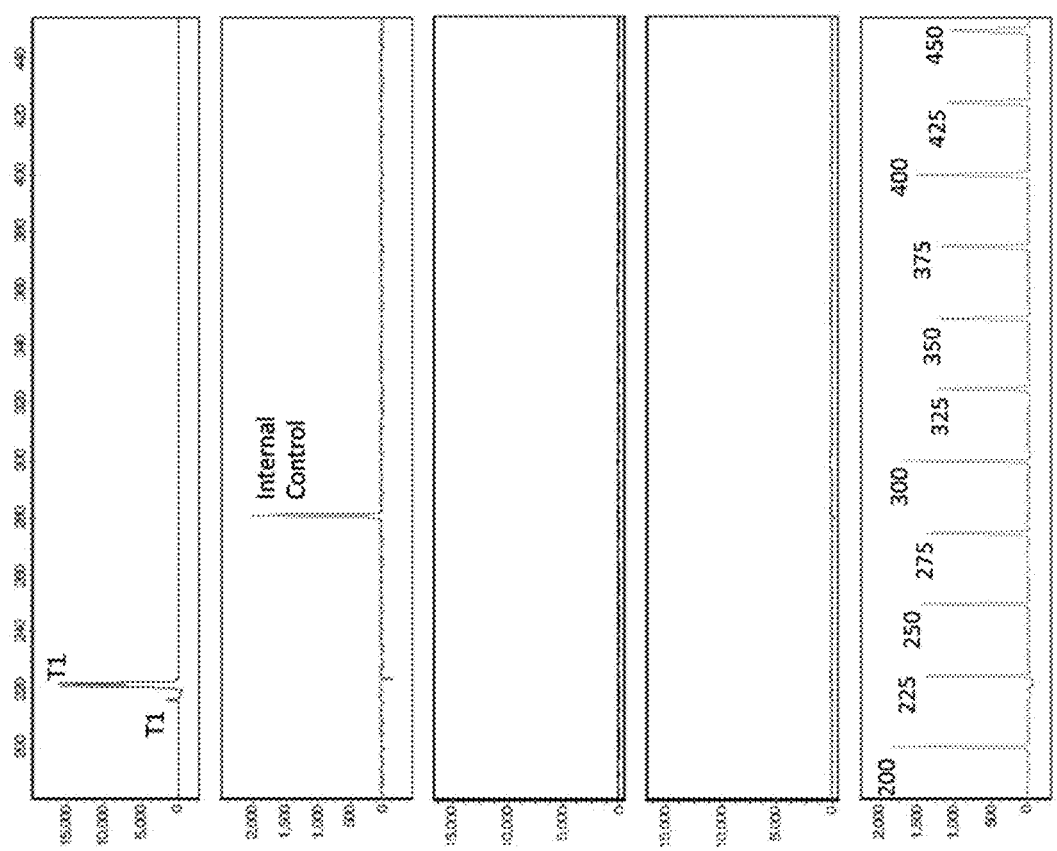

To illustrate the functionality of the General Fuel 6-plex PCR Assay, several commercially-obtained fuel samples (diesel in particular) collected from oil tanks (e.g. hospital fuel islands, generators, boilers, oil fleet, etc.) were tested. The pre-processing was performed following Example 5, wherein fuel samples were purified without the need for phase separation or creation of an artificial water bottom. A 100 µl aliquot of fuel that was mixed well by multiple inversions/shaking was subjected to Rapid DNA purification following Example 2. The fuel samples tested had varying degree of contamination based on the intensity of the target peaks observed and also the group of microbes present based on the number of targets amplified. FIG. 15 shows representative 6-plex electropherograms from the fuel samples. FIG. 15A detected a high contamination with bacteria, archaea, and filamentous fungi, and also detected presence of sulfate-reducing microorganisms (SRMs). FIG. 15B detected a high contamination with bacteria, archaea, a low positive for yeast, and also detected presence of both SRMs and methane-oxidizing archaea. FIG. 15C only detected strong bacterial contamination and the bacteria present are not involved in biogeochemical sulfur cycle. Presence of more than one peak for a given taxonomic group or physiological target (e.g. T2 for FIG. 15B and T1 for FIG. 15C) indicates fragment length polymorphisms inherent from different genus or species resulting from insertions/deletions (indels) that are expected based on in silico gene sequence alignments of available genome sequences. FIG. 16 summarizes various amplicon sizes in tabulated form expected for each target with a list of most frequently observed amplicon sizes from in silico data followed by a range of all possible amplicon lengths including the very rare ones in parenthesis.

Example 14

Fuel samples may contain chemicals and additives that negatively affect PCR efficiency specifically by inhibiting the activity of polymerases from amplification of internal controls and/or target DNAs. Example of known PCR inhibitors that are present in oil samples include, but not limited to, phenolic compounds, humic acids, and heavy metals. Several strategies can be done to overcome inhibition—washing of pelleted material after centrifugation and prior to cell lysis and DNA purification, serial dilution of purified DNAs and using minimal template input for amplification, use of several filtration methods before and/or after DNA purification and prior to amplification, or combination of processes depending on the severity of contaminating inhibitors.

The presence of inhibitors in a sample may be an inherent or intermittent characteristic of a sample type or source, and it may be known or unknown to operators. To protect against the presence of unknown inhibitors, the incorporation of an internal PCR control into the multiplex is valuable. In the setting of a negative result for contamination with the expected internal control amplicon of the expected signal strength, the presence of an inhibitor can be effectively ruled out. In contrast, low microbial signal in the absence of the internal control amplicon indicates the strong possibility of the presence of one or more inhibitors. More than one internal control can be utilized per multiplexed assay, and the dye label(s) utilized may fall into the size standard or within a reserved portion of one of the dye labels utilized for microbial detection.

There are many methods known in the art to remove inhibitors, and these may be performed prior to a Rapid DNA run or within the biochip during the run itself. This example illustrates use of a quick and simple method that relies on removal of PCR inhibitors by passing purified extracts/eluate through a resin-packed reservoir that works by trapping small molecules (including PCR inhibitors) that have molecular weights below the resin's exclusion limit, while passing the high molecular weight DNA in the flow-through in a single step. High DNA recovery and PCR inhibitor removal require optimal resin-to-buffer ratio and filtration speed.

Figure 17A:
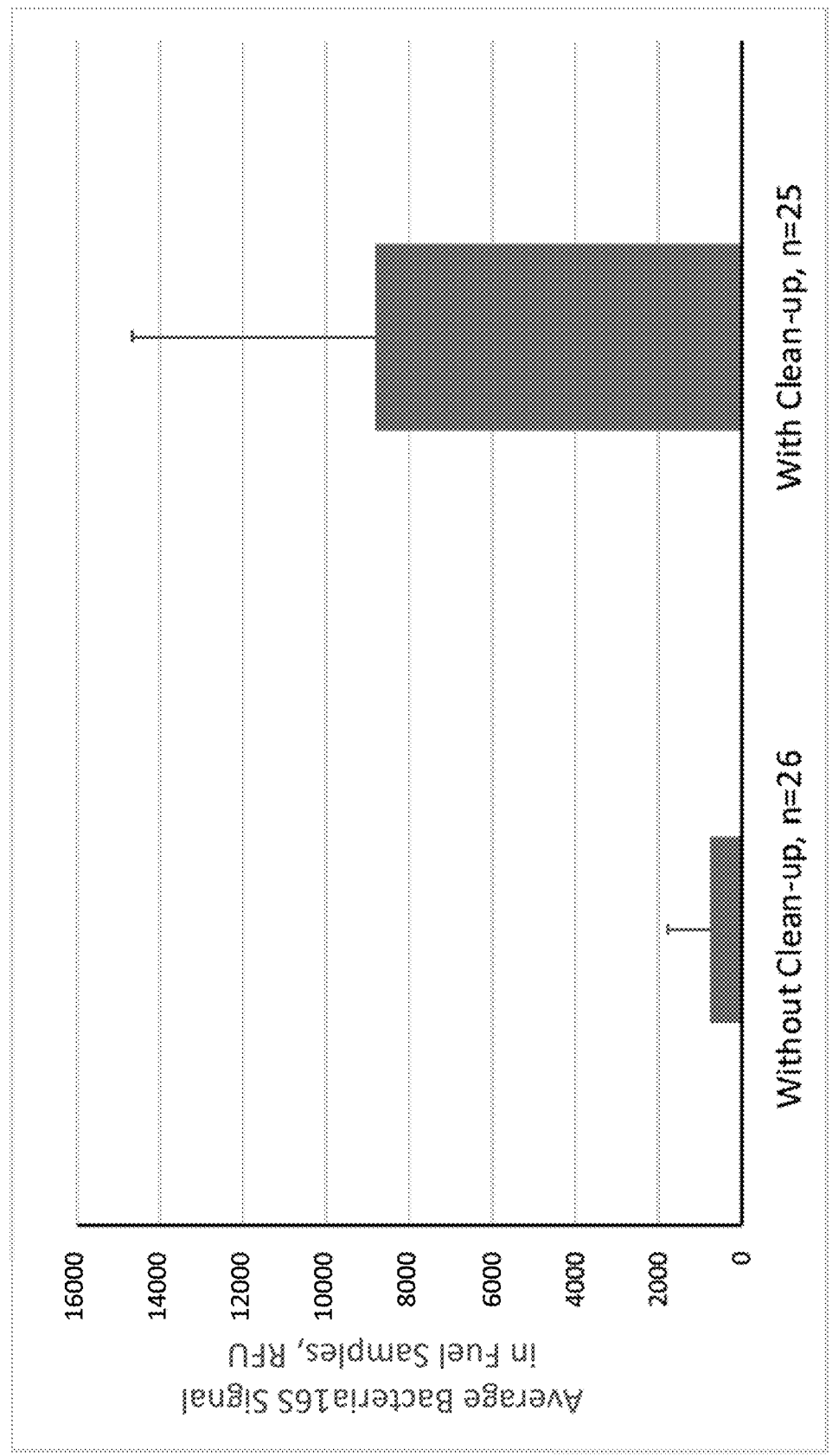
Figure 17B:
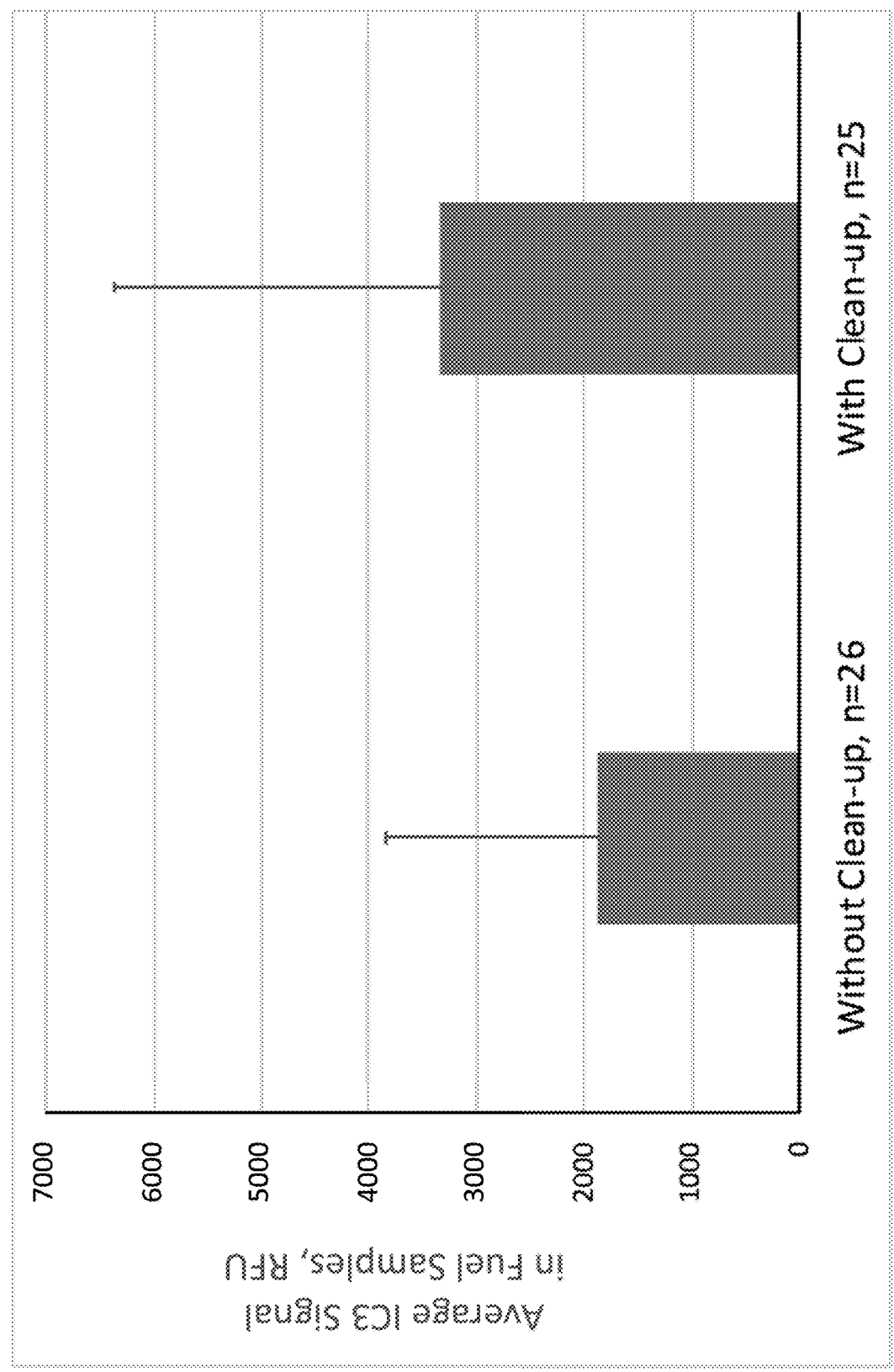

The PCR Inhibitor "clean-up" via resin method was demonstrated using the General Fuel 6-plex PCR assay initially on select fuel samples collected from oil tanks that failed to amplify the internal control. Analysis of PCR efficiency revealed not only a "rescue" or improvement in the internal control signal but also in significant increase in the detection of the general targets when compared to the same purified DNA not subjected to clean-up. The experiment was then carried out with several other samples with internal controls either positively or negatively amplified. FIG. 17A shows the analysis of signal generated from the bacteria 16S amplification (T1), which was the dominant taxonomic group present in the fuel samples tested and FIG. 17B shows the analysis of the signal generated from amplification of the internal control (IC3). Data from average signal in relative fluorescence units (RFUs) demonstrates the value of eliminating inhibitors to achieve optimal PCR efficiency. Depending on the degree of contamination, samples may be passed through the resin more than once and/or diluted (e.g. 5-10 folds or 10-50 folds) after the initial passage through the resin and before amplification to further improve PCR efficiency.

Example 15

DNA polymerases are enzymes responsible for DNA amplification and DNA sequencing reactions. The choice of DNA polymerase to use for the multiplexed PCR assay is critical for assay robustness, specificity, sensitivity, yield, and time-to-result. Different DNA polymerases have varying degree of activity and performance even with the most optimal primer concentrations and PCR buffer conditions used. For Rapid DNA applications, the ideal enzyme should amplify the desired products with high yield, should exhibit good processivity and fast extension rates, and should have inherently high stability to withstand stabilization and lyophilization processes and downstream storage. These conditions were met when selecting the enzyme used in the freeze-dried PCR reactions stored in ANDE A-Chips and I-Chips. There is at least one condition that is as equally important as those described above for selecting a suitable enzyme for use in the microbial-detection-in-fuel multiplexed PCR assay. Typical DNA polymerases for PCR use are isolated from a heat-tolerant bacterium *Thermus aquaticus* and then overproduced in *Escherichia coli*. It is therefore advantageous that the enzyme should be free from any nucleic acid contamination (including human, fungal, and particularly bacterial due to the source of manufacture) that may lead to false positive results. An ultra-clean enzyme resulting from ultra-clean quality control measures is optimal. DNA polymerases with minimal bacterial DNA include (but not limited to) DNA-free Moltaq 16S/18S and Hot MolTaq 16S/18S (MolZym, Bremen, Germany); and Platinum Taq DNA Polymerase (Thermo Fisher Scientific, Waltham, MA); MTP Taq DNA Polymerase (Millipore Sigma, St. Loius, MO); and Clean Taq DNA Polymerase (Rx Biosciences, Gaithersburg, MD).

Figure 18A:
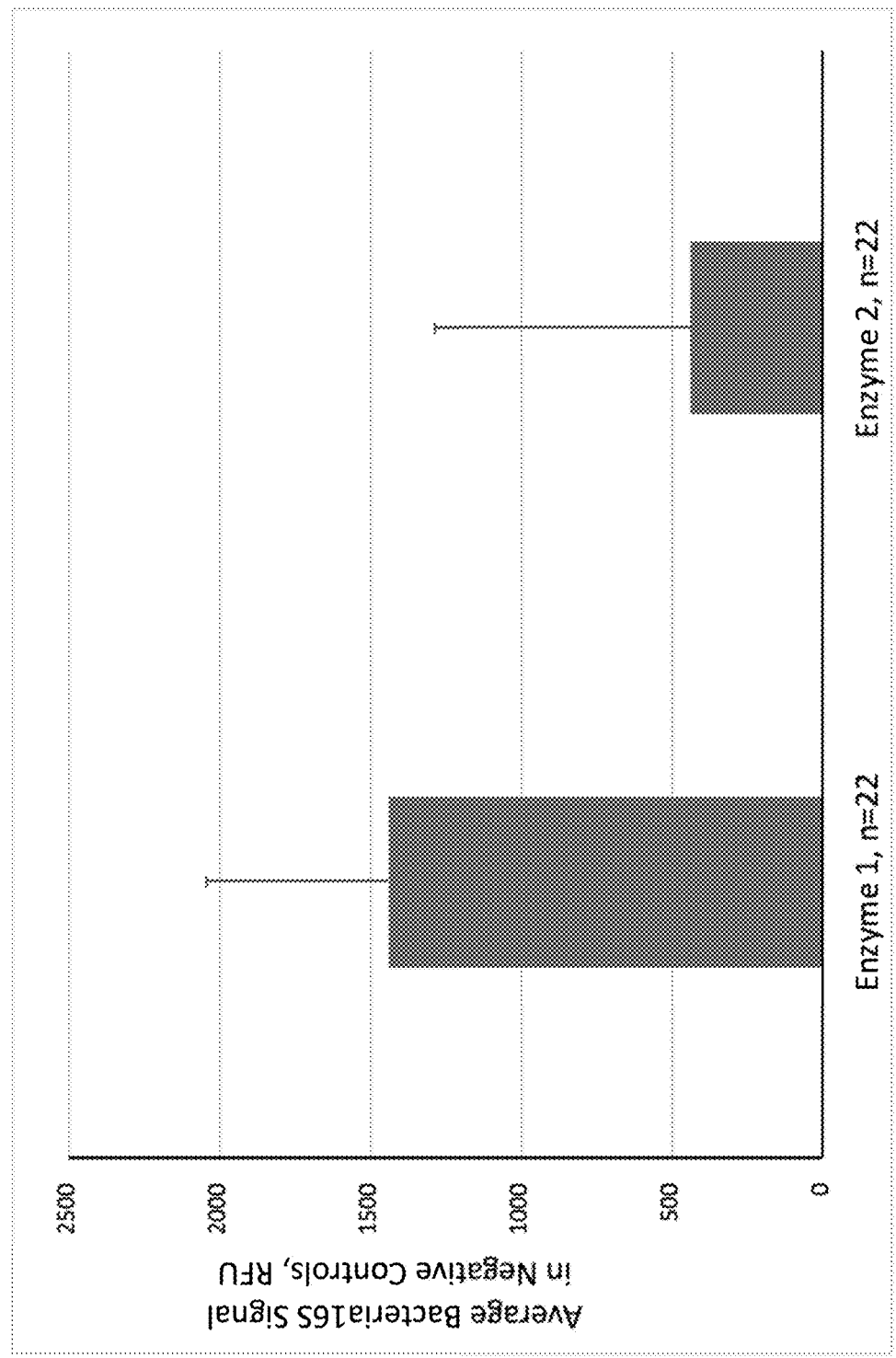
Figure 18B:
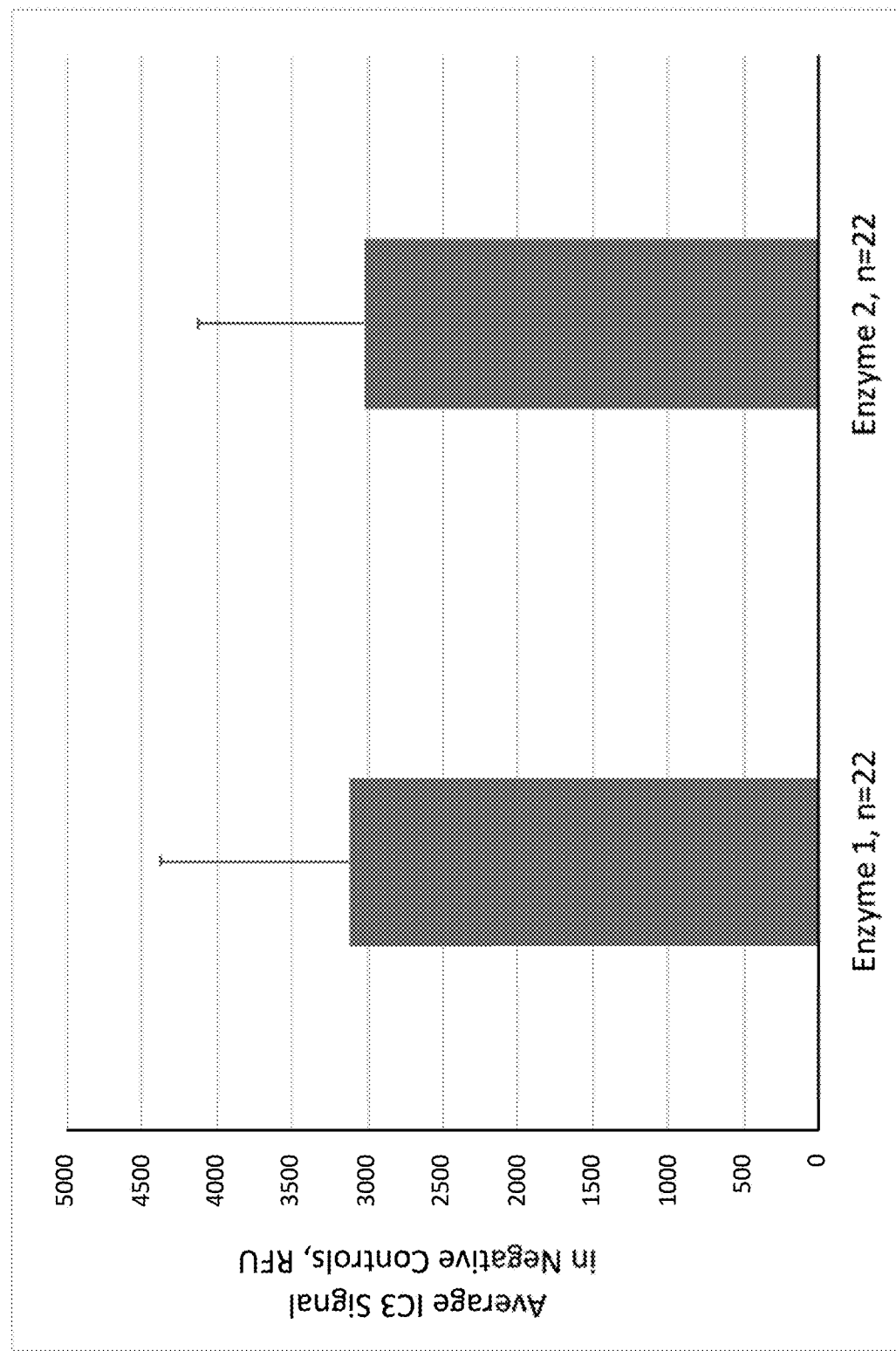
Figure 18C:
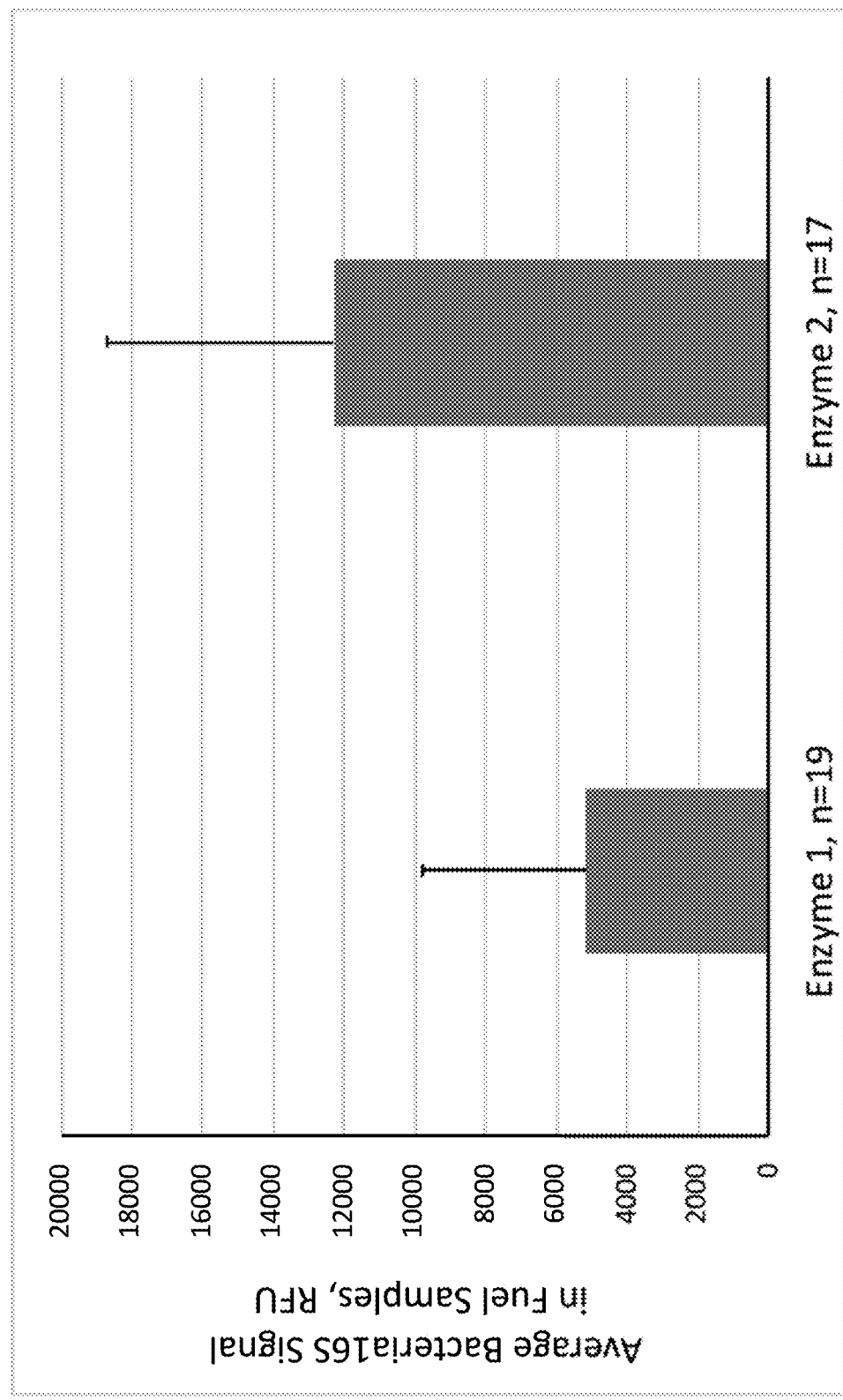

This example illustrates the need to choose a 'cleaner' enzyme while still processing samples in a facility operating under strict stringent clean environment. A significant decrease in signal of the general bacteria 16S target in negative controls (only TE-4 and water), was achieved with "clean" Enzyme 2 than compared with Enzyme 1 (FIG. 18A) without affecting the signal of the internal control (FIG. 18B). Interestingly, using Enzyme 2 also improved overall detection signal of the targets as represented by the bacteria 16S (FIG. 18C), the dominant taxonomic group present in the fuel samples tested. Decreasing the primer concentration for the general bacteria 16S target decreases the background signal in the negative controls down to the noise level while maintaining the signal of the bacteria 16S. Final optimization to achieve better overall balance and signal intensity while minimizing noise involved changing primer concentrations of the taxonomic targets and final enzyme concentration.

Example 16

This example illustrates fuel-specific assays that target major microbial contaminating targets in a particular petroleum product and under the variety of conditions to which it may be subjected (e.g. temperature, pH, pressure, atmospheric exposure due to tank vents and suction line configurations, storage tank and pipeline design, and chemical additives). The type of damage inflicted by microorganisms on crude oil and oil products depends on the microbial community composition, abundance, present metabolic conditions, and the type of the fuel. Among the most significant primary damaging activities are hydrocarbon degradation, sulfate reduction/sulfide production, organic acid production, biomass production, and biofilm formation leading to microbially influenced corrosion (MIC), equipment wear and engine malfunctions. Though these effects can manifest themselves in different types of petroleum products, certain microorganisms thrive and form a complex ecological niche, with biodeterioration processes accelerated in certain fuel types. The chemical content is different from each of the fuel types and this concomitantly establishes specific composition of the microflora causing deterioration.

Various factors influence microbial growth including hydrocarbon chain length/chemical composition of a petroleum product, water content, presence of additives (stabilizers, biocides and anti-freezing agents), degree of aeration, temperature, and pH. The presence of water and its subsequent accumulation is a primary prerequisite for microbial growth in fuels and oil and their subsequent biological fouling. Particularly as important as water content is the length of the carbon chain which gets progressively longer in different fuels fractions from gasoline through kerosene and finally to diesel. Gasoline is partially protected from microbial growth due to shorter carbohydrate chain length that may have a solvent effect on cell walls and membranes. Jet fuel (e.g. kerosene) has the hydrocarbon chain length most readily utilized by microorganisms, but it often includes anti-icing additives that have biostatic activity. Diesel fuel suffers from significant microbial contaminations, in part because additives used to fight aging instability may serve as a source of nutrients for contaminating microorganisms while reduced permitted sulfur content in improved pollution control diesel allows enhanced microbial activity. In addition, some countries implement mandatory addition of biofuel blends in an effort to control environmental pollution, but such blends have a propensity to support microbial growth. Therefore, different fuel types may benefit from targeted assays allowing the most effective identification of their major microbial contaminants. The assays are designed to be specific to the genetic sequences of the target groups of species even if highly similar genes are present in other organisms.

The same ubiquitous taxonomic 16S, 18S, and physiological targets mentioned in the general assay allowing detection of essentially any possible microbial contamination have been utilized; and group-specific targets were also identified which can be incorporated in a separate multiplexed assay or can be added to the general assay. Note that the amplicon signal for the general detection targets increase proportionally with increase in number of microbial types within each taxonomic group. Therefore, to create a better balance in amplicon signal among the group-specific targets and avoid excessive signal from the generated from the General Fuel assay targets, the primer pairs for the ubiquitous taxonomic classifications (e.g. the primers in the General Fuel assay) may be excluded in the multiplexes of this Example if desired. Note that the tables presented in FIGS. 19, 20, and 21 list the targets for the expanded multiplexed assays for each fuel type and included the primer pairs for the general assay; these may be excluded if desired.

The group-specific targets include (but are not limited to) the highly variable intergenic areas of the ribosomal RNA encoding regions (23S_ITS_5S for prokaryotes and 18S-ITS1-5.8S-ITS2-28S for eukaryotes) and other genetic regions that serve as effective taxonomic determinants. The high level of variability in such regions allows creation of a specific amplicon for each separate species and/or genus. In addition to the targets identifying the presence of the microorganisms in question, the assays may include additional targets conferring the capability to identify the presence of functional groups considered highly-damaging to specific types of fuel, such as sulphate-reducing or methanogenic microorganisms. In some cases, identical physiological targets described in the general assay are included in the fuel-specific assays. Specificity of the assay was enhanced not only by considering positions in gene regions that did not have any homologies in the nontarget organisms but also by choosing primer binding sites that have mismatches. For example, at least 1, 2, 3, 4, 5, 6, 7, 8, 9, or 10 mismatches within the nontarget sequences, at least 1, 2, 3, 4, or 5 mismatches within the 10 nucleotides closest to 3' of the primers, and at least 1 or 2 mismatches within 4 nucleotides closest to the 3' end. In certain cases, wherein, high number of mismatches were not available, additional approaches were utilized to increase specificity which also provided a balance between reducing nonspecific binding and promoting desired amplification. These approaches included:

Design of primers to have mismatches to nontarget sequences within 3 nucleotides from the 3' end. Location of the mismatches (3', 3'-1, 3'-2) in accordance with primer's sequence was chosen so that the Tm difference for target and nontarget sequence is at least 2.0-2.5° C.

Figure 22:
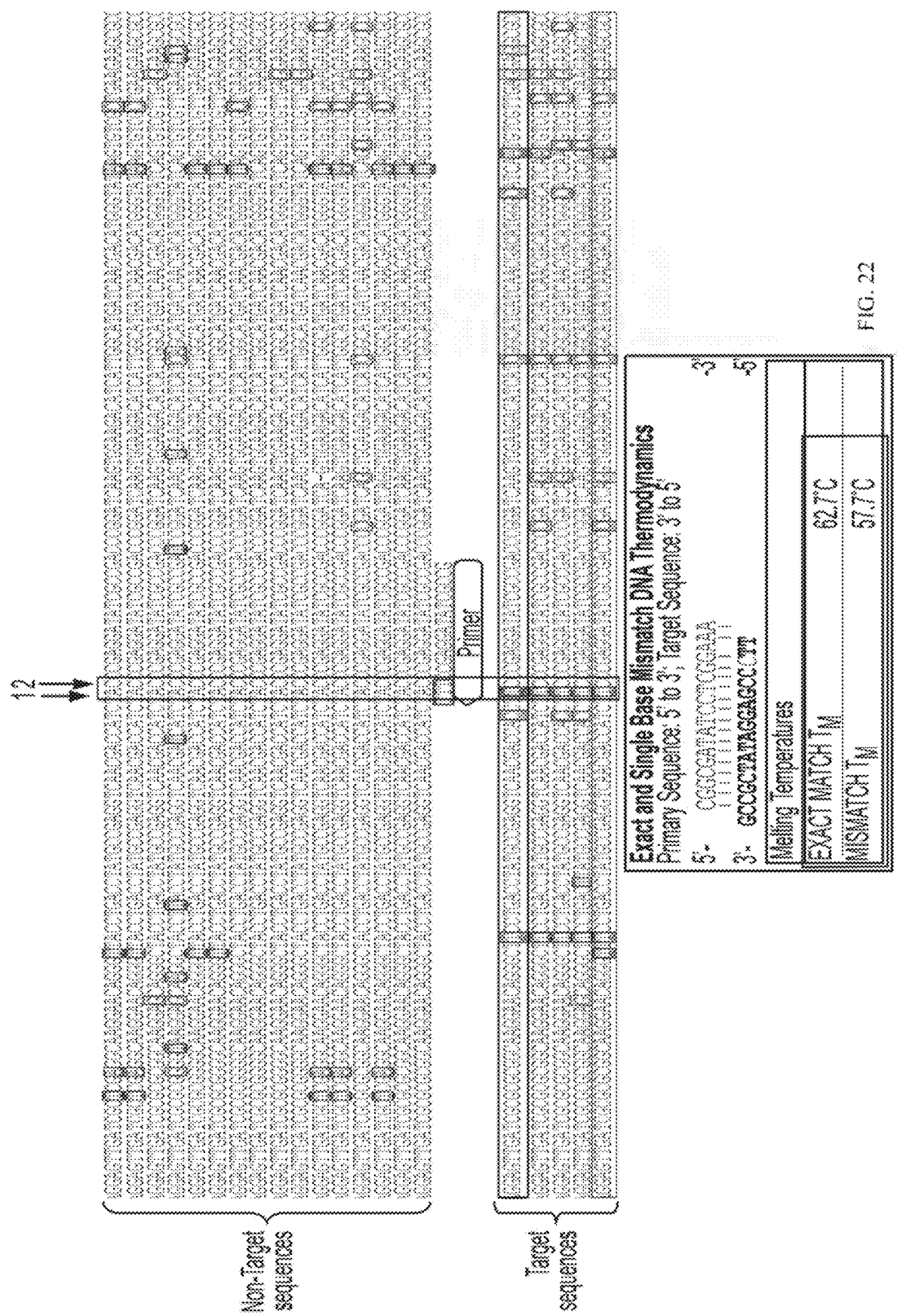

Addition of extra mismatches right next to the original mismatch described in the above approach (to positions 3'-2 or 3'-1) creating primer with one mismatch to target sequences and two consequential mismatches to nontarget sequences. The extra mismatch was chosen so that it reduces Tm by 2.0-2.5° C. FIG. 22 shows a representative alignment in Geneious 11.1.5 software with arrows indicating 1) a natural mismatch between target and not target sequence variants and 2) additional artificial mismatch created in the oligonucleotide. Tm is modeled in silico using Oligo Analyzer tool by IDT.

Truncation of primers if/when necessary by removing some nucleotides from 5' end and getting primer's Tm 1-2° C. below the annealing temperature optimized for Rapid DNA assay. FIG. 23 shows an in silico Tm modeling in Oligo Analyzer tool by IDT with arrow indicating nucleotide removed from 5'.

Elongation of the primer at 5' end by adding a few nucleotides making the binding complex kinetically unfavorable in cases where the primer binding region is AT-rich. FIG. 24 shows an in silico Tm modeling in Oligo Analyzer tool by IDT with arrow indicating nucleotide appended to 5'.

Selection of primers eliminating GC pairs within first two positions from the 3' end.

Taken together, these approaches have been and can be utilized to generate a wide range of effective multiplexed assays. Many approaches to primer design are well-known in the art and can be utilized to generate primers for the multiplexed assays of the invention. As new organisms are identified via whole genome sequencing, primers can be selected and designed using the teachings of the invention.

Although various microorganisms can be detected in the aircraft fuel tanks, major damage is inflicted by sulphate-reducing microorgansims (SRMs) as they cause storage tank corrosion and by filamentous fungi such as *Hormoconis resinae* as they benefit from high level of aeration during flights. In addition, *H. resinae* causes clogging of filter and pipes and are capable of growing between the fuel and water and attaching to the tank so they are not drained during water exchanges (as are other microorganisms that primarily grow in the water phase). Other filamentous fungi frequently found in jet fuel are *Aspergillus penicillioides* and *Aspergillus fumigatus*. *A. penicillioides* has been demonstrated to accelerate steel corrosion and affect thermal oxidation of jet fuels. Therefore, detection of filamentous fungi in general and *H. resinae* and *Aspergillus*, in particular, are a priority in aviation fuel monitoring. The jet fuel/kerosene assay (FIG. 19) includes the general assay excluding the mcrA target, and the two specific targets to detect *H. resinae* and *Aspergillus* species.

Multiple microorganisms have been discovered in diesel fuel, and the direct damage is inflicted by degradation of hydrocarbons and non-hydrocarbon fuel components that compromises fuel quality while in the same time changes the conditions and makes them more accommodating for the growth of additional microorganisms leading summarily to MIC, sludge formation causing filter and injectors clogging, etc. Therefore, it is important to detect the major organisms commonly found in diesel fuel to allow taking specific steps for elimination of the particular contaminant that threatens the fuel lot. A specific assay for diesel fuel is presented in FIG. 20. A specific assay of identifying the microorganisms most frequently detected in gasoline is presented in FIG. 21.

Figure 26:
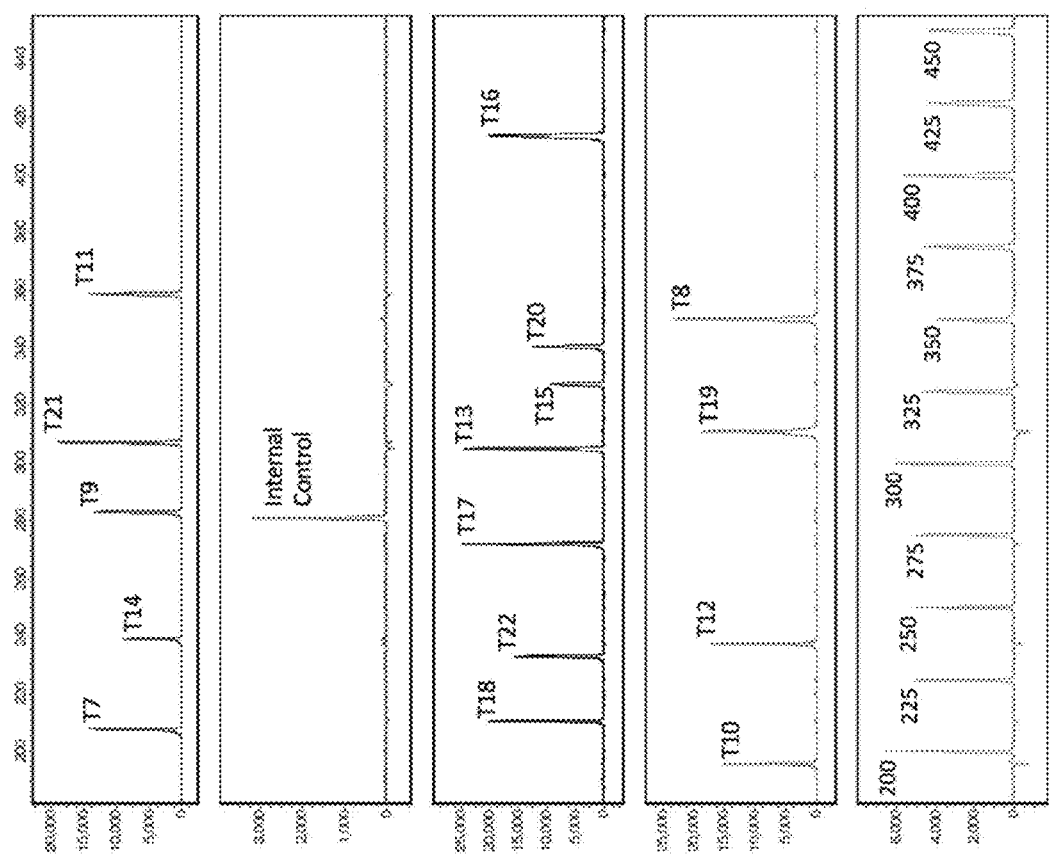
Figure 27:
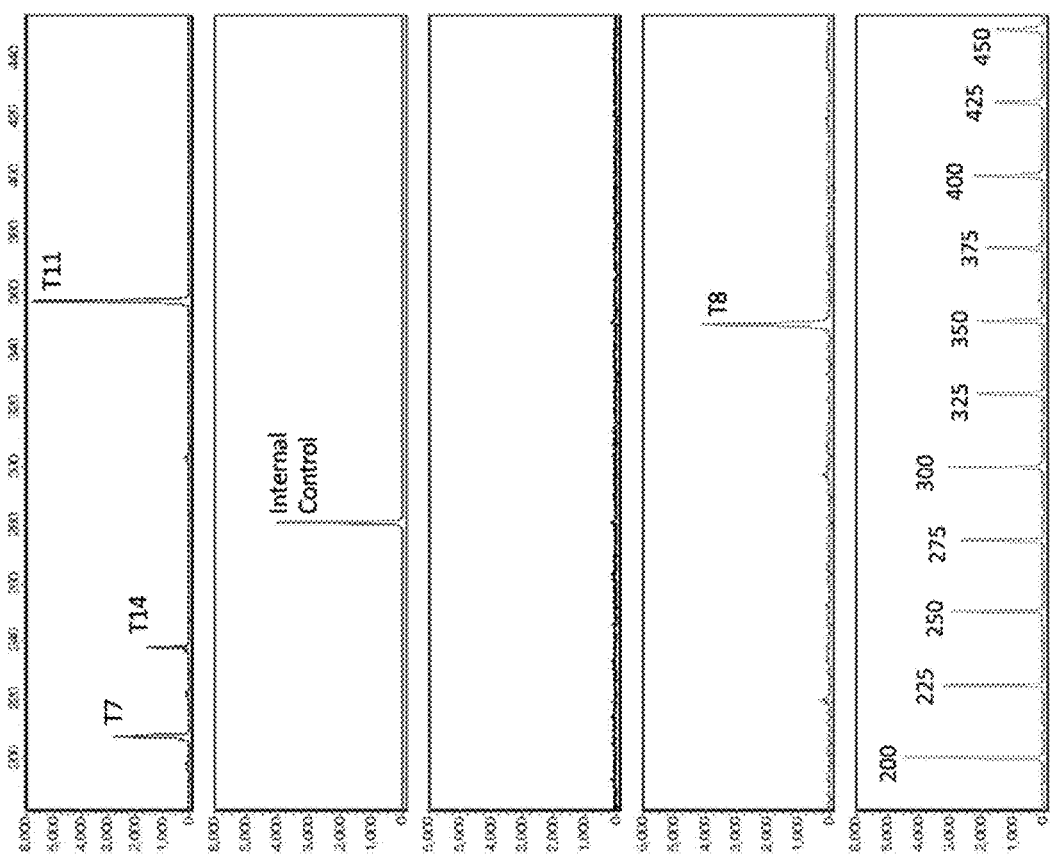
Figure 28:
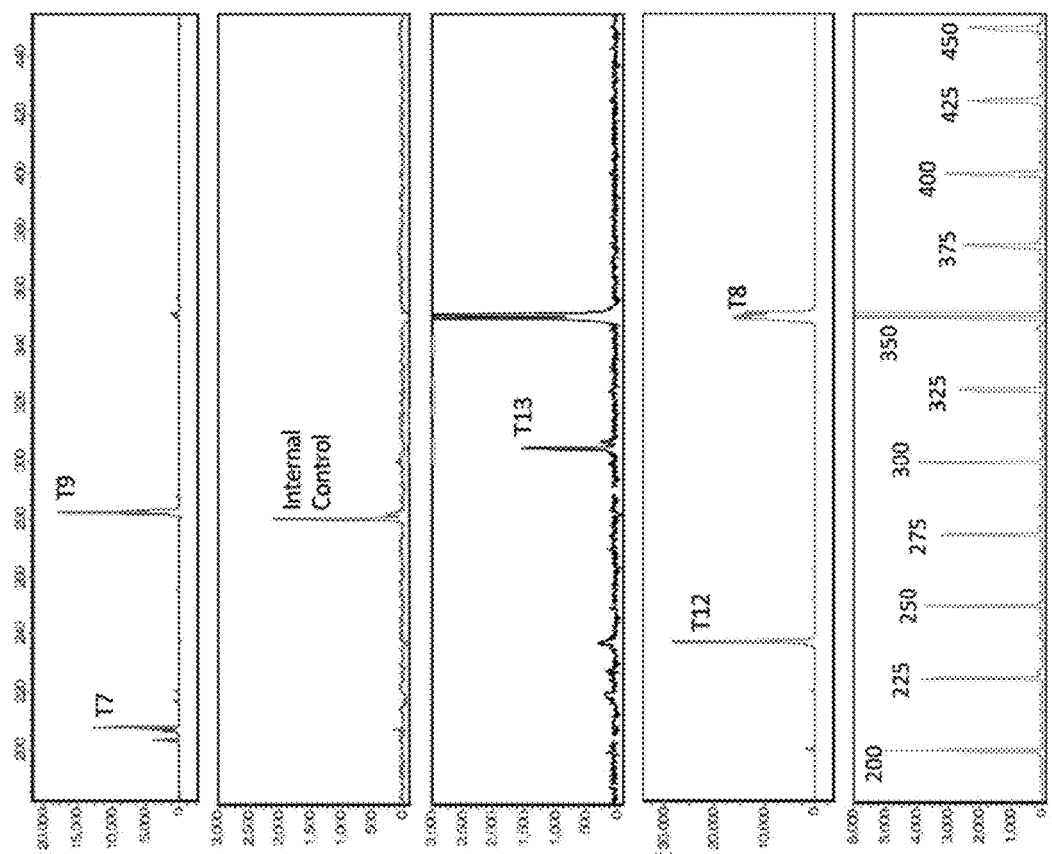

An Expanded Fuel Assay (FIG. 25) was developed for rapid detection/identification of common microbial contaminants present in different fuel types—jet fuel/kerosene, diesel, and gasoline by iterative addition of primers for each target. During the assembly of the highly multiplexed reaction, primer concentrations were adjusted and, in some cases, primer sequences were redesigned to achieve efficient amplification and to avoid any close overlap of fragment sizes from the amplified products across all targets. The microfluidic PCR reaction was performed using a buffer (e.g. TE-4) spiked with representative species known to contaminate the different fuel types as listed in FIG. 19 for fuel/kerosene, FIG. 20 for diesel, and FIG. 21 for gasoline. This combined assay (also Expanded Fuel 16-plex Assay tabulated in FIG. 25) consisted of 16 different primer pairs, T7-T22 with SEQ ID NOs: 17-48 noted in FIG. 48 (excluding the internal control, SEQ ID NO:53 and SEQ ID NO:54), with each primer pair responsible for amplifying a unique species. FIG. 26 shows the simultaneous amplification and detection of these 16 targets with TE-4 spiked with the representative species listed in FIG. 25 (*Pseudomonas aeruginosa, Bacillus cereus, Desulfovibrio vulgaris, Aspergillus nidulans, Clostridium beijerinckii, Hormoconis resinae, Candida albicans, Halomonas alkaliantarctica, Bordetella pertussis, Burkholderia cepacia, Fusarium keratoplasticum, Marinate aquaeolei, Desulfotomaculum nigrificans, Achromobacter denitrificans, Penicillium chrysogenum, Flavobacterium oceanobacteria*) at 100 genome equivalents each as template and microfluidic PCR completed in under 25 minutes. Primers for these targets were fluorescently-tagged with different commercially available dyes to effectively visualize the amplicons—6-FAM or fluorescein (6-FAM phosphoramidite) is a blue dye used for T7, T9, T11, T14, and T21; ROX or 6-carboxy-X-rhodamine Succinimidyl Ester is a red dye for T8, T10, T12, and T19; TAMRA Amidite (N-TAMRA-Piperidinyl), 5,6-Carboxy is a yellow dye (represented by black in the figures for convenient image contrast) for T13, T15, T16, T17, T18, T20, and T22; and JOE or 6-carboxy-4',5'-dichloro-2',7'-dimethoxyfluorescein is a green dye for the internal control. FIGS. 27 and 28 show representative data generated from the Expanded 16-plex Fuel Assay on two real-world fuel samples obtained from commercial fleet tanks. *Pseudomonas* species (T7), *Bacillus* species (T14), *Clostridium* species (T11), and Flavobacteriaceae species (T8) were positively identified to contaminate one sample (FIG. 27); and *Pseudomonas* species (T7), Desulfovibrionaceae species (T9), *Bordetella* species (T13), *Achromobacter* species (T12), and Flavobacteriaceae species (T8) were detected in the other sample (FIG. 28). These data show functionality of the highly multiplexed assay for identification (genera level) of microbial contaminants in fuel samples.

Example 17

Figure 29:
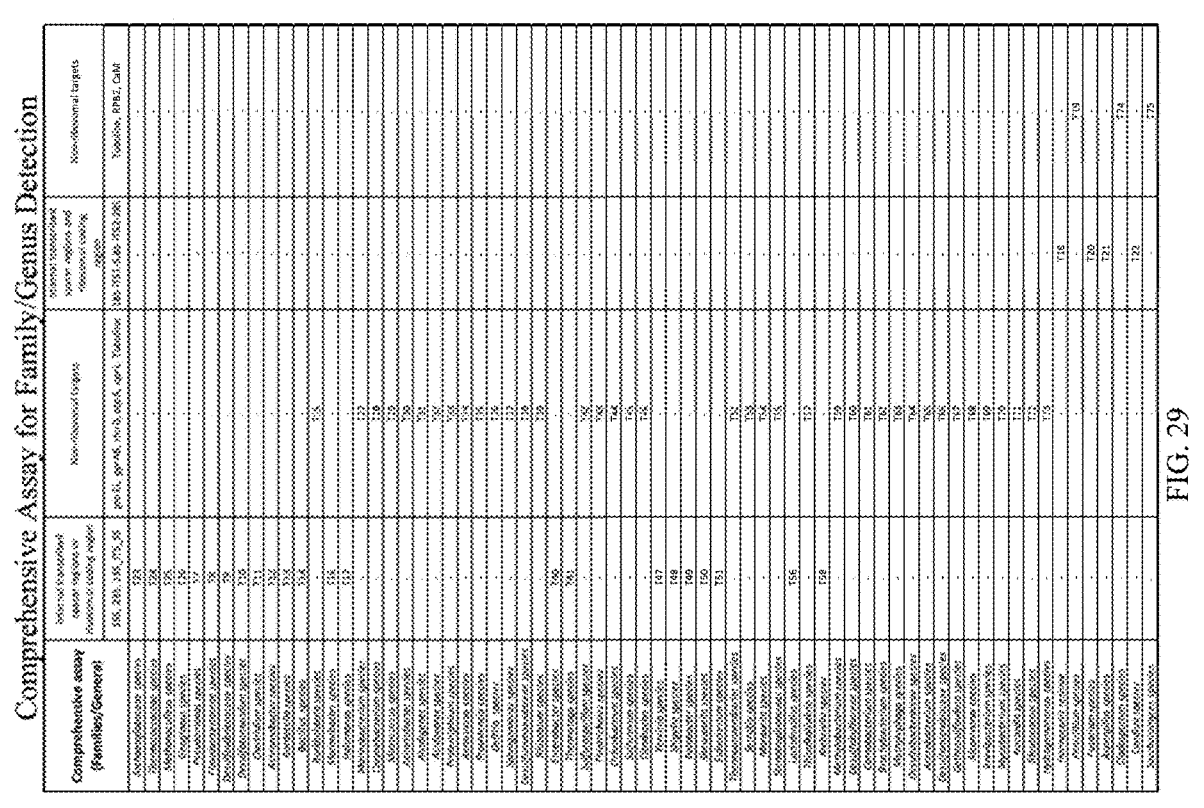

This example shows a comprehensive identification of all major microorganisms found in petroleum products of various origins at a genera/family level. Unlike any other fingerprinting techniques such as those based on culture methods, denaturing gradient gel electrophoresis and DNA sequencing, the highly multiplexed 69-plex assay (simultaneously interrogates 69 targets/gene regions tabulated in FIG. 29) can rapidly, directly, and unambiguously target 69 genera (also listed in FIG. 29) simultaneously in a single microfluidic PCR reaction in approximately 25 minutes; using the ANDE Rapid DNA system, the assay generates actionable results in less than two hours. To avoid interference between multiple and sometimes highly similar amplicons belonging to different detected taxonomic groups, targets were distributed throughout multiple variable genomic regions (e.g. ribosomal internal spacer regions and additional gene sequences known to be useful taxonomic determinants). Primers for these targets are fluorescently tagged with different commercially available fluorescent dyes (e.g. blue, red, yellow, green, purple, orange) for effective visualization along with amplicon sizing differences. As genome sequences become readily available for other microorganisms and updated as some microorganisms are renamed and reclassified, it is expected that the assay will be modified based on these changes.

The assays of the invention can be readily practiced with a wide variety of targets (including but not limited to those described in the Examples). Said assays also can be adjusted to have more than 5, more than 6, more than, 7, more than 8, more than, 9, more than 10, more than 12, more than 15, more than 25, more than 50, more than 70, more than 80, more than 90, more than 100, more than 150, more than 200, more than 250, more than 500, more than 1000, more than 2500, more than 5000, or more than 10,000 primer pairs (with at least one primer pair for each target and at least one primer pair for each type of microbe to be detected). As described previously, the number of target amplicons is impacted by both the discrimination of the separation methodology (in ANDE, the number of bases that can be separated electrophoretically) and by the detection methodology (in ANDE, the number of fluorescent dyes utilized, which can be more than 4, more than 6, more than 8, more than 10, more than 12, more than 14, more than 16, more than 20, more than 24, more than 30, more than 40, more than 50, more than 100, more than more than 150, more than 200, more than 250, or more than 500). A single primer of each primer pair may be labelled, or both primers in a pair may be labelled.

A major advantage of the single base resolution of the ANDE separation and detection system is that the target amplicons of the multiplexed amplifications may vary in fragment length by as little as one base pair. The ANDE separation and detection system spans approximately 500 bases. Using a six-color detection system (assuming one color is reserved for a size standard) would yield 5×500 or 2500 unique fragment sizes that could be detected. Using a 12-color detection system (including the internal lane standard) would yield 11×500 or 5500 unique fragment sizes that could be detected. By increasing the effective separation length and/or the number of fluorescent dye labels, 10,000 or more targets can be generated and detected. It is important to note that certain microbes may be characterized by the presence of multiple amplicons, means even larger numbers of microbes can be detected than amplicon peaks generated. Clearly the teachings of the present invention enable interrogation of samples that provide information that exceeds that generated by massively parallel sequencing. Finally, the target loci need not generate amplicons that vary by a single base pair-based on the desired assay, the peaks may vary by more than 2, 3, 4, 5, 6, 7, 8, 9, 10, 11, 12, 13, 14, 15, 16, 17, 18, 19, 20, 25, 50, 75, 100, 150, 200, 300, 400, or 500 bases.

In designing and constructing the assays of the invention, several basic principles may be applied. First, in the ANDE system, each dye corresponds to approximately 500 potential peaks (amplicons); this number may vary with other detection systems. Based on the number of targets being interrogated and the number of dye-labels detectable by the instrument, the number of targets per dye-label can be selected. For example, if 50 amplicons are to be distinguished in five colors (exclusive of size standards), it would be reasonable to design the assay to place approximately ten PCR amplicons in each of the five dye-label channels, reasonably equally spaced out (e.g. Turingan (2013), *Ibid*]. It would be just as reasonable to place all the amplicons in just one or two channels, reserving the remaining channels for future addition of target amplicons. Next, for certain loci with fragment length polymorphism in the population, an appropriate size region (e.g. 2-50 bases) may be reserved to allow that variability to be captured by the assay without overlapping with adjacent loci. Another principle is based on the fact that the efficiency and intensity of dye colors vary. For a locus with a large copy number per cell, placement in a less efficient dye color channel may be prudent. Similarly, for loci that bind primers less efficiently or are present as single copies per bacterial genome, placement into efficient (higher signal) dye colors (e.g. FAM) would be appropriate. The same approach holds for RNA-highly expressed mRNAs placed in inefficient dye colors and minimally expressed RNAs in highly efficient dye colors. The goal is to generate an assay with a reasonable balance of signal strength across loci, within and between dyes colors.

Example 18

This example shows specific differentiation at the species level when members of certain genera are found in petroleum products of various origins (FIG. 30). Once the genus is detected in oil using the assay presented in Example 17, species identification for the genus is important in certain applications.

In addition to standard taxonomic targets such as ribosomal DNA regions, secondary targets are included to provide taxonomic classification when a number of closely related species need to be differentiated within the single genus. The standard ribosomal operon ITS barcoding is not ideally-suited for the highly multiplexed assay due to high variability in amplicon fragment length polymorphisms produced by different species occurring below and above the optimal size range for detection (typically 60-600 nt in the ANDE system, although the range may be extended to more than 600, more than 750, more than 1000, more than 1500, or more than 2000 nucleotides). The approach of the highly multiplexed Rapid DNA PCR assay creates either single amplicons for each primer pair or a small number of amplicons with various length, with each amplicon size specific for certain groups/species due to short indels. Since there are only a limited number of such primers that can be placed within one region for amplification of a desired genus, multiple targets are included in the assay.

A general ribosomal DNA is used to detect the kingdom, and an additional target, also located in the ribosomal region is used for genus differentiation. A third target (located either within the same ribosomal target but different region or in other functional gene targets) provides species identification. In case of high sequence variability within the target taxonomic group, more than one amplicon is utilized to include all sequence variants into the detection assay. As an example, the oil-degrading *Pseudomonas* species included in the assay for species detection (FIG. 30) are *P. aeruginosa, P. putida, P. stutzeri, P. fluorescens, P. anguilliseptic, P. oleovorans, P. mendocina,* and *P. otitidis*. In the case of oil contamination with these species, all of them are expected to yield a general bacteria amplicon based on 16S sequence (T1). In addition, all eight species have another ribosomal DNA region-based amplicon specific for *Pseudomonas* genus (T7 in FIG. 30). Lastly, a species-specific amplicon for three species is generated from the ribosomal DNA target—T82 for *P. aeruginosa*, T83 for *P. putida*, and T84 for *P. anguilliseptica*) while the other five species (T85 for *P. fluorescens*, T86 for *P. oleovorans*, T87 for *P. oleovorans*, T88 for *P. mendocina*, and T89 for *P. otitidis*) are typed by species-specific amplicons produced from the groEL, gyrAB, oprL etc. genes. FIG. 30 shows *Pseudomonas* genus detection and 8 *Pseudomonas* species identification using 9 targets/primer pairs (a *Pseudomonas* 9-plex assay). Based on the complexity of the species genomes and number of genera present in contaminated oil products as detected in Example 17, a species-specific PCR assay can be created by grouping or combining 2 or more genera in a single reaction.

For example, a fuel sample was detected to be highly-contaminated by the bacteria *Pseudomonas* and *Bacillus*, and the fungi *Aspergillus* and *Penicillium*. A species-specific assay as presented in FIG. 30 for the 5 genera was created consisting of primer pairs for:

*Pseudomonas* 9-plex assay (described above)

*Bacillus* 7-plex (T14 for genus detection, and T76-T81 for species-specific detection focusing on groEL, gyrAB, rhoD etc. genes with selection of improved targets not involving MLST housekeeping genes)

*Aspergillus* 10-plex assay (T21 for genus detection and T95-T103 for species-specific detection focusing on the ITS/18s ribosomal region and the calcium-binding messenger protein, tubuline-encoding gene, CaM gene, and the DNA-directed RNA polymerase II subunit RPB2 gene)

*Penicillium* 6-plex assay (T19 for genus detection and T90-T94 for species-specific detection focusing on the ITS/18S ribosomal region, tubuline-encoding gene, the calcium-binding messenger protein, CaM gene, and the DNA-directed RNA polymerase II subunit RPB2 gene)

*Candida* 4-plex assay (T22 for genus detection and T104-T106 for species-specific detection focusing on the ITS/18s ribosomal region, tubuline-encoding gene, and the DNA-directed RNA polymerase II subunit RPB2 gene)

The combined 36-plex simultaneously identifies all major species belonging to these select group of organisms (8 *Pseudomonas* species, 6 *Bacillus* species, 9 *Aspergillus* species, 5 *Penicillium* species, and 3 *Candida* species). FIG. 30 shows a tabulated list of all 36 targets utilized for the combined *Pseudomonas-Bacillus-Aspergillus-Penicillium-Candida* species assay. This represents the approach that is identical for species identification of all other genera detected in oil. As noted in Example 17, genome sequences are not readily available for other species under each genus or may be subject to reclassification. Approximately 2-10 targets are interrogated for species identification per genus. These assays can be performed conventionally or, preferably, in a Rapid DNA system.

Example 19

This example describes an assay for strain-typing of certain species in contaminated oil samples. Following the Rapid DNA PCR assay described in Example 18, strain-typing is achieved by integrating microfluidic sequencing (by Sanger sequencing and/or Next Generation Sequencing) of the amplicons to reveal SNP combinations (or indels resulting in an amplicon of changed size) in the ribosomal region regularly used for taxonomic analysis and/or functional groups including the tubuline, oprL, RPB2, and CaM genes. In cases wherein more than one contaminating strain of particular species is present, a mix of amplicons is produced that is analyzed through NGS pipeline revealing presence of signature haplotypes of particular strains. FIG. 31 shows differentiation at the strain-level using the ribosomal regions as most genome submissions are based on 16S/18S plus intergenic fragments. For this example, differentiation of strains from *Pseudomonas, Bacillus, Aspergillus, Penicillium*, and *Candida* species are shown to illustrate the overall approach.

Example 20

Figure 32:
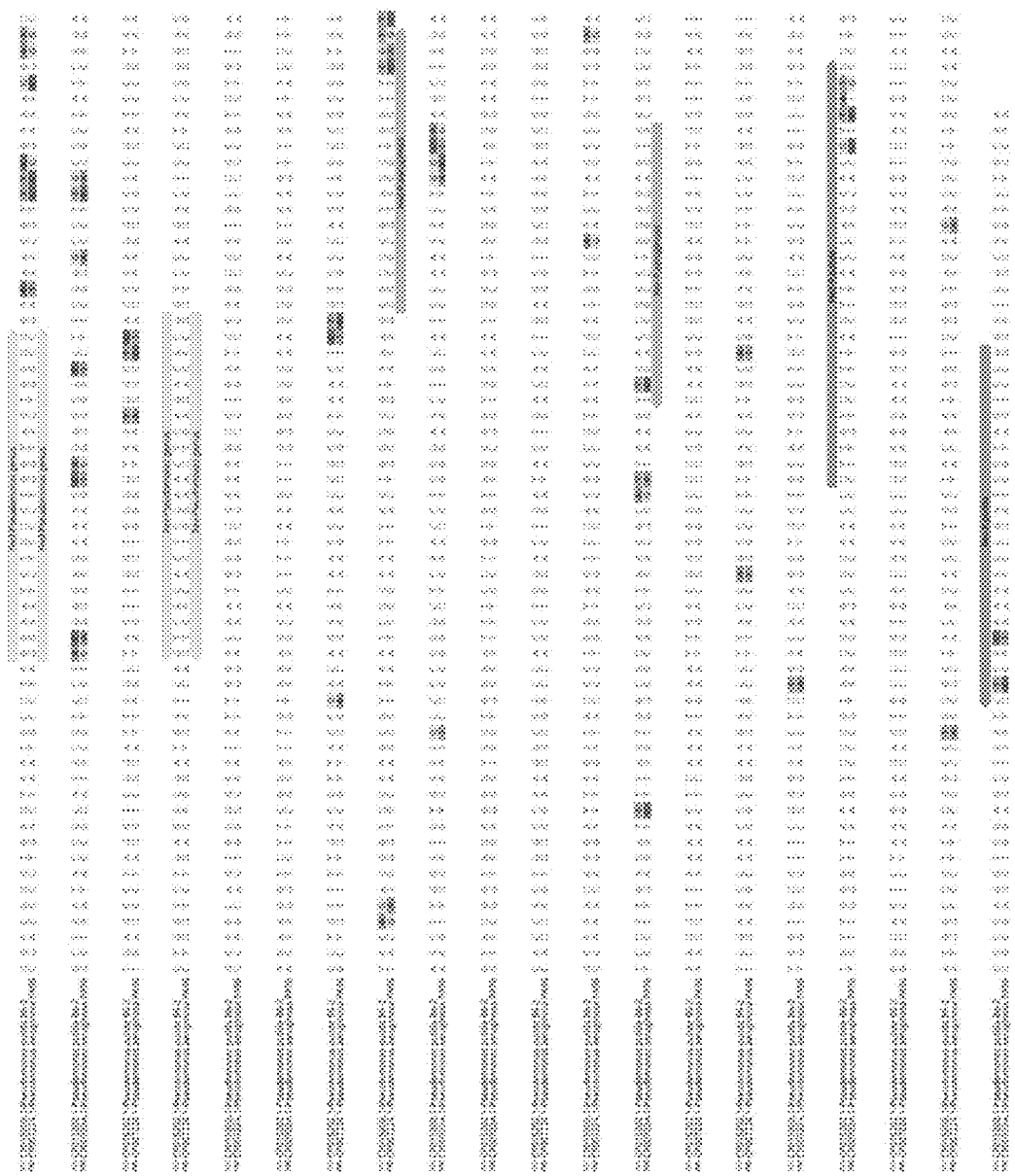
Figure 33A:
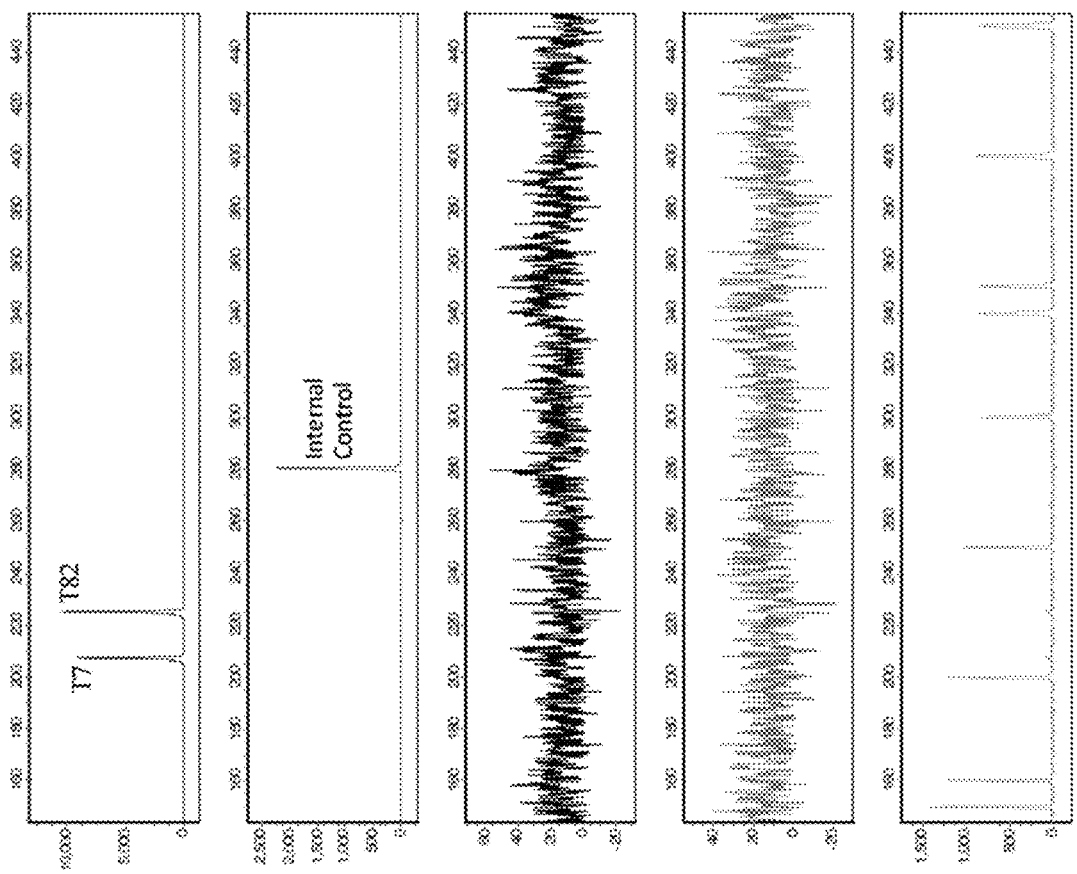
Figure 33B:
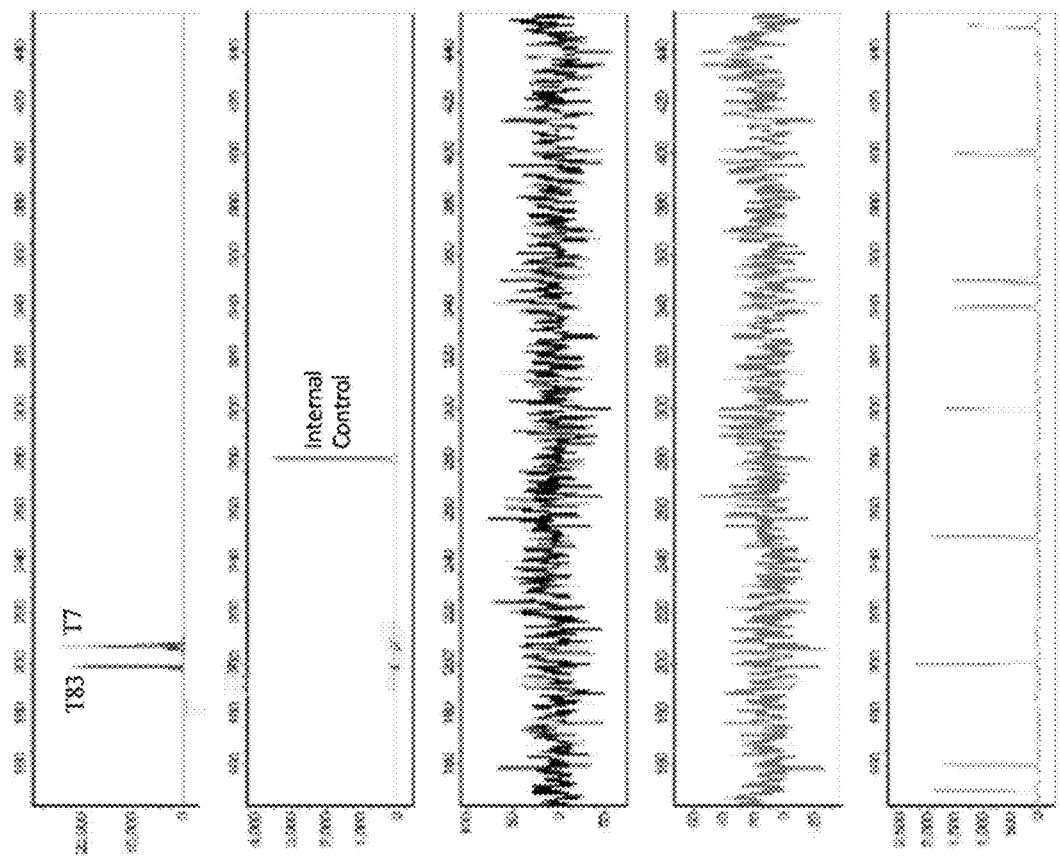
Figure 33C:
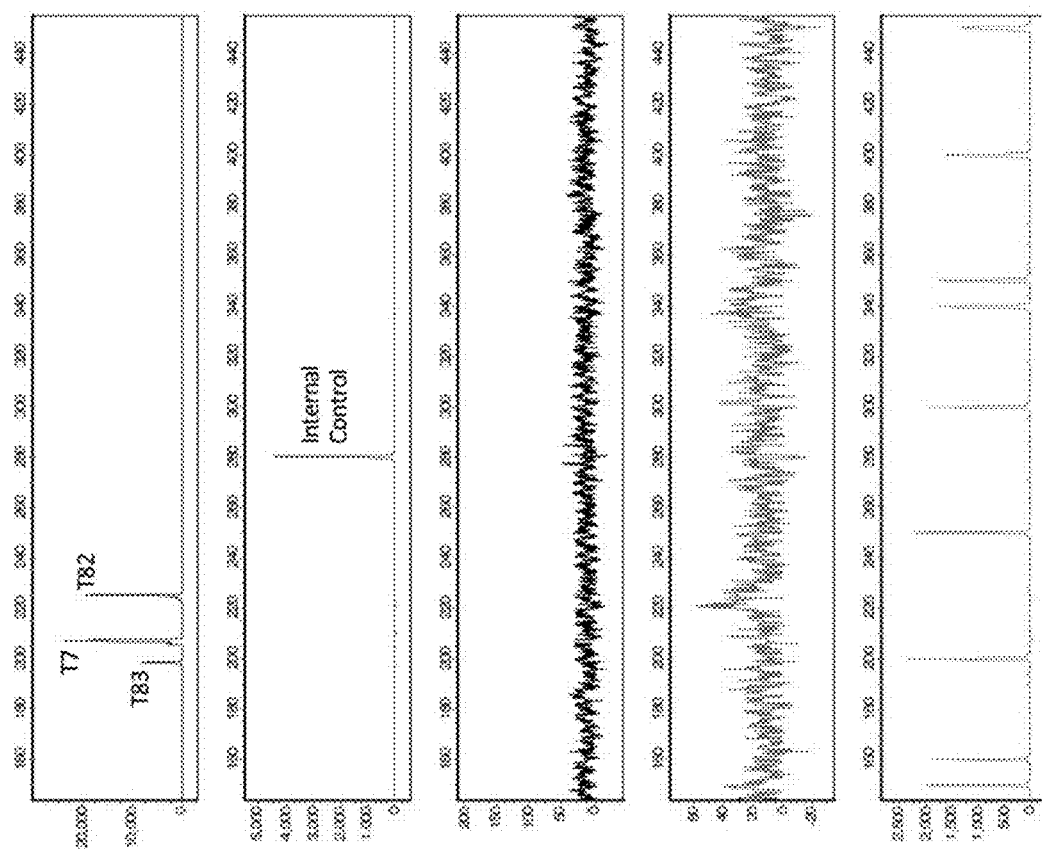

This example shows detection of *Pseudomonas* genus as well as specific detection of *P. aeruginosa* and *P. putida* species commonly present in various petroleum products and capable of producing biofilms. Oligonucleotide primer pairs were designed by placement in regions that allow optimal amplicon sizes and specific for each primer pair combinations. FIG. 32 illustrates location of the oligos within 16S ribosomal region for *Pseudomonas* genus general detection as well as for *P. aeruginosa* specific detection and *P. putida* specific detection. Primer sequences for target detection of *P. aeruginosa* (T82, SEQ ID NO:49 and SEQ ID NO:50) and of *P. putida* (T83, SEQ ID NO:51 and SEQ ID NO:52) are included in FIG. 48. FIG. 33A-C are representative profiles that show simultaneous detection of *Pseudomonas* genus with primer pair designed for T7 (amplicon size of 207 bp) and two *Pseudomonas* species, *P. aeruginosa* with primer pair designed for T82 (amplicon size of 225 bp) and *P. putida* strains with primer pair designed for T83 (amplicon size of 199 bp). The assay was validated with purified genomic DNAs from *P. aeruginosa* strain (Boston 41501) and *P. putida* strain KT2440 at 100 genome equivalents input in a 7 µl PCR reaction. Amplicons were labeled with FAM (blue dye). An internal control (IC) consisting of an artificial DNA template (MS2 phage sequence) at 50 genome equivalents and a corresponding MS2-specific primer pair labelled with JOE (green dye) was included in the microfluidic PCR assay to monitor overall PCR performance (amplicon size of 280 bp). Amplified fragments were not subjected to post-PCR clean-up. FIG. 33A shows detection of *P. aeruginosa* strain Boston 41501 at 100 copies; FIG. 33B shows detection of *P. putida* strain KT2440 at 100 copies; and FIG. 33C shows detection of *P. aeruginosa* strain Boston 41501 and *P. putida* strain KT2440 when both species are present at 100 copies.

Example 21

Figure 34:
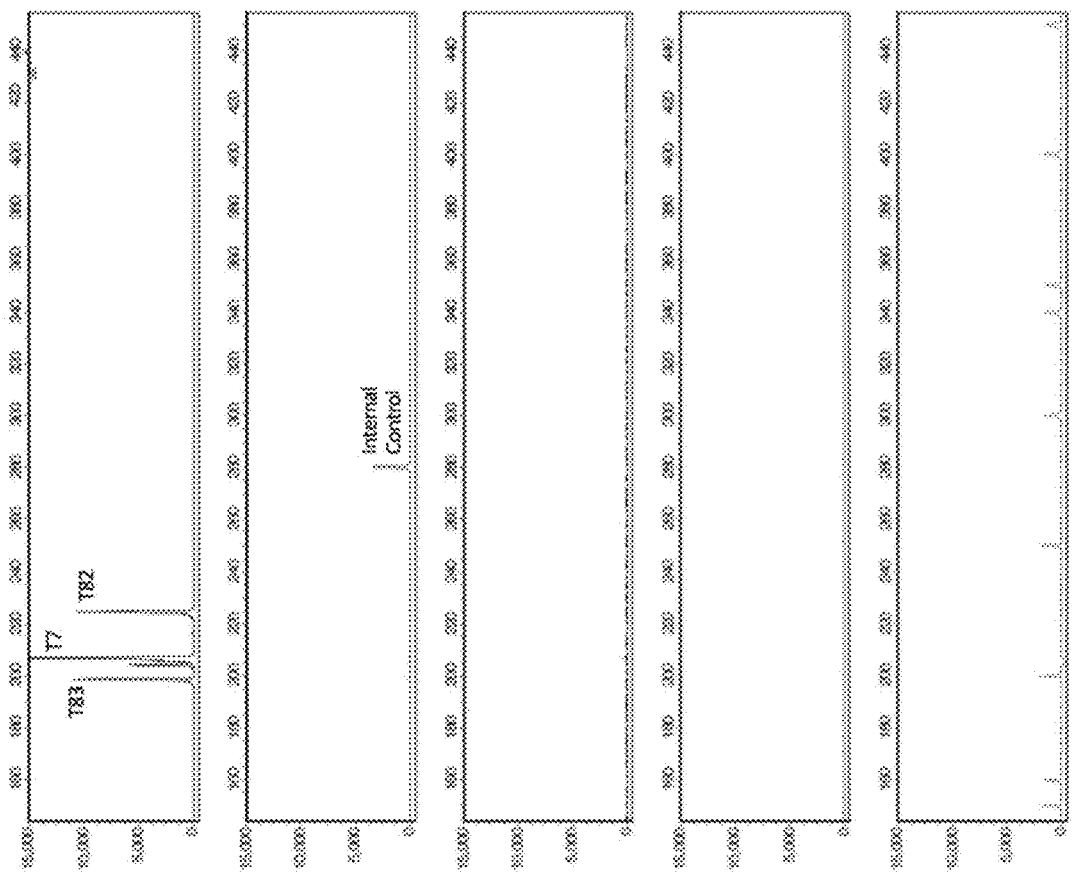

This example demonstrates general detection of *Pseudomonas* genus, and identification of *P. aeruginosa* and *P. putida* species when both are present in different oil samples as described in Examples 3, 4 and 5. Cells from both *Pseudomonas* species were added to different oil types (diesel, gasoline, kerosene, motor oil, and aviation fuels). Amplified fragments were not subjected to post-PCR clean-up. FIG. 34 shows a representative profile from detection of 100 input cells each of *P. aeruginosa* and *P. putida* when both species were added to diesel and processed as in Example 5, that is, direct oil without artificial water bottom. As expected, the T7 product for *Pseudomonas* genus was enhanced (saturated signal) due to the combined amplification of the 2 *Pseudomonas* species. T82 and T83 peaks were balanced by optimizing primer concentrations for each. The overall PCR signal of the *Pseudomonas* assay was significantly higher than that of the *Bacillus cereus* assay using the MLST targets even though post-PCR clean-up was not performed. The LOD of this assay is approximately one cell per reaction.

Example 22

Figure 35:
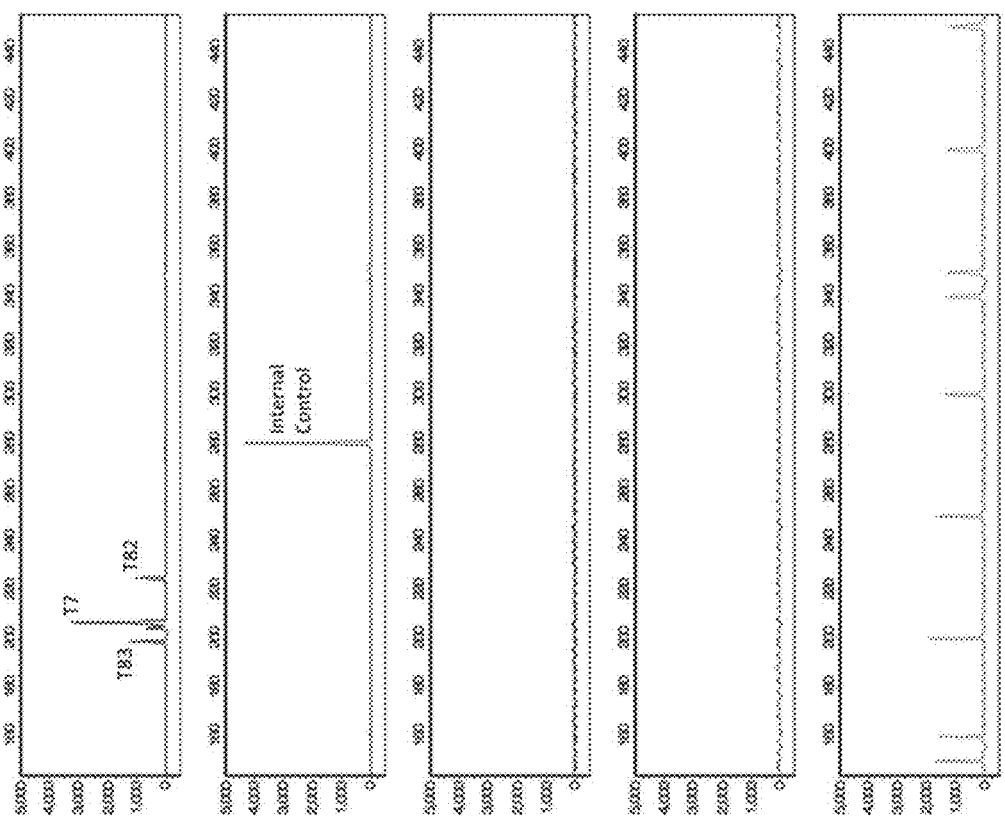

This example demonstrates sensitivity of the developed *Pseudomonas* 3-plex assay described in Examples 20 and 21. FIG. 35 shows a representative profile from detection of 10 input cells each of *P. aeruginosa* and *P. putida* when both species were added to diesel and processed as in Example 5 and Example 21. An overall 10-fold reduction in signal was observed with a 10-fold reduction in cellular input.

Example 23

This example demonstrates the application of specific detection of certain microorganisms for locating oil and gas reservoirs commonly referred to as microbial prospecting. Seepage of light hydrocarbons (C1-C4) to the surface soils above oil/gas reservoirs stimulates growth of microbial populations that utilize the short-chain alkanes as food source. Microbial prospecting is a method based on detection of light hydrocarbon-oxidizing microorganisms such as those belonging to the genera of *Alcanivorax, Brevibacterium, Corynebacterium, Flavobacterium, Mycobacterium, Nocardia, Pseudomonas*, and *Rhodococcus*, as "indicator" microbes for underlying oil/gas resources in specific geographical areas, with a reported 90% success rate. Overgrown populations of these methane, ethane, propane, and butane-oxidizing bacteria are indicative of potential hydrocarbon exploration fields and such microbial anomalies can aid in determining and prioritizing numerous locations, achieve higher chances of successful drilling, and ultimately, cut down time and cost associated with petroleum explorations.

Traditional approach to microbial prospecting is based on attempts to grow microorganisms from soil samples and estimating the number of hydrocarbon-consuming bacteria. In the recent years, more effective ways based on detection of genes associated with hydrocarbon-utilizing microorganisms have been conducted. The Rapid DNA Microbial Prospecting assay is a highly sensitive assay that includes detection of genes responsible for one of key enzymes in pathways utilizing four light hydrocarbons (methane, ethene, propane, and butane). FIG. 36 tabulates the monooxygenase gene targets specific for each hydrocarbon type. Although methane oxidizing bacteria are considered poor indicators in petroleum prospecting as they occur in the absence of deposits, it is useful to include them in the multiplex assay due to its abundance and mobility in petroleum products.

Example 24

Presence of some number of microorganisms should be expected in crude oil and fuel products considering that extraction and storage conditions are never sterile, and some contamination is inevitable. Nevertheless, not all types and levels of contamination warrant intervention. For example, there is a certain microbial level threshold which indicates a difference between fuel product that is considered acceptable and a level that requires biocidal treatment (per microbial detection techniques currently widespread in oil industry, such as ATP level evaluation).

Figure 37A:
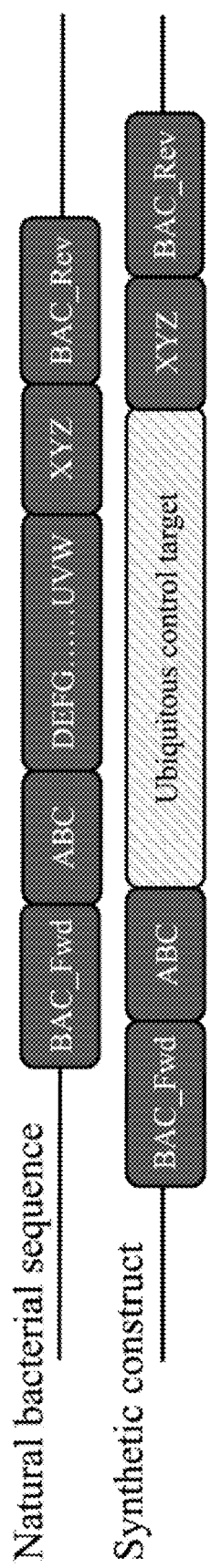
FIG. 37B shows the overall design with oligo binding sites preserved/unmodified for all quantifying constructs for the same microorganisms.

Nucleic acid amplification assay described in this invention is extremely sensitive and specific. These features are utilized for quantitation of microbial contamination level with indication of the specific agents that present a danger to the evaluated fuel product batch. For that purpose, the assays incorporate cloned synthetic internal control targets specific for each one of the evaluated microbial taxonomic groups. Such separate internal control constructs include ubiquitous nonrelated viral DNA fragment flanked by the target regions for each one of the oligonucleotide combinations utilized in each assay (FIG. 37A). Oligo binding sites are separated from ubiquitous control target sequence by linkers that represent the natural sequences adjacent to the oligo binding sites in the detected microorganisms, to keep oligo binding and amplification efficiency as similar as possible to the amplification efficiency of the contaminating microorganisms.

The size of each amplicon is designed to be unique for each target construct and is purposefully created to be different from the natural amplicon(s) potentially present in the contaminated fuel to allow differentiation between contaminating agent and quantifying synthetic construct. When quantitation is desired, such synthetic constructs are included as a part of amplification mixture at known concentration, allowing conversion of the intensity of the signal of the amplified product peaks (following separation and detection) into copy number of the contaminating agents.

FIG. 37A represents an example of quantifying synthetic targets and natural target for general bacteria detection in fuel samples. Dark colored parts in the figure represent natural bacterial sequences, while the light colored fragment is a ubiquitous viral DNA not related to the assay and functioning as a filler to create a desired length of amplicons. Oligo binding sites are marked "BAC_Fwd" and "BAC_Rev", while bacterial sequence normally adjacent to these binding suites is marker "ABC" and "XYZ" respectively.

Figure 37B:
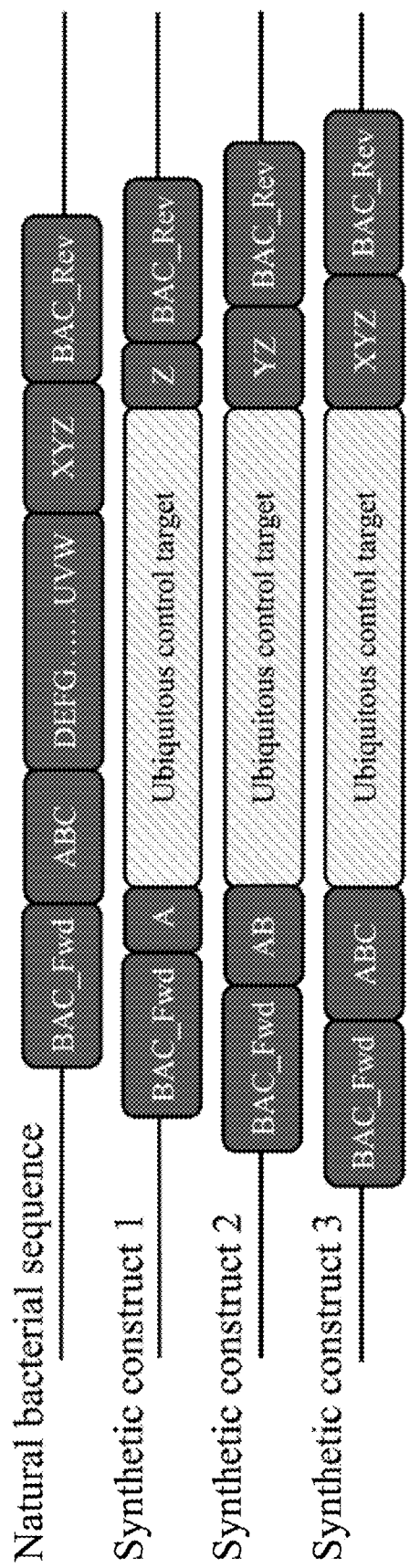

Moreover, for even more precise quantitation, numerous synthetic constructs yielding amplicons of different sizes for the same detected microbial agent can be included at different concentrations in the same assay, allowing creation of internal tuning curve for each one of the evaluated microorganisms. To ensure ubiquitous amplification of synthetic constructs, the bulk of the internal amplicon sequence is designed to be the same for all constructs, and the oligo binding sites are preserved/unmodified for all quantifying constructs for the same microorganisms, while size variability is assured by different length of the linkers inserted between the oligo binding regions and ubiquitous target and representing natural sequences normally adjacent to the oligo binding sites in the targeted microorganisms (FIG. 37B). It depicts an internal tuning curve for general bacteria detection, with dark colored fragments belonging to bacteria sequence while light colored fragment indicating ubiquitous target bulk. Oligo binding sites are marked as "BAC_Fwd" and "BAC_Rev", while natural bacteria sequences of different length (labelled as "A" and "Z", "AB" and "YZ", "ABC" and "XYZ" to indicate the variable length) are included as linkers in the synthetic constructs 1, 2, 3 to assure different size of the resulting amplicons. These synthetic constructs 1, 2, 3 are to be spiked into the assay at different known concentrations to create a quantifying internal standard curve from output PCR signals measured in RFUs. In addition to direct amplification signals, different target concentrations are represented by varying amplicon lengths.

The availability of quantifying synthetic targets spiked into fuel not only allows quantitation of the absolute load of microbial contamination in each particular sample, but also of relative contamination load when compared to other samples coming from safe (acceptable) fuel batches. Such relative load estimation is advantageous for monitoring separate fuel batches as various additives may affect the effectiveness of the amplification and the absolute yield. The applicability of such approach is, for example, in the monitoring of the dynamics of contamination load after the biocidal treatment and in monitoring of the fuel batch at various time point during its storage for timely detection of microbial growth.

Example 25

Industrial standards prescribe biocidal treatments to remediate microbial contaminations in fuel. The success of such treatment can be demonstrated using the instant invention. The overall approach is based on the loss of intact cellular structures by cells that are no longer viable following the biocidal treatment. Following treatment with biocides, microbials are lysed and release genetic material into the hydrocarbon sample. The DNA so released may be capable of being amplified and sequenced; if, for example, an amplification is performed prior to and following biocide treatment, the presence of intact extracellular DNA in fuel sample post-treatment may obscure the effectiveness of the biocide (in other words, the biocide may have been effective yet the assay detected target DNA sequences).

This example solves this problem by presenting one approach for differentiation between genetic material present within viable cells (prior to biocide treatment) and extracellular genetic material exposed in the sample (following biocide treatment) that allows assessment of biocide efficiency as determined by microbial kill rate.

The approach relies in part on centrifugation to allow phase separation and to separate the intact microbial cells and cellular debris from the exposed, extracellular genomic DNA material. The extracellular material is then selectively degraded with addition of an enzyme, DNaseI. Note than DNA degradation enzymes in addition to DNaseI can be used in this approach-many such enzymes are available including restriction enzymes (particularly frequent cutters), other endonucleases, and exonucleases. DNA may also be degraded using physical methods.

Mock fuel samples were prepared by adding 200 µl of buffer (e.g. 1×PBS, or a preferred solution to prevent cells from lysing while providing an optimal chemical environment for downstream processing) to 800 µl of diesel fuel (previously determined to be negative for microbial contamination) and spiked with 500 ng of purified Bacillus DNA and live Pseudomonas cells (approximately 1×106). This allowed clear distinction between DNA present extracellularly and intracellularly. The resulting sample was mixed by multiple inversions and then subjected to centrifugation at 20,000×g for 2 minutes to pelletize the live Pseudomonas cells. After careful removal of the fuel phase, the aqueous phase including the thin interface (together carrying the spiked Bacillus DNA) was separated from the pellet. The aqueous phase (with interface) was mixed and treated with DNaseI. DNaseI was activated with 1×DNaseI buffer containing optimally adjusted concentrations of MgCl2 and CaCl2) and incubating the samples for 10 minutes at 370 C. The enzyme was then chemically inactivated by addition of 20 µl of 0.5M EDTA and incubating the samples for 10 minutes at 560 C. The pelleted fraction was resuspended with 1000 µl of 1×DNaseI buffer followed by centrifugation. This step also allows a desirable reaction environment for DNaseI to effectively digest any extracellular DNA present within the bacterial pellet fraction. The supernatant was carefully removed, leaving approximately 100 µl of liquid with the undisturbed pellet. The pellet was homogenized with the remaining liquid and split into two aliquots, one for treatment with DNaseI and one left untreated to serve as control. Both aliquots were subjected to DNA purification following Example 2.

Figure 38A:
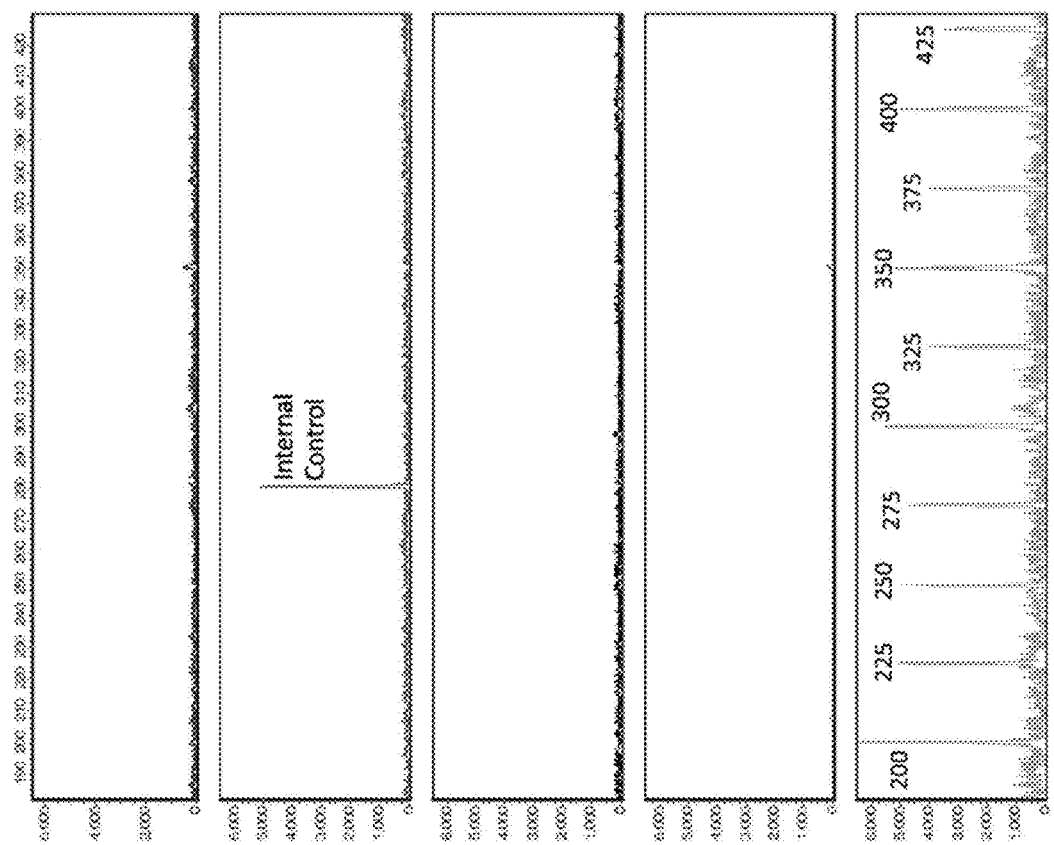
FIG. 38A shows background signal (only internal control detected) generated from the aqueous phase/interface that was enzymatically treated with DNaseI using the Expanded Fuel 16-plex Assay.
Figure 38B:
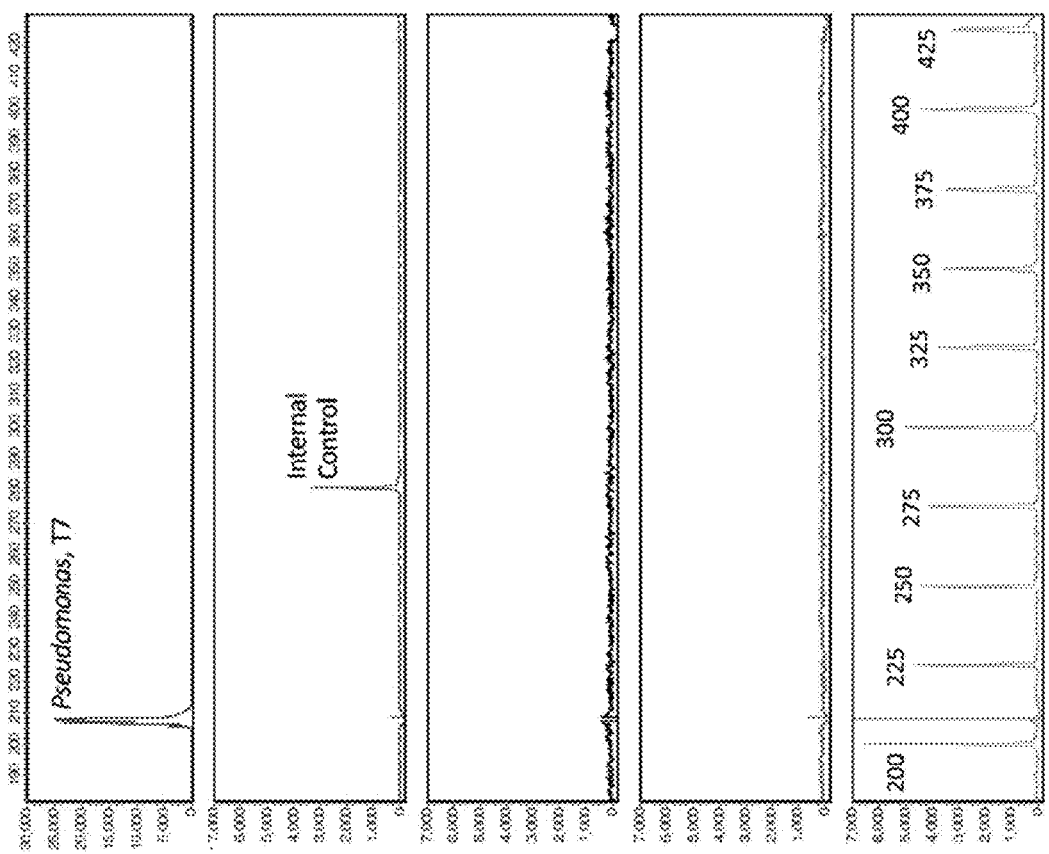
FIG. 38B shows only the amplification of the specific target for *Pseudomonas* introduced in the fuel as cell-contained DNA in the pelleted sample using the Expanded Fuel 16-plex Assay with DNaseI treatment.
Figure 38C:
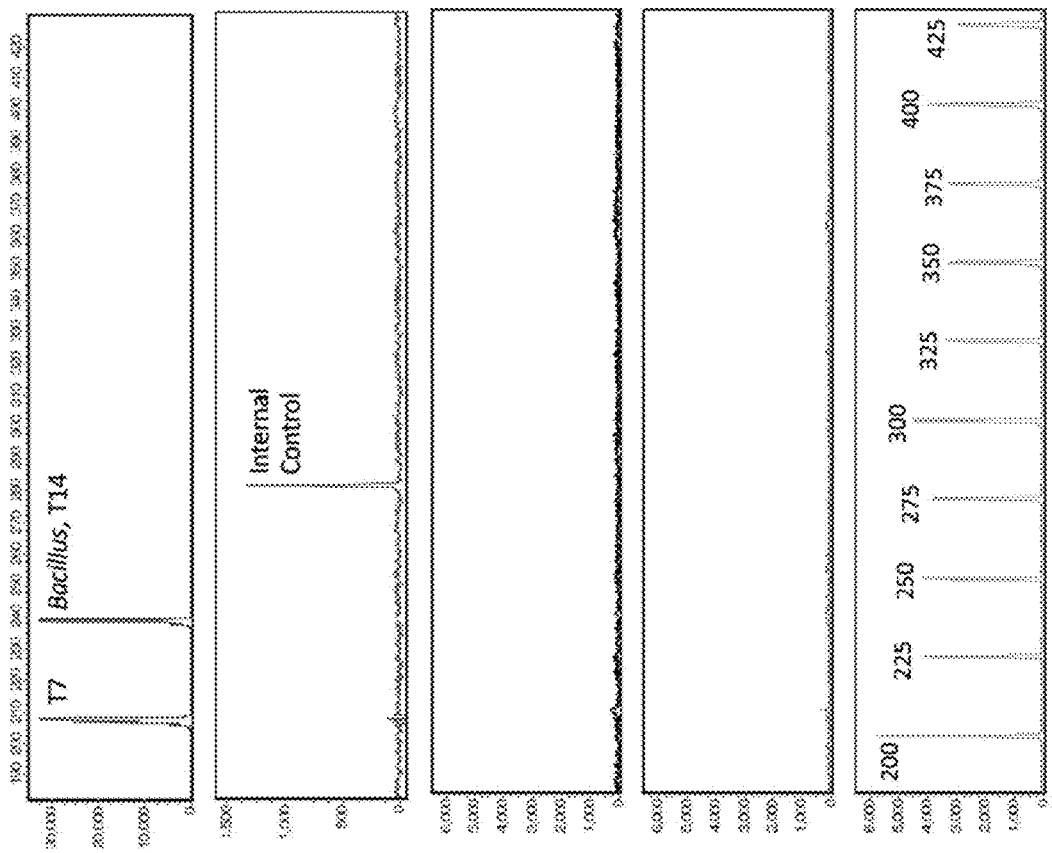
FIG. 38C shows both *Pseudomonas* and *Bacillus* amplification in the pelleted sample using the Expanded Fuel 16-plex Assay without DNaseI treatment.

FIG. 38A shows background signal (only internal control detected) generated from the aqueous phase/interface that was enzymatically treated with DNaseI using the Expanded Fuel 16-plex Assay; no amplifiable bacterial DNA was detected. FIG. 38B shows the amplification of the specific target (using the Expanded Fuel 16-plex Assay) for Pseudomonas from the pelleted fraction following DNaseI treatment; Bacillus DNA was not amplified as it was digested by the DNAse I. FIG. 38C shows both Pseudomonas and Bacillus amplification in the pelleted sample (using the Expanded Fuel 16-plex Assay) in the absence of DNaseI treatment; the extracellular Bacillus DNA was detected. The data demonstrates that 1) DNaseI effectively digested extracellular Bacillus DNA introduced in the fuel; 2) Centrifugation does not remove all the extracellular Bacillus DNA from the pellet; and 3) DNaseI treatment eliminates extracellular DNA present in samples that may have otherwise led to PCR signal; 4) treatment with DNaseI of the pelleted fraction containing both Pseudomonas cells and Bacillus extracellular DNA did not affect amplification efficiency of Pseudomonas as evidence by the comparable peak signal of Pseudomonas observed from +/−DNaseI-treated samples. This was expected since DNaseI will not digest genetic material found within viable or intact cells. By processing the pelleted fraction, that is, after centrifugation-DNaseI digestion and then followed by purification, quantitative measurement of viable/intact cells is achieved. Another approach to eliminating extracellular DNA is to perform multiple cycles of wash and centrifugation of the bacterial (or microbial) pellet. This approach need not utilize DNAse I or any other DNA degradation enzymes or methods.

Figure 39A:
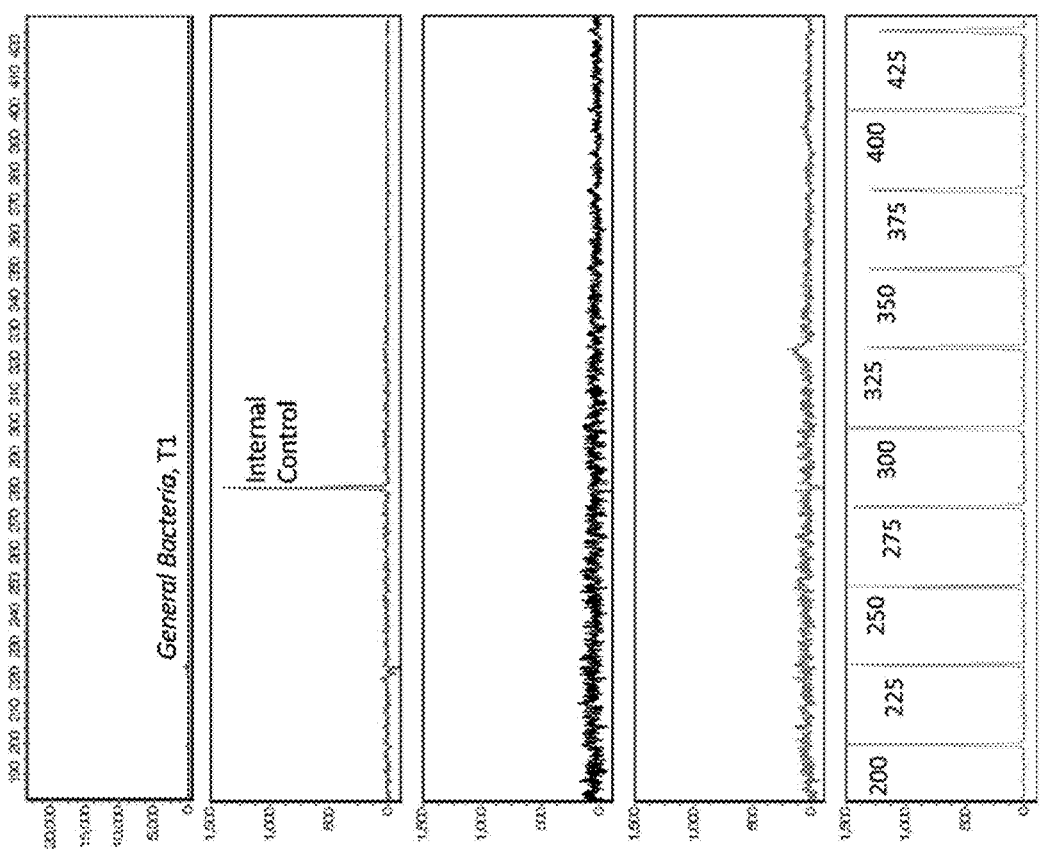
FIG. 39A and FIG. 39B show significant decline in the general 16S bacterial signal (T1) from the General 6-plex Fuel Assay following chemical digestion.
Figure 39B:
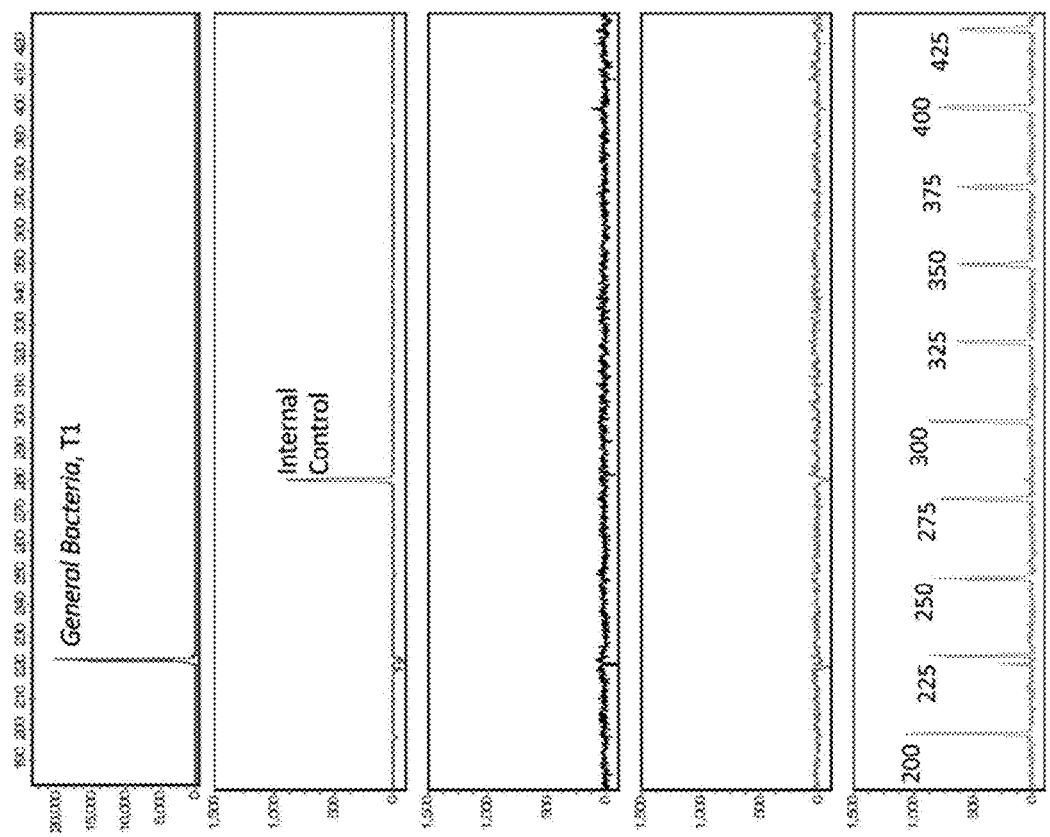
Figure 40A:
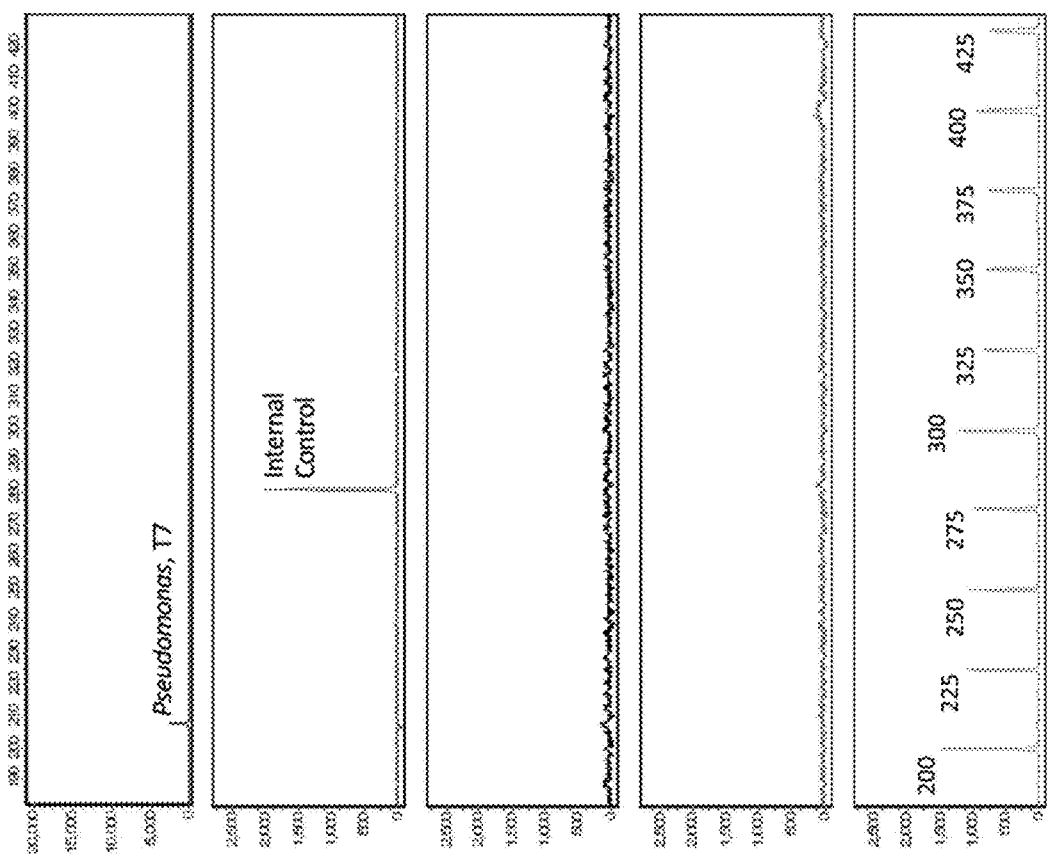
FIG. 40A and FIG. 40B show a significant decline in the *Pseudomonas* signal (T7) from the Expanded 16-plex Fuel Assay following chemical digestion.
Figure 40B:
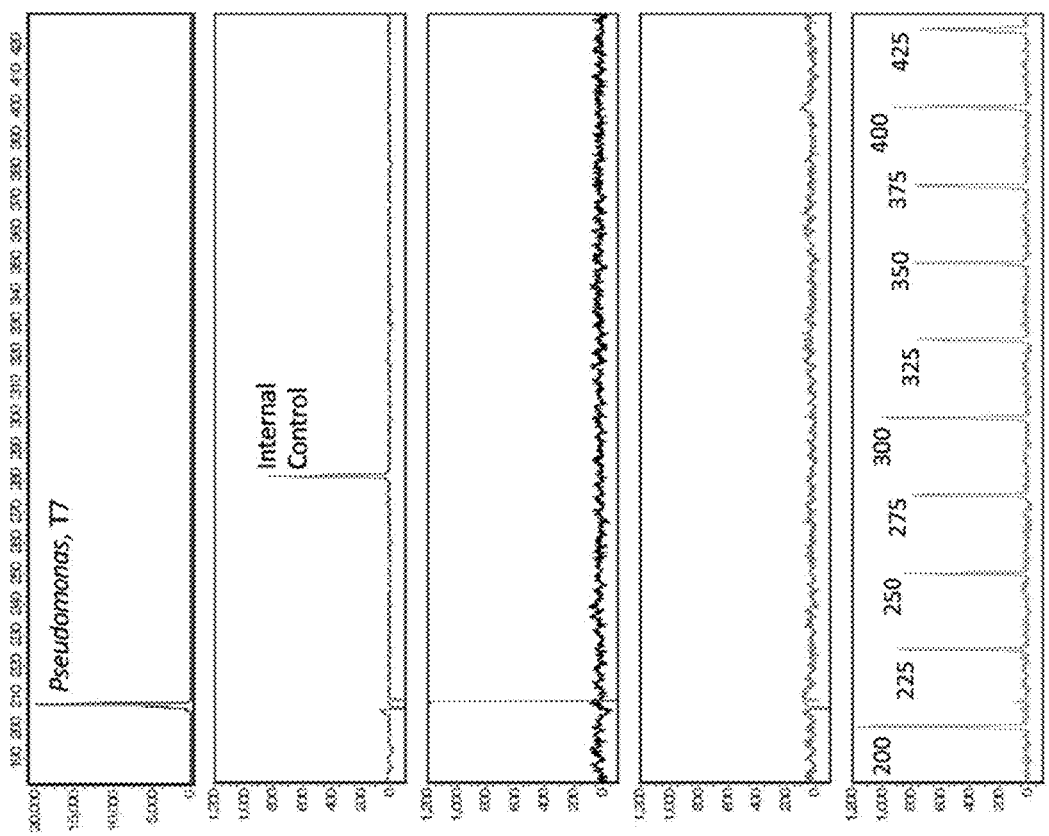

To demonstrate that centrifugation-DNaseI method described above is effective for samples with DNA possibly bound by membrane proteins following chemical/biocidal lysis of bacterial cells or contained within nonviable "ghost" cells (as opposed to extracellular DNA), mock fuel samples were also prepared by adding live Pseudomonas cells (approximately 1×106) to 100 µl of diesel fuel (previously determined to be negative for microbial contamination). To the samples, 600 µl of guanidinium-based lysis solution was added. The samples were mixed thoroughly by vortexing for 5 seconds and then processed as described above. As noted, this is particularly important to eliminate any false-positive amplification from extracellular DNA (whether free-floating or bound to cellular material) resulting from cellular lysis after biocide treatment that co-pelletize with any intact microbial cells and cellular debris. Results in FIGS. 39 and 40 showed that centrifugation-DNaseI treatment was effective in digesting said extracellular DNA. There was a nearly complete elimination of bacterial signal following chemical digestion as evidence by the general bacterial 16S signal (T1) in the General 6-plex Fuel Assay (FIG. 39A, with DNaseI treatment and FIG. 39B, without DNaseI treatment) and in the Pseudomonas signal (T7) in the Expanded 16-plex Fuel Assay (FIG. 40A, with DNaseI treatment and FIG. 40B, without DNaseI treatment).

To demonstrate that the centrifugation-DNaseI method is effective in real-world fuel samples, diesel samples obtained from commercial fleets were collected before and after biocide treatment (ie. methylenebisthiocyanate). Biocide performance was also measured using an ATP assay for measurement of total microbial load.

Figure 41A:
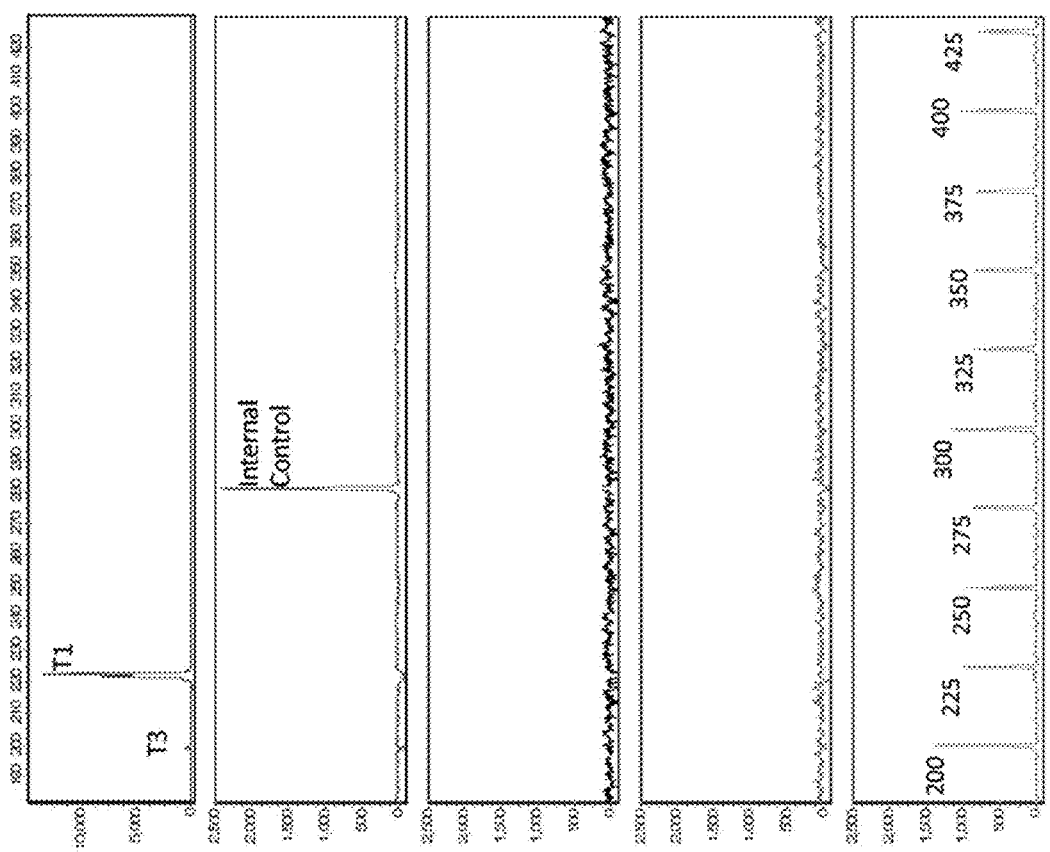
FIG. 41A and FIG. 41B show a decline in microbial signal (loss in filamentous fungi 18S, T3 signal and approximately 75% decline in general bacteria 16S,T1 signal) after biocide treatment (FIG. 41A before biocide treatment and FIG. 41B after biocide treatment) using the General 6-plex Fuel Assay following centrifugation/DNaseI processing of fuel samples.
Figure 41B:
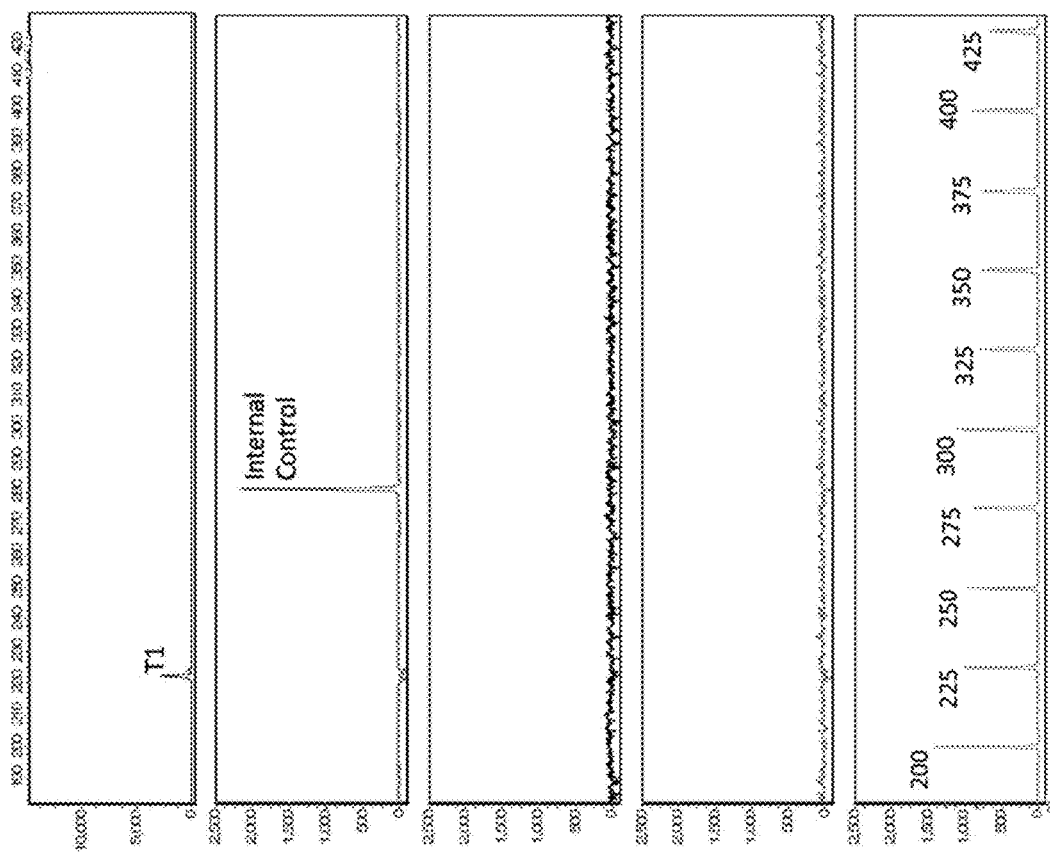

To perform multiplexed PCR analysis of the paired fuel samples (before and after treatment), 100 µl of diesel fuel was added to 100 µl of 1×PBS to universally generate an artificial water bottom. Creation of an artificial water bottom may be used in cases wherein there is minimal or negligible (cannot be visualized) water content; in this case, it was created to simplify collection of the pelletized fraction by centrifugation. Samples were mixed thoroughly by vortexing for 5 seconds and then processed as described above. Results in FIG. 41 show a decline in microbial signal (loss in filamentous fungi 18S, T3 signal and an approximately 75% decline in general bacteria 16S,T1 signal) after biocide treatment (FIG. 41A-before biocide treatment and FIG. 41B—after biocide treatment) using the General 6-plex Fuel Assay. The PCR data was consistent with the ATP data. The centrifugation-DNaseI treatment method provided a reliable and rapid indicator of the success of biocide application.

Example 26

This example describes a method for assessing the efficacy of remediation that is based on the use of messenger RNA (mRNA) as an indicator of bacterial viability. mRNA plays a central role in bacterial physiology and is typically characterized by an extremely short half-life [Sheridan, G., et al. *Appl Environ Microbiol* (1998), 64(4):1313-8]—usually in the range of seconds to minutes. Viable microbial cells are required to synthesize mRNA; when a cell is destroyed by a biocide, the mRNAs are quickly degraded and no new mRNAs can be synthesized. Unlike DNA (which is relatively stable and long-lived following microbial death and may be found intact extracellularly), mRNA declines precipitously in the extracellular space (or within non-viable cells) and its absence in a fuel sample indicates the absence of viable cells. Accordingly, an assay for mRNA (whether multiplexed or not) prior to, during, and post-biocide treatment allows an accurate measure of the number of viable cells in a sample and, accordingly, on the effectiveness of biocide treatment and other remediations.

The desired mRNA targets are used as direct templates in reverse transcription polymerase chain reactions (RT-PCR). Depending on biocide efficacy and additional methods for microbial killing (e.g. addition of heat), mRNA targets are depleted over time (typically minutes to hours depending on the half-life of each specific mRNA target). The most frequently used protocols for RT-PCR involve two-step/dual enzyme assays. Such assays require a reverse transcriptase step (e.g., MuLV RNA-dependent DNA polymerase) in which the cDNA is synthesized and then used as template in a 'conventional' PCR reaction (e.g., in presence of Taq, Pfu, or other amplification enzymes). The reverse transcriptase may be thermostable or thermolabile to allow more specific priming and efficiency due to a higher annealing temperature and reduced impact of template secondary structure during extension of the ternary initiation complex. In general, the two-step/dual enzyme assays involve at least an hour-long incubation step and the cDNA synthesis is often randomly primed due to low RT incubation temperatures (unless a thermostable reverse transcriptase is used).

Single-enzyme assays performed in one reaction are preferable for adaptation to rapid microfluidic and highly multiplexed RT-PCR. In the laboratory, a single enzyme assay is simpler and faster to perform and in a Rapid DNA biochip, a single enzyme assay is faster and can take place in the same PCR chambers in the biochips described above). Single-enzyme RT-PCR assays take advantage of the intrinsic RNA-dependent DNA polymerase activity of several thermostable polymerases during the initial cDNA synthesis. The synthesized cDNA serves as template during PCR in the same reaction (single enzyme/single vessel) or in a separate reaction (single enzyme/dual vessel). For example, *Thermus thermophilus* enzymes (including Tth and derivatives thereof) have been shown to have superior reverse transcriptase activity compared to Taq, especially in presence of manganese ions (instead of magnesium ions) [U.S. Pat. No. 5,693,517 (Gelfand et al.); Myers, T. W. and Gelfand, D. H. Biochemistry (1991), 30:7661-7666].

Figure 42:
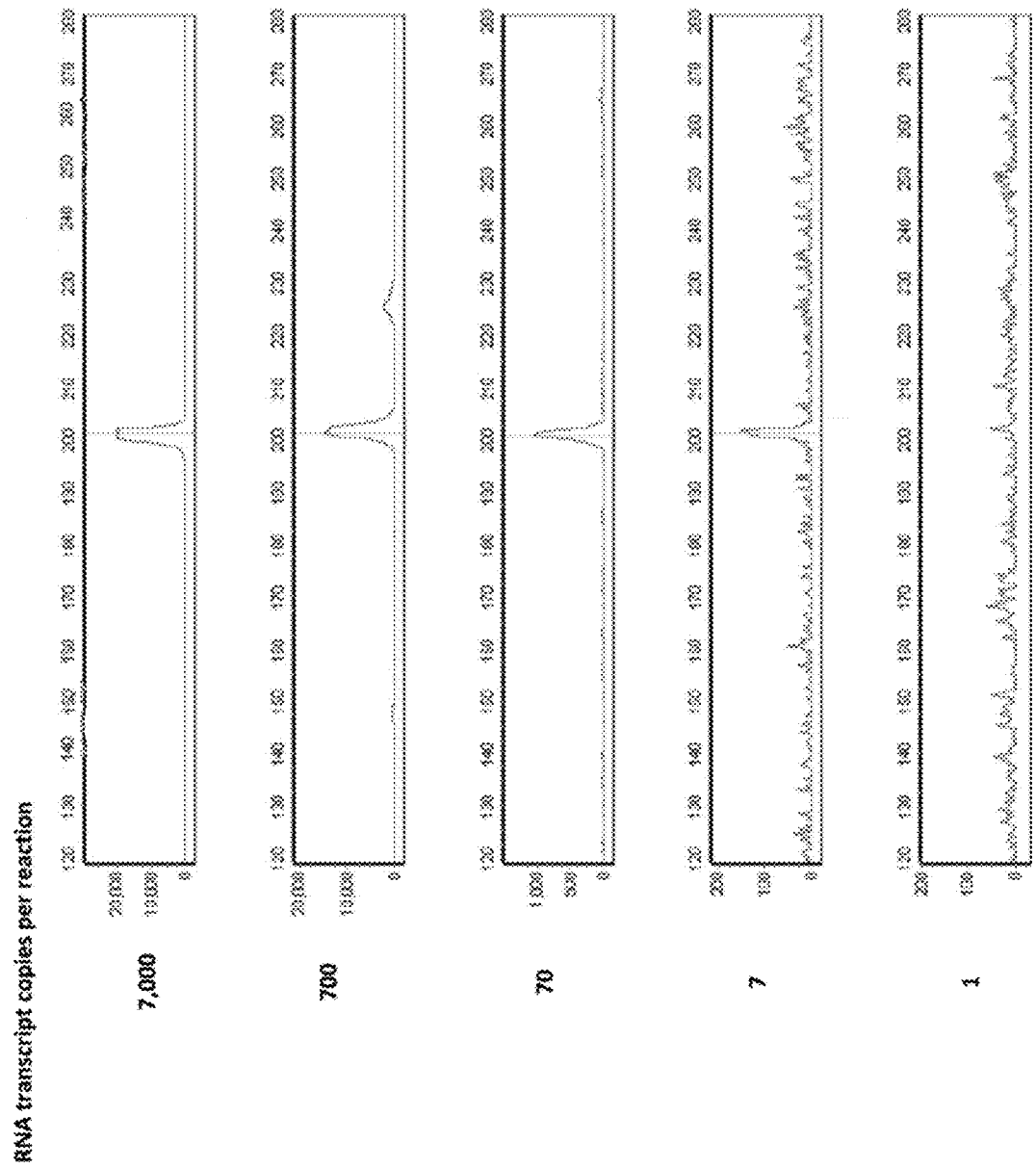
FIG. 42 shows representative profiles for the RNA input transcript dilution series following RT-PCR and after S&D detection of approximately 50% of the amplified product.

To illustrate the functionality of the single enzyme/single vessel RT-PCR assay in a rapidly cycled and microfluidically-controlled reaction, a transcript of the human beta-hemoglobin (Hbb) cDNA was selected as model template with a T7 expression plasmid containing human hemoglobin beta cDNA sequence. Primers were chosen such that no fragments with expected length can be formed in presence of contaminating human genomic DNA as Hbb is encoded on Chr11. Hbb transcript was synthesized off the linearized plasmid by in vitro transcription with T7 DNA polymerase, followed by purification of the transcript. The RNA transcript was first purified by selective ammonium acetate precipitation followed by treatment of precipitate with DNaseI to remove any remaining cDNA and then subjected to gel filtration to remove salt, nucleotides etc. The transcript was shown to be DNA free by testing an equivalent of 10,000 transcript copies in a 35-cycle PCR reaction containing Hbb primers designed to amplify a ROX-labeled 202 bp amplicon—no PCR product was detected. Initial RT-PCR testing was performed as a template dilution series (1-7,000 copies transcript per 7 µl reaction) with RT extension time of 15 minutes at 620C followed immediately by a 35-cycle PCR reaction. FIG. 42 shows representative profiles for the different RNA input transcript copies (present in the red dye-channel) after S&D detection using approximately 50% of the amplified product. RT-PCR is capable of producing satisfactory amounts of specific product (peak at ~202 bp) in less than 30 minutes total reaction time generating detectable signal with less than 10 copies per reaction. RT extension times can still be reduced allowing an even faster PCR completion time. The presence of Mn2+ instead of Mg2+ enable Tth polymerases to build ternary initiation complexes with RNA as well as DNA templates. The assay was carefully optimized to determine the manganese concentration at the which overall efficiency is at maximum most especially when multiplexing multiple mRNA targets. Lyophilization of the RT-PCR reaction mix to generate the RT-PCR cake for use in ANDE biochips follows similar processes as with the standard PCR cakes. For Rapid mRNA identification, samples are taken before, during, and following biocide treatment and or other remediation method as desired. Samples can also be taken at various times following treatment, both the follow the time course of microbial killing and long-term impact of the treatment. For example, samples of interest may be collected for processing at 6, 12, 24, 48, and 72 hours after treatment. Assuming the treatment was shown to be effective, the assay may be performed on samples taken every four weeks to ensure that growth of deleterious organisms has not occurred (or, if it has occurred, to perform additional treatments).

The single enzyme/single vessel RT-PCR assay followed by standard PCR amplification is utilized for evaluation of biocide effectiveness in fuel decontamination. Samples are treated with DNaseI and centrifugation prior to the reverse-transcription step. The approach is based on amplification of highly conserved rRNA suited for inclusive detection of all the population (measuring general biocidal effectiveness) and of mRNAs of some ubiquitously expressed genes (which may measure general biocidal effectiveness or effectiveness relative to specific microbial species) [Sheridan,

*Ibid*; Birch, L. et al. *Lett Appl Microbiol* (2001), 33(4):296-301; Kralik, P. and Ricchi, M. Front Microbiol (2017); 8:108].

Since the sequences of housekeeping genes are typically not as conserved as ribosomal regions and since certain housekeeping genes have been demonstrated to be most stably expressed in a given set of microorganisms, separate specific targets are used for some genera/families, providing at the same time an opportunity for differential (and multiplexed) tracking of biocidal effectiveness in different microbial taxons. The RT-PCR assessment of the viability in the invention include (but is not limited to) RNA transcripts that were previously validated as adequately expressed RT-PCR reference targets in various microorganisms [Savli, H. et al. J. Med Microbiol (2003), 52:40308; Kratzer, C. et al. *J. Bacteriol* (2009), 191(16):5108-15; Llanos, A. et al. BMC Genomics (2015); da Silva, P. R., et al. *Antoine Van Leeuwenhoek* (2016), 109(11)1493-1502; Wen, S. et al. *PLoS One* (2016), 11(12):e0167736. doi: 10.1371/journal.pone.0167736; Pathan, E. K. et al. *PLoS One* (2017), 12(6):e0179454. doi: 10.1371/journal.pone.0179454; Gomes, A. E. I. et al. Sci Rep (2018), 8(1); 9001]. Validated reference targets for multiplexed RT-PCR include:

Ribosomal RNA (16S and 18S)—for bacteria/archaea and fungi respectively rpoD (RNA polymerase sigma factor)—for bacteria/archaea gyrB (DNA gyrase subunit B)—for bacteria/archaea gap (Glyceraldehyde-3-phosphate dehydrogenase)—for Archaea and bacteria atpD (ATP synthase subunit delta)—for bacteria/archaea proC (pyrroline-5-carboxylate reductase, L-proline biosynthesis)—for bacteria/archaea recA (DNA recombination and repair protein)—for bacteria TFC1 (Transcription factor tau)—for fungi UBC6 (Ubiquitin-conjugating enzyme E2 6)—for fungi Many other mRNA targets can be incorporated in the single- or multiplexed assays of the invention, based in part on the types of contaminating microbes and remediation efforts being taken. Multiple RT-PCR targets are assembled that enable the assessment of the effectiveness of elimination of the microbials in fuel.

Taken together, the approaches presented in Examples 25 and 26 can result in detection of a reduction and/or elimination of amplifiable genomic material (either DNA or mRNA transcripts) available for the highly multiplexed PCR or RT-PCR. Fuel samples (approximately 0.01-1000 µl or more) before and after biocide treatment are collected for downstream processing. Briefly, the samples are centrifuged and washed with a preferred buffer to allow efficient degradation with DNaseI. Digestion process is deactivated with addition of EDTA and incubation under heat and then followed by purification of DNA or RNA. PCR or RT-PCR signals resulting from samples collected before and after treatment allows assessment of biocide efficacy which can be done right after biocidal treatment or following a time-course based monitoring (minutes to hours to days), based on the remediation approach taken. The assays of the invention can also be conducted days, weeks, and months following demonstration of a clean sample to assess the possibility of and timelines of regrowth of the offending microbials. Alternatively, multiple cycles of wash and centrifugation can be utilized instead of DNaseI or other DNA degradation treatments. Finally, the RT-PCR assays of the invention can also be used to identify microbial contaminants based on gene expression (as opposed to the presence of target DNA sequences).

Example 27

Figure 43A:
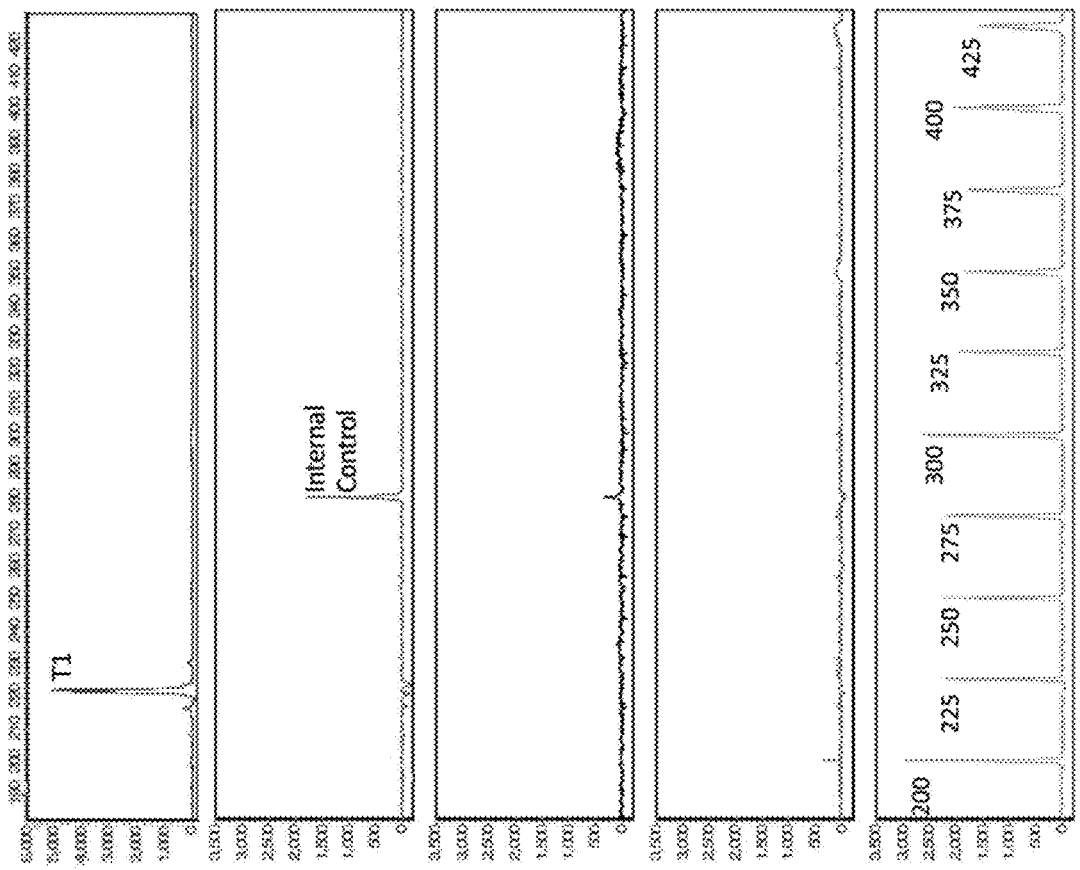
FIG. 43A and FIG. 43B show representative profiles generated from the General Fuel 6-plex Assay on real-world fuel sample obtained from a commercial fleet tank that indicates improvement in DNA amplification efficiency as evidence by the occurrence of filamentous fungi 18S signal, T3 (FIG. 43B) with addition of mechanical bead beating step as part of the Rapid DNA purification step compared to that without the microbeads (FIG. 43A).
Figure 43B:
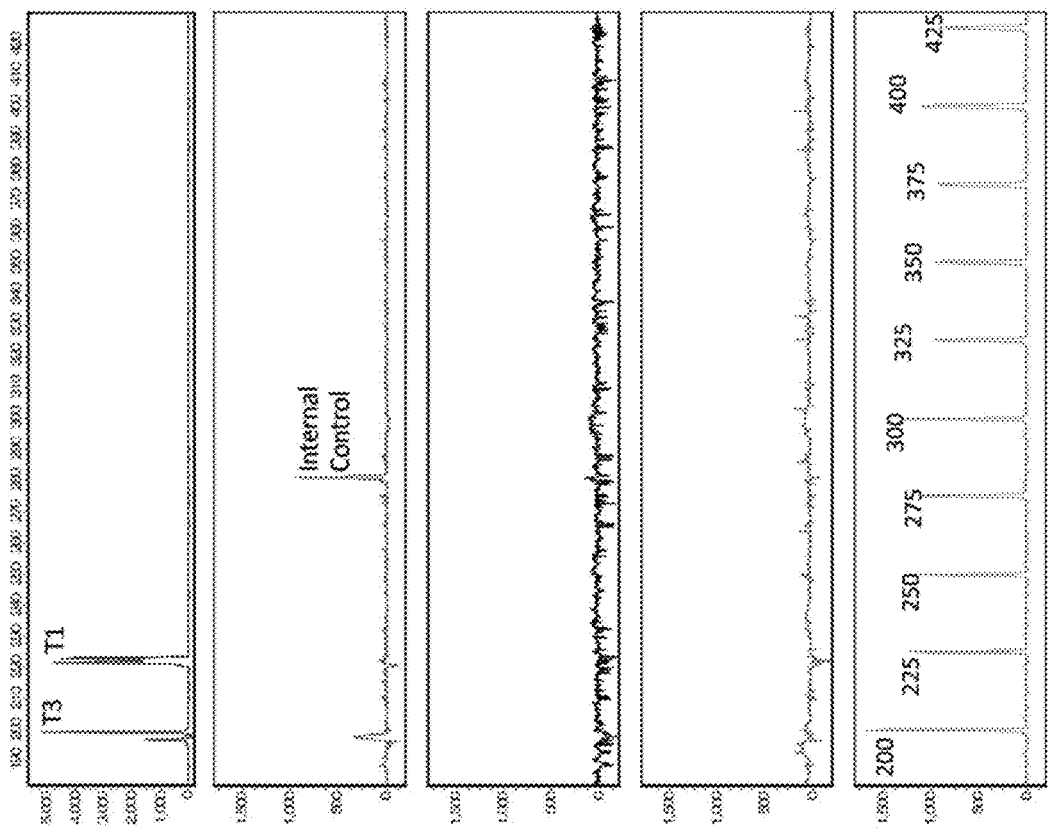
Figure 44A:
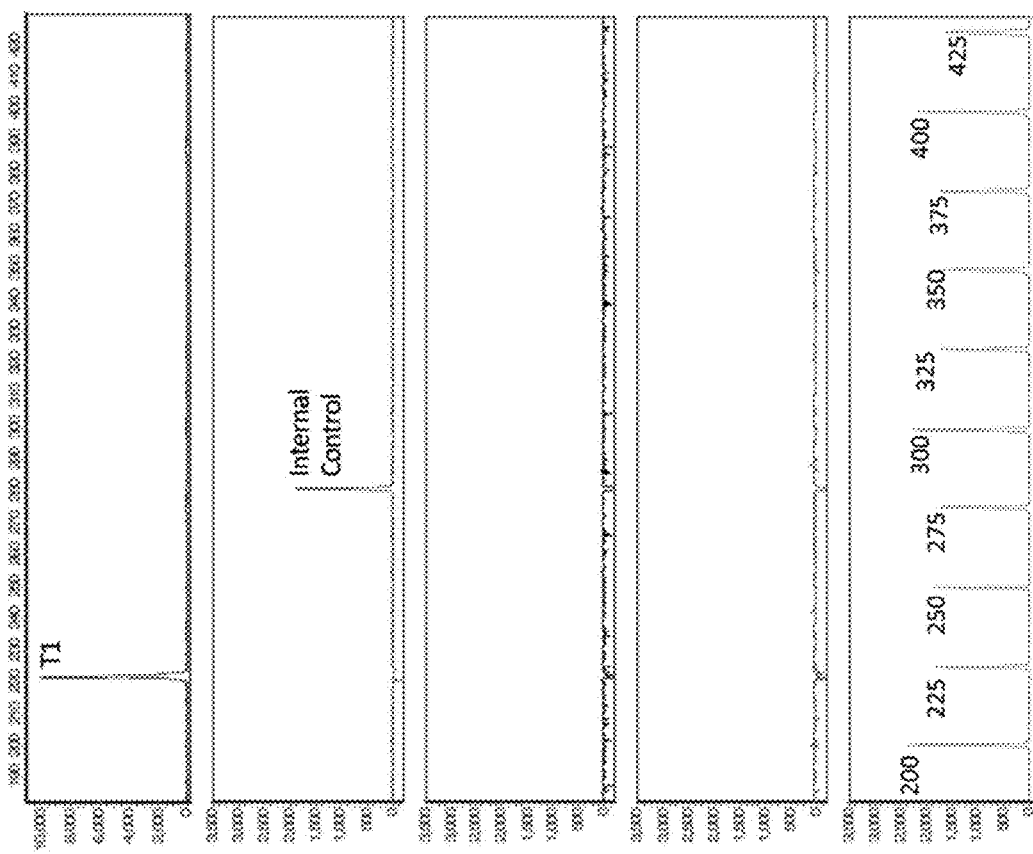
FIG. 44A and FIG. 44B show another commercial fleet fuel sample wherein the mechanical bead beating step enhanced extraction efficiency of both filamentous fungi 18S, T3 and bacteria 16S signal, T1.
Figure 44B:
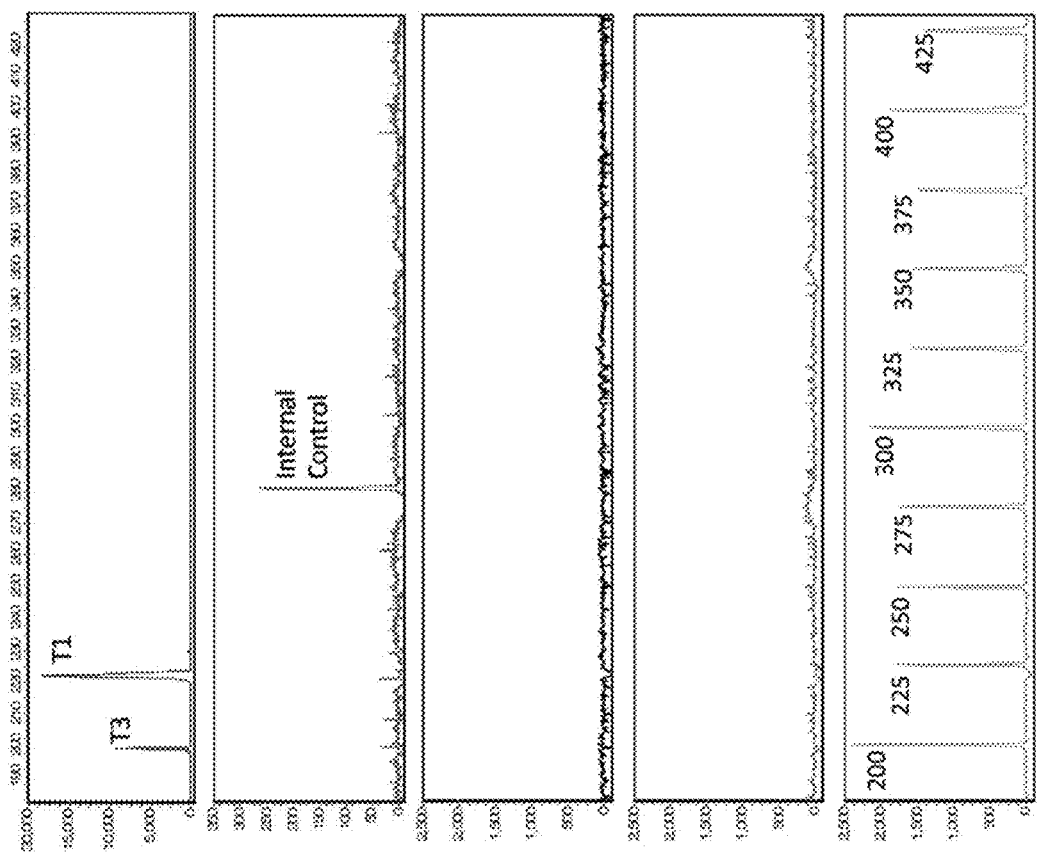

Some cells present in fuel samples may have developed resistance to standard chemical lysis as in cases of sporulating microbes. A spore, unlike its vegetative form, is metabolically inactive structure that occur when microbes are subjected to inhospitable environment in order to preserve their genetic material. To improve overall efficiency of lysis, microbeads are introduced into the reaction during the chemical lysis step to aid in mechanical disruption of cellular structures including tough, protective, and metabolically dormant endospores. As with resin clean-up or additives to address PCR inhibition in fuel samples, the bead beating step can be performed prior to Rapid DNA or conventional laboratory identification or incorporated within the Rapid DNA biochip. FIG. 43 shows representative profiles generated from the General Fuel 6-plex Assay on real-world fuel sample obtained from a commercial fleet tank that indicates improvement in DNA amplification efficiency as evidence by the occurrence of filamentous fungi 18S signal,T3 (FIG. 43B) with addition of mechanical bead beating step as part of the Rapid DNA purification step compared to that without the microbeads (FIG. 43A). The process follows that of Example 5, direct oil analysis without artificial water bottom. FIG. 44 shows another commercial fleet fuel sample wherein the mechanical bead beating step enhanced extraction efficiency of both filamentous fungi 18S, T3 and bacteria 16S signal, T1; FIG. 44A shows results when processed with just the standard rapid chemical lysis and FIG. 44B shows results when processed with microbeads coupled with the standard guanidinium-based extraction. By combining both clean-up method to remove inhibitors in fuel samples and the mechanical bead-chemical lysis of cellular structures, superior enhancement in PCR efficiency can be achieved.

Example 28

Coal seams create an environment well-suited for growth of various microorganisms, providing warmth, moisture, and abundant fossilized organic material [Vick, S. H. W. et al *iScience* (2019), 12:152-167]. Multiple taxa including *Methanosarcinales, Methanomicrobiales, Methanobacteriales, Clostridium, Enterobacter, Klebsiella, Citrobacter, Bacillus, Aspergillus, Penicillium, Neurospora* have been discovered in different coal fractions and on the surface of coal mine sites [Su. X. et al *Biotechnology for Biofuels* (2018); Vick, S. H. W. et al. *FEMS Microbiol Ecol* (2019), 95(7); Deska, M. et al. *Journal of Ecological Engineering* (2018), 19(2); Sekhohola, L. M. et al. *Biosci Biothechnol Biochem* (2014), 78(10):1797-802; Tulsiyan, R. K. et al. Journal of Cell Science and Apoptosis (2017), 1:1]. Some of these microorganisms are involved in stepwise degradation. Microbial coal processing has various impacts including 1) mobilization of fossilized carbon sources into natural gas by a consortia of microorgansims that include methanogenic archaea [Vick, *Ibid*; Strapoc, D. et al. *Applied and Environmental Microbiology* (2008), 74(8); Mesle, M. et al. *Research in Microbiology* (2013), 164(9):959-972; Su, *Ibid* 2) enrichment/beneficiation of low-rank coal by microorganisms-mediated removal of sulfur, metals etc. through processes known as bioleaching, biodemineralization, and biodesulphurization, with both bacteria and fungi known to be capable of removal of mineral matter from coal [Mesle, Ibid]; and 3) bioremediation of environmental pollution at the sites of old abandoned coal mines, including bioremediation of heavy metals and biodegradation of the toxic material from soil [Jamal, Q. et al. *Geomicrobiology Journal* (2016), 33(1).]. Microorganism detection and classification of coal seams are therefore beneficial both for prospecting of natural gas (which is a preferred industrial energy source that significantly reduce the environmental drawbacks of coal-fired power plants), prospecting for optimal coal seams, identification of coal during storage and transport, and identification of the biobeneficiation potential of coal seams for creation of value-added product [Beckmann, S. et al. The ISME Journal (2019), 13:632-650; Deska, *Ibid*].

Figure 45:
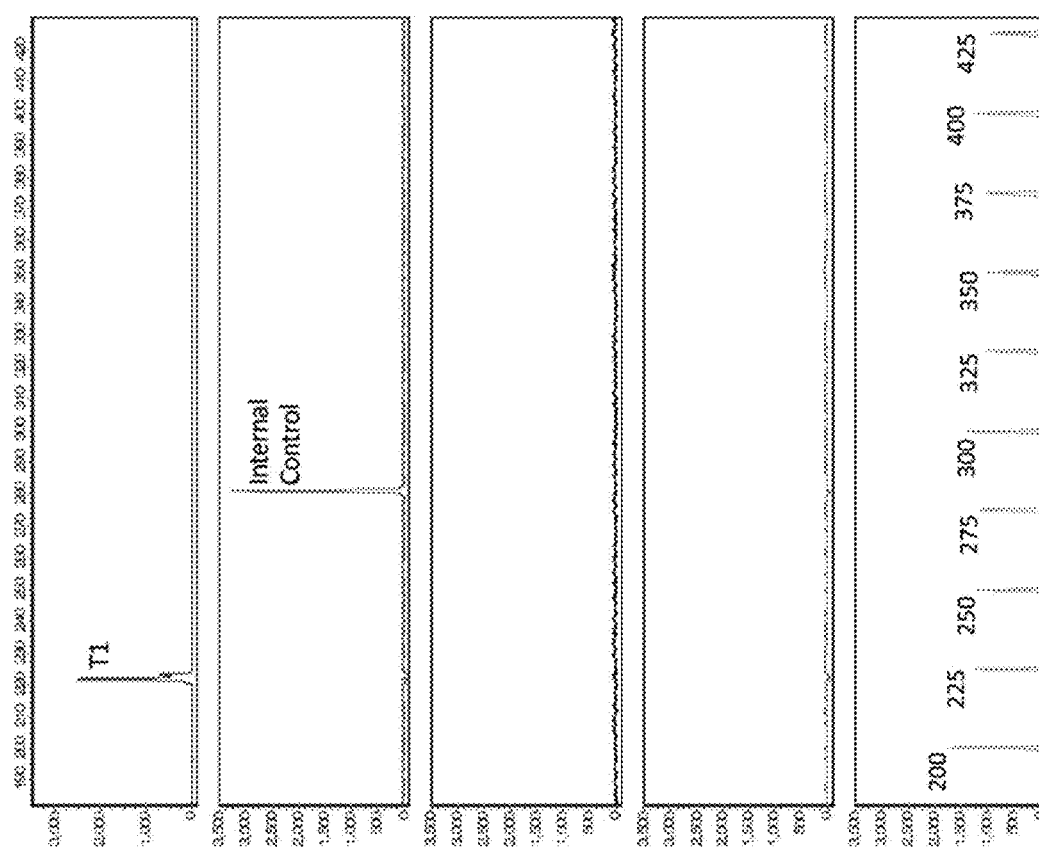
FIG. 45 shows a representative coal sample which generated a relatively weak bacteria signal (T1) with the General Fuel 6-plex Assay following the invention for rapid fuel processing and rapid analysis by multiplexed PCR.

Sub-bituminous coal samples were collected from the Peabody North Antelope Rochelle Mine located in the Powder River Basin of Wyoming and Southeastern Montana, the largest coal mine in the world by a margin of 50 percent, operating a total of eight pits on about 65,000 acres. Microbial DNAs were purified from 250 mg of pulverized coal samples using the combined microbead beating and chemical lysis methodology followed by a PCR inhibitor clean-up step. FIG. 45 shows a representative coal sample which generated a bacterial signal (T1) with the General Fuel 6-plex Assay following the invention for rapid fuel processing and rapid analysis by multiplexed PCR. The other multiplexed assays are utilized to further characterize the microbials present in coal samples.

Example 29

The instant invention provides an Expert System—analytical software that enables DNA or RNA data to be interpreted automatically essentially immediately in the field, with straightforward results presented to the non-technical user (while retaining a detailed report of all results for later review and compilation into databases by a technical user, if desired, as described in co-owned U.S. patent application Ser. No. 16/034,058 entitled "Pattern Recognition System" filed Jul. 12, 2018, which is hereby incorporated by reference herein in its entirety. The color corrected electropherogram generated by the ANDE Rapid DNA Identification system (or by an alternative rapid DNA system or by a conventional laboratory separation and detection process) is analyzed by an Expert System to identify the presence of each microbe in the sample. The Expert System module is integrated with the Data Processing module to automatically accept the color corrected electropherogram (raw data), analyze this data, and present a simple actionable output to the non-technical user.

Figure 46:
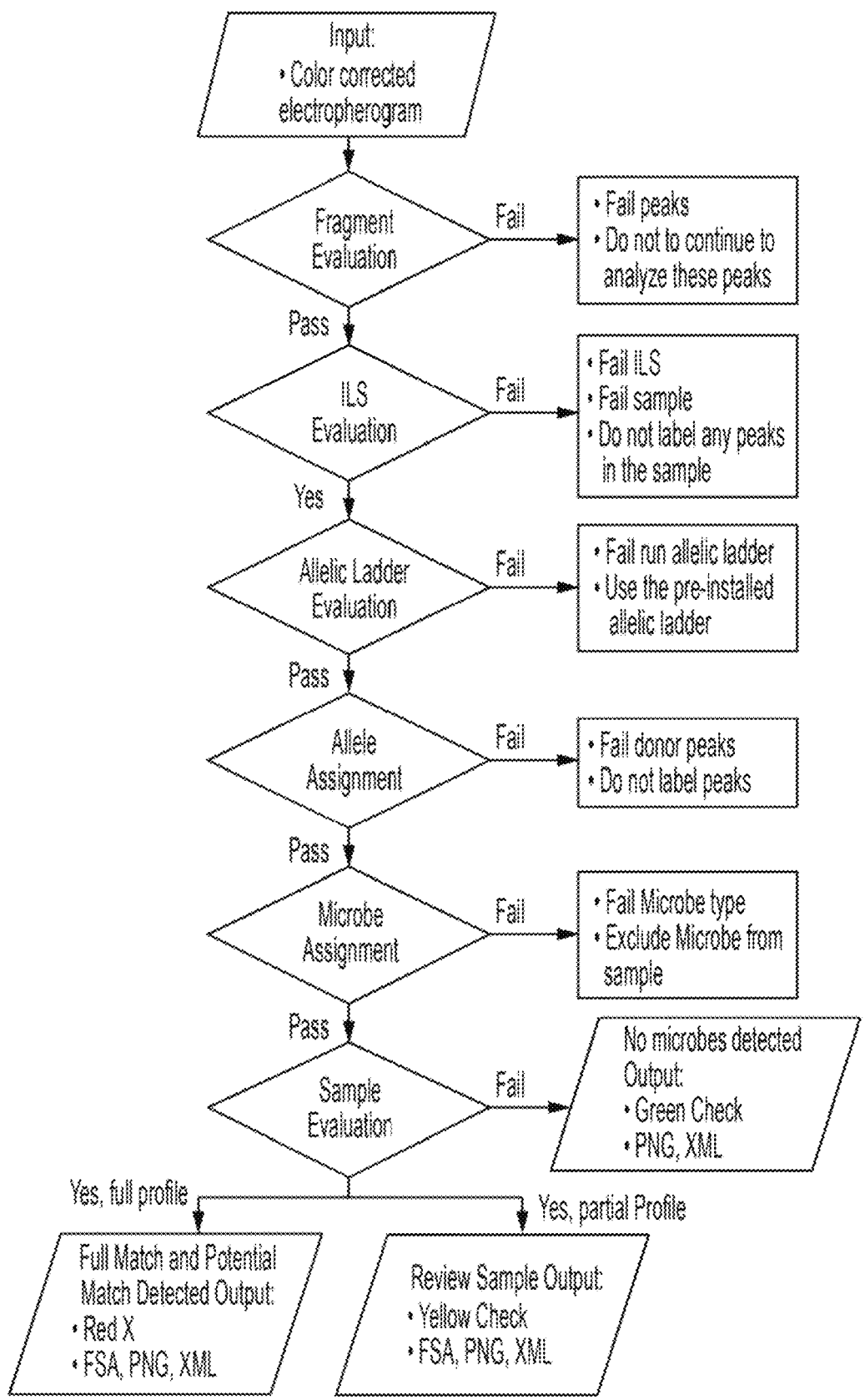
FIG. 46 shows the workflow of the sets of rules that the Expert System analysis follows based on the ANDE Microbial Allele Table.

The Expert System analysis follows a set of rules shown in the workflow of FIG. 46. These rules consist of Peak Evaluation, ILS Evaluation, Allelic Ladder Evaluation, Allele Assignment, Microbe Assignment, and Sample Evaluation. Peaks, alleles, and microbe types that pass each rule are processed further by subsequent rules while those that fail are not processed any further. Finally a sample evaluation rule classifies the DNA ID into the following categories: (1) Microbes are not detectable in the sample and a green check is displayed; (2) Microbes are present and a red X is displayed, (3) additional analysis is required and a yellow check is displayed, or (4) sample failed (for example: a blue retake icon if the sample failed due to instrument or biochip issues; or a blue L to indicated the sample generated low signal, or a blue H to indicate a high signal. The Expert System classifies the failure mode of each failed sample and directs the user to collect the sample again with suggestions to modifying the amount of sample collected and reanalyzed.

The Expert system directs the user to take action when microbes are identified (a red X is displayed) by displaying an additional screen to (for example) to apply a specific treatment to the source. The amount of information provided about the contaminants, including the name and quantity of some or all of the contaminating microbials, is optionally presented to the user. For example, following biocide treatment, the Expert System can be configured to highlight the status of a known contaminant observed prior to remediation-allowing the nontechnical user to be made aware of the effectiveness of the biocide. Similarly, the .bmp and .png files are labelled with amplicon sizes and the identity of the contaminants, and the automatically generated report describes in detail microbial types, and quantities.

In order to provide easily-understood results, the Expert System performs several analytic steps:

Peak evaluation. The peak evaluation rules identify all peaks in the raw data and applies rules that assess peak characteristics including peak height, peak width, peak morphology, and signal-to-noise ratio to evaluate each peak. Peaks that pass are considered candidate peaks (true amplicons or alleles) and are subjected to further analysis based on subsequent rules. Peaks that fail are not labeled and are not subjected to further analysis. The requirements of the peak evaluation rules are set to allow peaks that are generated from microbes to pass, but peaks from other sources to fail. For example, spikes generated by noise in the optical system are a class of peak that fail the peak evaluation rules are spikes which meet the peak height requirements but fail because they are narrower than the peak with requirements. Also, for example, dye blobs generated by unbound dye are another class of peaks that fail the peak evaluation rules as they are broad and will fail the peak width requirements.

Size Standard and Internal PCR Control Evaluation. The size standard (or Internal Lane Standard; ILS) evaluation rules identify all peaks in the raw data of the orange dye channel, and Expert System rules are applied that assess the peak characteristics including peak height and peak height ratio. In this example, the ILS fragments are labeled with an orange dye. ILS fragments are not limited to being labeled with orange dyes and can be labeled with other dye colors. All Peaks that pass are further evaluated by their relative positions compared with predetermined positions of the ILS peaks to classify them as ILS peaks and reject any spurious peaks. Finally, all ILS peaks are assessed together as a set to verify the presence of the predetermined number of ILS peaks and the characteristics of the ILS including the relative peak heights and relative positions of the ILS peaks. A passing ILS is used to size microbial peaks and allelic ladder peaks. The peaks are sized using either a Local Southern Method, linear, or non-linear interpolation algorithm as configured in the software. ILS that fail will result in the sample failing. Samples with failed ILS are not subjected to further analysis. Similarly, the Internal PCR control peak (if present in the multiplex) is identified and subjected to similar rules (the peak may be dye-labelled with the same color as the size standard peaks or another color). If no peak is noted, the sample is failed and not subjected to further processing. If the signal strength of the peak is outside a predetermined level, the operator is notified using the lane success results GUI screen described above. Multiple signal strength ranges are incorporated; for example, minimal IC signal in the setting of low microbial peaks results in sample failure, whereas low signal and high signal (approximately 5-10% of expected and greater than 200% of expected, respectively) allow further data analysis.

Allelic Ladder Evaluation. The Allelic Ladder is an optional control sample that contains dye-labelled fragments corresponding to alleles derived from microbes of particular interest. Allelic ladder evaluation rules identify all peaks of the run Allelic Ladder sample and applies rules based on characteristics including peak height and peak height ratio. All Peaks that pass are further evaluated by their relative positions compared with predetermined positions of the Allelic Ladder peaks to classify them as AL peaks and reject any spurious peaks. Finally, all Allelic Ladder peaks are assessed together as a set to verify the presence of the predetermined number of AL peaks and the characteristics of the AL including the relative peak heights and relative positions of the peaks. A passing Allelic Ladder is used to generate the calling bins of the ANDE Microbial Allele Table that is used to designate microbial peaks. The inclusion of an Allelic Ladder sample with each run is optional. When a Run Allelic Ladder is available, the Expert System will generate the calling bins using the Run Allelic Ladder. When the Run Allelic Ladder is not present, either because it was not run together with the microbial samples or because the run Allelic Ladder failed, a Pre-Installed Allelic Ladder (PAL) that is stored on the instrument is utilized instead.

Microbial Allele Assignment. The Allele Assignment Rules compare the fragment size of each peak to the fragment size of the bins in the ANDE Microbial Allele Table. Peaks that are on the ANDE Microbial Allele Table are designated with a specific microbe type, microbial locus, and allele, and subjected to further analysis using subsequent rules. Peaks that are not on the ANDE Microbial Allele Table are not subjected to further analysis. Peak characteristics including fragment size, peak height, and peak widths were determined in the peak evaluation rules are also stored for further analysis. It is possible for a peak to have multiple designations as the peaks from multiple microbes may overlap and each microbe will have a unique microbial type, unique microbial loci, and allele numbers. The ANDE Microbial Allele Table includes some or all of the following information for each bin—bin position, and bin width, microbe type, microbial locus, and allele. It is possible for a bin to have multiple designations as the peaks from multiple microbes may overlap and each microbe has a unique microbial type, microbial loci, and allele numbers. The ANDE Microbial Allele Table is based on the primer pairs in the multiplexed PCR reaction being analyzed and the amplicons generated by those primer pairs.

Microbe Assignment. The ANDE Microbial Allele Table also contains information pertaining to the number of alleles and the designations of each of these alleles for each microbe. Microbes for which at least one allele for the microbe was identified are considered candidate microbes. Microbes for which no peaks were identified are excluded from being in the sample and not subjected to further analysis. All peaks with a common microbe type are grouped to form a set and evaluated against the known peaks for the microbe as listed in the ANDE Microbial Allele Table. In this analysis, the number of peaks present to the number of expected peaks, and the number of peaks that match (same allele calls) to the total number of peaks assessed is determined. A full match is achieved when all of the alleles for a microbe are present in the sample, the microbe is present in the sample. A probable match is achieved when a predetermined number or fraction of alleles for a microbe are present in the sample, and a predetermined number of matches and mismatched alleles are generated. For example, a microbe may have 3 of the 5 alleles present. In this case, if the threshold for number of alleles is 3, this sample is considered a match (criteria for matches are an inherent part of the allele table evaluation). In this way, the microbial evaluation rules are configurable to allow for a range of match stringency matches. Candidate microbes that are matches or potential matches are considered present in the sample. All other candidate microbes that do not meet this requirement are not subjected to further analysis. Similarly, quantification of microbes is performed based on peak evaluations described above as generated by the systems described in Examples 24, 25, and 26.

Sample Evaluation Rules and Sample Reporting. The Sample Evaluation Rules evaluate the results of the Microbial Assignment rules. All microbes that match and potentially match are evaluated by this rule to classify the sample into categories including: (1) Microbes are not detectable in the sample; (2) Microbes are present in the sample; (3) additional analysis is required; and (4) sample failed and should be repeated. Graphic User Interface screens are utilized to present this and additional related information to the user.

The Expert System may be an Adaptive Expert System (AES), designed to automatically change calling parameters based on analysis of signals in the raw data. The AES of the invention are applicable to sample data that falls outside the conventional dynamic range of a system or within that dynamic range, and allows analysis of single source, mixture, high signal, low signal, and a variety of other types of raw data. This solution has been accomplished by identifying certain patterns and characteristics of sample analyte data, changing data handling and analysis operations from what a computer and expert system software would typically do. This substantial analytic improvement is useful in a wide range of settings and applications.

Example 30

Figure 47:
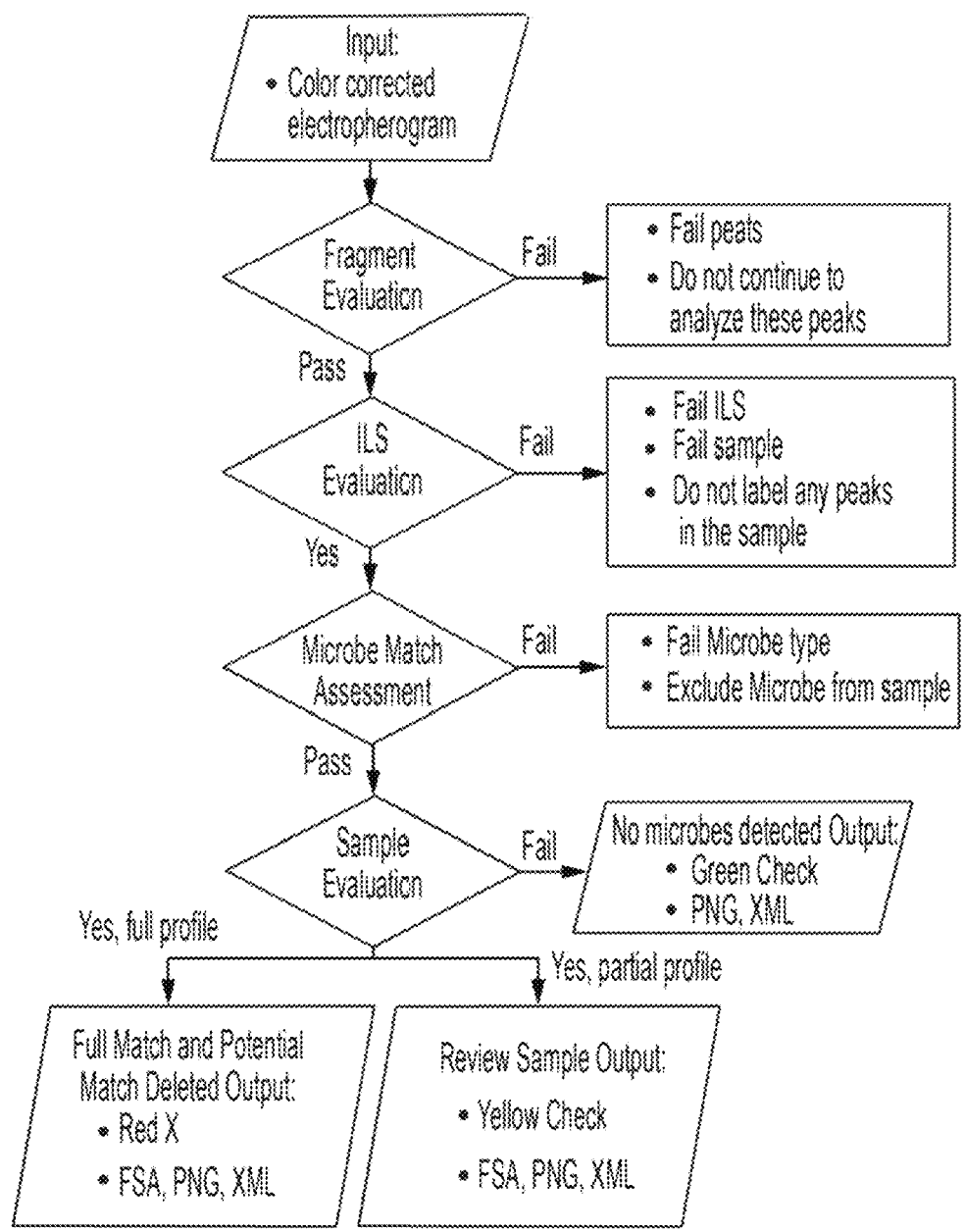
FIG. 47 shows the workflow of the Expert System consisting of Evaluation, ILS Evaluation, Microbe Match Assessment using the ANDE Microbial Database, and Sample Evaluation.

In this example, the workflow of the Expert System follows that of FIG. 47 and the workflow consists of Peak Evaluation, ILS Evaluation, Microbe Match Assessment, and Sample Evaluation. The Peak Evaluation and ILS Evaluation are the same as the example above and generate an output consisting of a list of candidate peaks listed by color and fragment size for the sample. The Microbe Match Assessment will process this output as follows:

Microbe Match Assessment. The ANDE Microbial Database is a list of microbes along with the alleles and designations of each of these alleles for each microbe. Additionally, the following information is included for each allele that is listed—dye color, allele fragment/bin size and allele fragment size/bin size width, microbial locus, and allele. The alleles listed for each microbe are compared with the peaks in the electropherogram. The following characteristics of the match will be generated: Number of peaks present to the number of expected peaks, and the number of peaks that match (same allele calls) to the total number of peaks assessed is determined. The resulting match is characterized as a Full Match, Potential Match or No Match. A list of all microbes with a Full Match and Potential Match are generated for the Sample Evaluation Rules.

In this example, a full match is achieved when all of the alleles for a microbe are present in the sample, indicating that the microbe is present in the sample. A probable match is achieved when a predetermined number or fraction of alleles for a microbe are present in the sample, and a predetermined number of matches are generated. The results from the Microbe Match Assessment are processed by the Sample Evaluation rules as described in the example above.

The ANDE Microbial Database can be used to collect metadata. The ANDE Microbial Database is collects metadata about the microbe including the treatment to be applied to the microbe in order to control it. This meta data can be reported to the user for each of the microbes that is detected. The output to the user is customizable to include as little detail (for the non-technical user) or as much detail (for the technical user) in order to take action. For the non-technical user, the output can simply be a single icon to indicate that microbes are present at a level where action needs to be taken, and a list of biocide treatments and range of concentrations/amounts/volumes to apply to the sample. For the technical user, the output can include detailed reports with raw data outputs to show the microbes that are present, the levels at which they are present and the treatments to apply to the sample.

The invention describes a Data Processing module and an Expert System module that is integrated and on board of the ANDE Rapid DNA Analysis System. While this is a preferred mode of operation, the software is not limited to that on the instrument. The Data Processing and Expert System software modules can be run on a laptop or desktop computer that is removed from the instrument. In this instance, the raw data from the ANDE system would be transferred (for example by ethernet or by USB stick) to the laptop computer, and the computer would process the raw data to generate an output to the user.

We claim:

1. A composition comprising at least six (6) primer pairs in which at least one primer of each pair is labeled with a fluorescent dye;

the first primer of said first primer pair having at least 90% homology to the sequence set forth in SEQ ID NO: 1 and the second primer of said first primer pair having at least 90% homology to the sequence set forth in SEQ ID NO: 2 or 3;

the first primer of said second primer pair having at least 90% homology to the sequence set forth in of SEQ ID NO: 4 and the second primer of said second primer pair having at least 90% homology to the sequence set forth in SEQ ID NO: 5;

the first primer pair of said third primer pair having at least 90% homology to the sequence set forth in SEQ ID NO: 6; and said second primer of said fifth primer pair having at least 90% homology to the sequence set forth in SEQ ID NO: 7; and the first primer of said fourth primer pair having at least 90% homology to the sequence set forth in SEQ ID NO: 7, and the second primer of said sixth primer pair having at least 90% homology to the sequence set forth in SEQ ID NO: 8;

the first primer pair of said fifth primer pair having at least 90% homology to the sequence set forth in SEQ ID NO: 9, 10 or 11; and said second primer of said fifth primer pair having at least 90% homology to the sequence set forth in SEQ ID NO: 12; and the first primer of said sixth primer pair having at least 90% homology to the sequence set forth in SEQ ID NO: 13 or SEQ ID NO: 14, and the second primer of said sixth primer pair having at least 90% homology to the sequence set forth in SEQ ID NO: 15 or SEQ ID NO:16.

2. The composition of claim 1 in a solution.

3. The composition of claim 1 in a lyophilized pellet.

4. The composition of claim 3 wherein said lyophilized pellet is in a biochip.

5. The composition of claim 1 wherein at least 3 different dyes are used to label the primers.

6. The composition of claim 1, wherein:

the first primer of said first primer pair having at least 95% homology to the sequence set forth in SEQ ID NO: 1 and the second primer of said first primer pair having at least 95% homology to the sequence set forth in SEQ ID NO: 2 or 3;

the first primer of said second primer pair having at least 95% homology to the sequence set forth in SEQ ID NO: 4 and the second primer of said second primer pair having at least 95% homology to the sequence set forth in SEQ ID NO: 5;

the first primer of said third primer pair having at least 95% homology to the sequence set forth in SEQ ID NO: 6; and said second primer of said fifth primer pair having at least 95% homology to the sequence set forth in SEQ ID NO: 7; and the first primer of said fourth primer pair having at least 95% homology to the sequence set forth in SEQ ID NO: 7, and the second primer of said sixth primer pair having at least 95% homology to the sequence set forth in SEQ ID NO: 8;

the first primer pair of said fifth primer pair having at least 95% homology to the sequence set forth in SEQ ID NO: 9, 10 or 11; and said second primer of said fifth primer pair having at least 95% homology to the sequence set forth in SEQ ID NO: 12; and the first primer of said sixth primer pair having at least 95% homology to the sequence set forth in SEQ ID NO: 13 or SEQ ID NO: 14, and the second primer of said sixth primer pair having at least 95% homology to the sequence set forth in SEQ ID NO: 15 or SEQ ID NO:16.

7. The composition of claim 1, wherein:

the first primer of said first primer pair having the sequence set forth in SEQ ID NO: 1 and the second primer of said first primer pair having the sequence set forth in SEQ ID NO: 2 or 3;

the first primer of said second primer pair having the sequence set forth in SEQ ID NO: 4 and the second primer of said second primer pair having the sequence set forth in SEQ ID NO: 5;

the first primer pair of said third primer pair having the sequence set forth in SEQ ID NO: 6; and said second primer of said fifth primer pair having the sequence set forth in SEQ ID NO: 7; and the first primer of said fourth primer pair having the sequence set forth in SEQ ID NO: 7, and the second primer of said sixth primer pair having the sequence set forth in SEQ ID NO: 8;

the first primer pair of said fifth primer pair having the sequence set forth in SEQ ID NO: 9, 10 or 11; and said second primer of said fifth primer pair having the sequence set forth in SEQ ID NO: 12; and the first primer of said sixth primer pair having the sequence set forth in SEQ ID NO: 13 or SEQ ID NO: 14, and the second primer of said sixth primer pair having the sequence set forth in SEQ ID NO: 15 or SEQ ID NO:16.

8. The composition of claim 1, wherein at least one primer has:

(i) at least one mismatch to nontarget sequences within 3 nucleotides from the 3' end creating a primer with one mismatch to nontarget sequences; or (ii) at least 2 mismatches to nontarget sequences within 3 nucleotides from the 3' end and wherein said at least 2 mismatches are adjacent creating a primer with one mismatch to target sequences and two mismatches to nontarget sequences; or (iii) at least one nucleotide truncation from the 5' end to result in at least one primer with a Tm of 1-2° C. below the optimized annealing temperature; or (iv) at least one nucleotide elongation at the 5' end; or (v) an elimination of at least one GC nucleotide pair within the first two positions of the 3' end.

9. The composition of claim 1 further comprising at least one genus-specific primer pair in which at least one primer of each primer pair is labeled with a fluorescent dye, wherein the genus-specific primer pair is specific for the genus selected from the group consisting of: *Pseudomonas, Bacillus, Aspergillus, Penicillium, Flavobacteriaceae, Fusarium, Burkholderia, Marinobacter, Halomonas*, and *Candida*.

10. The composition of claim 1 further comprising at least one species-specific primer pair in which at least one primer of each primer pair is labeled with a fluorescent dye, wherein the species specific primer pair is specific for the species selected from the group consisting of: *Penicillium chrysogenum, Candida glabrata, Hormoconis resinae* and *Desulfovibrio vulgaris*.

11. A composition comprising at least twelve (12) primer pairs in which at least one primer of each primer pair is labeled with a fluorescent dye;

(i) the first primer of said first primer pair having at least 90% homology to the sequence set forth in SEQ ID NO: 1 and the second primer of said first primer pair having at least 90% homology to the sequence set forth in SEQ ID NO: 2;

(ii) the first primer of said second primer pair having at least 90% homology to the sequence set forth in SEQ ID NO: 1 and the second primer of said second primer pair having at least 90% homology to the sequence set forth in SEQ ID NO: 3;

(iii) the first primer of said third primer pair having at least 90% homology to the sequence set forth in SEQ ID NO: 4 and the second primer of said third primer pair having at least 90% homology to the sequence set forth in SEQ ID NO: 5;

(iv) the first primer pair of said fourth primer pair having at least 90% homology to the sequence set forth in SEQ ID NO: 6; and said second primer of said fourth primer pair having at least 90% homology to the sequence set forth in SEQ ID NO: 7;

(v) the first primer pair of said fifth primer pair having at least 90% homology to the sequence set forth in SEQ ID NO: 8; and said second primer of said fifth primer pair having at least 90% homology to the sequence set forth in SEQ ID NO: 7;

(vi) the first primer of said sixth primer pair having at least 90% homology to the sequence set forth in SEQ ID NO: 9, and the second primer of said sixth primer pair having at least 90% homology to the sequence set forth in SEQ ID NO: 12;

(vii) the first primer of said seventh primer pair having at least 90% homology to the sequence set forth in SEQ ID NO: 10, and the second primer of said seventh primer pair having at least 90% homology to the sequence set forth in SEQ ID NO: 12;

(viii) the first primer of said eighth primer pair having at least 90% homology to the sequence set forth in SEQ ID NO: 11, and the second primer of said eighth primer pair having at least 90% homology to the sequence set forth in SEQ ID NO: 12;

(ix) the first primer pair of said ninth primer pair having at least 90% homology to the sequence set forth in SEQ ID NO: 13 and said second primer of said ninth primer pair having at least 90% homology to the sequence set forth in SEQ ID NO: 15; and (x) the first primer pair of said tenth primer pair having at least 90% homology to the sequence set forth in SEQ ID NO: 13 and said second primer of said tenth primer pair having at least 90% homology to the sequence set forth in SEQ ID NO: 16; and (xi) the first primer pair of said eleventh primer pair having at least 90% homology to the sequence set forth in SEQ ID NO: 14 and said second primer of said eleventh primer pair having at least 90% homology to the sequence set forth in SEQ ID NO: 15; and (xii) the first primer pair of said twelfth primer pair having at least 90% homology to the sequence set forth in SEQ ID NO: 14 and said second primer of said twelfth primer pair having at least 90% homology to the sequence set forth in SEQ ID NO: 16.

12. The composition of claim 11 in a solution.

13. The composition of claim 11 in a lyophilized pellet.

14. The composition of claim 13, wherein said lyophilized pellet is in a biochip.

15. The composition of claim 11, wherein at least 3 different dyes are used to label the primers.

16. The composition of claim 11, wherein:
(i) the first primer of said first primer pair having at least 95% homology to the sequence set forth in SEQ ID NO: 1 and the second primer of said first primer pair having at least 95% homology to the sequence set forth in SEQ ID NO: 2;
(ii) the first primer of said second primer pair having at least 95% homology to the sequence set forth in SEQ ID NO: 1 and the second primer of said second primer pair having at least 95% homology to the sequence set forth in SEQ ID NO: 3;
(iii) the first primer of said third primer pair having at least 95% homology to the sequence set forth in SEQ ID NO: 4 and the second primer of said third primer pair having at least 95% homology to the sequence set forth in SEQ ID NO: 5;
(iv) the first primer pair of said fourth primer pair having at least 95% homology to the sequence set forth in SEQ ID NO: 6; and said second primer of said fourth primer pair having at least 95% homology to the sequence set forth in SEQ ID NO: 7;
(v) the first primer pair of said fifth primer pair having at least 95% homology to the sequence set forth in SEQ ID NO: 8; and said second primer of said fifth primer pair having at least 95% homology to the sequence set forth in SEQ ID NO: 7;
(vi) the first primer of said sixth primer pair having at least 95% homology to the sequence set forth in SEQ ID NO: 9, and the second primer of said sixth primer pair having at least 95% homology to the sequence set forth in SEQ ID NO: 12;
(vii) the first primer of said seventh primer pair having at least 95% homology to the sequence set forth in SEQ ID NO: 10, and the second primer of said seventh primer pair having at least 95% homology to the sequence set forth in SEQ ID NO: 12;
(viii) the first primer of said eighth primer pair having at least 95% homology to the sequence set forth in SEQ ID NO: 11, and the second primer of said eighth primer pair having at least 95% homology to the sequence set forth in SEQ ID NO: 12;
(ix) the first primer pair of said ninth primer pair having at least 95% homology to the sequence set forth in SEQ ID NO: 13 and said second primer of said ninth primer pair having at least 95% homology to the sequence set forth in SEQ ID NO: 15; and
(x) the first primer pair of said tenth primer pair having at least 95% homology to the sequence set forth in SEQ ID NO: 13 and said second primer of said tenth primer pair having at least 95% homology to the sequence set forth in SEQ ID NO: 16; and
(xi) the first primer pair of said eleventh primer pair having at least 95% homology to the sequence set forth in SEQ ID NO: 14 and said second primer of said eleventh primer pair having at least 95% homology to the sequence set forth in SEQ ID NO: 15; and
(xii) the first primer pair of said twelfth primer pair having at least 95% homology to the sequence set forth in SEQ ID NO: 14 and said second primer of said twelfth primer pair having at least 95% homology to the sequence set forth in SEQ ID NO: 16.

17. The composition of claim 11, wherein:
(i) the first primer of said first primer pair having the sequence set forth in SEQ ID NO: 1 and the second primer of said first primer pair having the sequence set forth in SEQ ID NO: 2;
(ii) the first primer of said second primer pair having the sequence set forth in SEQ ID NO: 1 and the second primer of said second primer pair having the sequence set forth in SEQ ID NO: 3;
(iii) the first primer of said third primer pair having the sequence set forth in SEQ ID NO: 4 and the second primer of said third primer pair having the sequence set forth in SEQ ID NO: 5;
(iv) the first primer pair of said fourth primer pair having the sequence set forth in SEQ ID NO: 6; and said second primer of said fourth primer pair having the sequence set forth in SEQ ID NO: 7;
(v) the first primer pair of said fifth primer pair having the sequence set forth in SEQ ID NO: 8; and said second primer of said fifth primer pair having the sequence set forth in SEQ ID NO: 7;
(vi) the first primer of said sixth primer pair having the sequence set forth in SEQ ID NO: 9, and the second primer of said sixth primer pair having the sequence set forth in SEQ ID NO: 12;
(vii) the first primer of said seventh primer pair having the sequence set forth in SEQ ID NO: 10, and the second primer of said seventh primer pair having the sequence set forth in SEQ ID NO: 12;
(viii) the first primer of said eighth primer pair having the sequence set forth in SEQ ID NO: 11, and the second primer of said eighth primer pair having the sequence set forth in SEQ ID NO: 12;
(ix) the first primer pair of said ninth primer pair having the sequence set forth in SEQ ID NO: 13 and said second primer of said ninth primer pair having the sequence set forth in SEQ ID NO: 15; and
(x) the first primer pair of said tenth primer pair having the sequence set forth in SEQ ID NO: 13 and said second primer of said tenth primer pair having the sequence set forth in SEQ ID NO: 16; and
(xi) the first primer pair of said eleventh primer pair having the sequence set forth in SEQ ID NO: 14 and said second primer of said eleventh primer pair having the sequence set forth in SEQ ID NO: 15; and
(xii) the first primer pair of said twelfth primer pair having the sequence set forth in SEQ ID NO: 14 and said second primer of said twelfth primer pair having the sequence set forth in SEQ ID NO: 16.

18. The composition of claim 11, wherein at least one primer has:
(i) a first mismatch to nontarget sequences within 3 nucleotides from the 3' end creating a primer with one mismatch to nontarget sequences; or
(ii) at least 2 mismatches to nontarget sequences within 3 nucleotides from the 3' end and wherein said at least 2 mismatches are adjacent creating a primer with one mismatch to target sequences and two mismatches to nontarget sequences; or (iii) at least one nucleotide truncation from the 5' end to result in at least one primer with a Tm of 1-2° C. below the optimized annealing temperature; or (iv) at least one nucleotide elongation at the 5' end; or (v) an elimination of at least one GC nucleotide pair within the first two positions of the 3' end.

19. The composition of claim 11, further comprising at least one genus-specific primer pair in which at least one primer of each primer pair is labeled with a fluorescent dye, wherein the genus-specific primer pair is specific for the genus selected from the group consisting of: *Pseudomonas, Bacillus, Aspergillus, Penicillium, Flavobacteriaceae, Fusarium, Burkholderia, Marinobacter, Halomonas*, and *Candida*.

20. The composition of claim 11, further comprising at least one species-specific primer pair in which at least one primer of each primer pair is labeled with a fluorescent dye, wherein the species specific primer pair is specific for the species selected from the group consisting of: *Penicillium chrysogenum, Candida glabrata, Hormoconis resinae* and *Desulfovibrio vulgaris*.

* * * * *

SEQUENCE LISTING

```
<160> NUMBER OF SEQ ID NOS: 80

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 1
gaggaaggtg gggacgacgt                                              20

<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 2
gtacaaggcc cgggaacgca                                              20

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 3
gtacaagacc cgggaacgca                                              20

<210> SEQ ID NO 4
<211> LENGTH: 27
```

```
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 4
gtttcttcgg acggctcagt aacacgt                                        27

<210> SEQ ID NO 5
<211> LENGTH: 18
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 5
gggtccatct ccgggctc                                                  18

<210> SEQ ID NO 6
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 6
cttaggggga ctatcggctc a                                              21

<210> SEQ ID NO 7
<211> LENGTH: 28
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 7
gtcgttgaag agcaataatt acaatgct                                       28

<210> SEQ ID NO 8
<211> LENGTH: 28
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
```

Desulfotomaculum, Clostridium, Achromobater, Bordetella, Bacillus,
Burkholderia, Marinobacter, Halomonas, Hormoconis resinae,
Penicillium, Fusarium, Aspergillus and Candida

<400> SEQUENCE: 8
ccttaaccta ctaaatagtg gtgctagc                                       28

<210> SEQ ID NO 9
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 9
gtgctgcctg aacatgtgcg g                                              21

<210> SEQ ID NO 10
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 10
gtgctgcatc aacatgtgcg g                                              21

<210> SEQ ID NO 11
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 11
gtgctgtgca aacatgtgtg g                                              21

<210> SEQ ID NO 12
<211> LENGTH: 29
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 12
tttctgtagc agttaccgca gtacatgca                                      29

```
<210> SEQ ID NO 13
<211> LENGTH: 26
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 13
gtgttcattg cgtagttagg gtagtt                                          26

<210> SEQ ID NO 14
<211> LENGTH: 26
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 14
gcgttcattg catagtttgg atagtt                                          26

<210> SEQ ID NO 15
<211> LENGTH: 23
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 15
tttgcccttg aagaccactt cgg                                             23

<210> SEQ ID NO 16
<211> LENGTH: 23
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 16
gcattgttag aagaccactt tgg                                             23

<210> SEQ ID NO 17
<211> LENGTH: 23
<212> TYPE: DNA
<213> ORGANISM: Artificial Sequence
<220> FEATURE:
```

<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 17
gtggaatctg cctggtagtg ggg                                          23

<210> SEQ ID NO 18
<211> LENGTH: 22
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 18
cgtgtctcag ttccagtgtg ac                                           22

<210> SEQ ID NO 19
<211> LENGTH: 24
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 19
cgtgcctttt gcataatgag ctta                                         24

<210> SEQ ID NO 20
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 20
gtattggtag gcggtgaagc c                                            21

<210> SEQ ID NO 21
<211> LENGTH: 25
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 21
gtttacgatg gatgctaggt gyygg                                      25

<210> SEQ ID NO 22
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 22
cttaacccaa cacctcacgg c                                          21

<210> SEQ ID NO 23
<211> LENGTH: 15
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 23
ggcaacccgg cggag                                                 15

<210> SEQ ID NO 24
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 24
gtttgggtcc cgcaacccca g                                          21

<210> SEQ ID NO 25
<211> LENGTH: 22
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 25
cgagccaacg agttacggta tg                                         22

<210> SEQ ID NO 26

```
<211> LENGTH: 30
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 26
gtgcattcgg agtttgataa ggttcggtaa                                          30

<210> SEQ ID NO 27
<211> LENGTH: 22
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 27
gaagcgtggt cgctagatta cg                                                  22

<210> SEQ ID NO 28
<211> LENGTH: 25
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 28
gtttcgactt gtcagtctca cagtc                                               25

<210> SEQ ID NO 29
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 29
tgtccctgtt gctgcattga a                                                   21

<210> SEQ ID NO 30
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
```

<223> OTHER INFORMATION: Pseudomonas, Flavobacteriaceae,
     Desulfotomaculum, Clostridium, Achromobater, Bordetella, Bacillus,
     Burkholderia, Marinobacter, Halomonas, Hormoconis resinae,
     Penicillium, Fusarium, Aspergillus and Candida

<400> SEQUENCE: 30
gtagccaccg attctctgcg a                                         21

<210> SEQ ID NO 31
<211> LENGTH: 23
<212> TYPE: DNA
<213> ORGANISM: Artificial Sequence
<220> FEATURE:
<223> OTHER INFORMATION: Description of Artificial Sequence: Synthetic
     primer
<220> FEATURE:
<223> OTHER INFORMATION: Pseudomonas, Flavobacteriaceae,
     Desulfotomaculum, Clostridium, Achromobater, Bordetella, Bacillus,
     Burkholderia, Marinobacter, Halomonas, Hormoconis resinae,
     Penicillium, Fusarium, Aspergillus and Candida

<400> SEQUENCE: 31
gatatgcttc ggggagctgt aag                                       23

<210> SEQ ID NO 32
<211> LENGTH: 26
<212> TYPE: DNA
<213> ORGANISM: Artificial Sequence
<220> FEATURE:
<223> OTHER INFORMATION: Description of Artificial Sequence: Synthetic
     primer
<220> FEATURE:
<223> OTHER INFORMATION: Pseudomonas, Flavobacteriaceae,
     Desulfotomaculum, Clostridium, Achromobater, Bordetella, Bacillus,
     Burkholderia, Marinobacter, Halomonas, Hormoconis resinae,
     Penicillium, Fusarium, Aspergillus and Candida

<400> SEQUENCE: 32
gtttctcaac cccaagaggc aagcct                                    26

<210> SEQ ID NO 33
<211> LENGTH: 18
<212> TYPE: DNA
<213> ORGANISM: Artificial Sequence
<220> FEATURE:
<223> OTHER INFORMATION: Description of Artificial Sequence: Synthetic
     primer
<220> FEATURE:
<223> OTHER INFORMATION: Pseudomonas, Flavobacteriaceae,
     Desulfotomaculum, Clostridium, Achromobater, Bordetella, Bacillus,
     Burkholderia, Marinobacter, Halomonas, Hormoconis resinae,
     Penicillium, Fusarium, Aspergillus and Candida

<400> SEQUENCE: 33
cgccgtcgat gatcgtcg                                             18

<210> SEQ ID NO 34
<211> LENGTH: 25
<212> TYPE: DNA
<213> ORGANISM: Artificial Sequence
<220> FEATURE:
<223> OTHER INFORMATION: Description of Artificial Sequence: Synthetic
     primer
<220> FEATURE:
<223> OTHER INFORMATION: Pseudomonas, Flavobacteriaceae,
     Desulfotomaculum, Clostridium, Achromobater, Bordetella, Bacillus,
     Burkholderia, Marinobacter, Halomonas, Hormoconis resinae,
     Penicillium, Fusarium, Aspergillus and Candida

<400> SEQUENCE: 34
gtttcgctgg tcgtgaacaa catcc                                              25

<210> SEQ ID NO 35
<211> LENGTH: 18
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 35
cacgccggtg tgtacgtg                                                      18

<210> SEQ ID NO 36
<211> LENGTH: 27
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 36
gttcacaagc atgctcaaag ttcactg                                            27

<210> SEQ ID NO 37
<211> LENGTH: 26
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 37
aacctttact atagcttcac actgga                                             26

<210> SEQ ID NO 38
<211> LENGTH: 24
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 38 gtcacccttta tgctcttgca ctca                                              24

<210> SEQ ID NO 39
<211> LENGTH: 23
<212> TYPE: DNA
<213> ORGANISM: Artificial Sequence

```
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 39
gtcgttacct ttgttgcttt ggc                                         23

<210> SEQ ID NO 40
<211> LENGTH: 23
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 40
actcactgaa ttctgcaatt cgc                                         23

<210> SEQ ID NO 41
<211> LENGTH: 20
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 41
gtctcgatgg cgatggacag                                             20

<210> SEQ ID NO 42
<211> LENGTH: 25
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 42
gtttctgtcg gggcggaaaa gcttg                                       25

<210> SEQ ID NO 43
<211> LENGTH: 25
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
```

Penicillium, Fusarium, Aspergillus and Candida

<400> SEQUENCE: 43
gctcaaattt gaaatctggc tctcg                                             25

<210> SEQ ID NO 44
<211> LENGTH: 24
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 44
gttaaccaag cccaagtctg gtca                                              24

<210> SEQ ID NO 45
<211> LENGTH: 18
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 45
gcgaacggag gtgggagc                                                     18

<210> SEQ ID NO 46
<211> LENGTH: 40
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 46
gtttctttct aatcattcgc tttacctcat aaaactgatt                             40

<210> SEQ ID NO 47
<211> LENGTH: 23
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 47
gtggtaggac tacccgctga act                                               23

```
<210> SEQ ID NO 48
<211> LENGTH: 19
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 48
cccgggtcat ctcatcgca                                                    19

<210> SEQ ID NO 49
<211> LENGTH: 25
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 49
gtttcttcgc gcgtaggtgg ttcag                                             25

<210> SEQ ID NO 50
<211> LENGTH: 22
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 50
tttctactcc ccaggcggtc ga                                                22

<210> SEQ ID NO 51
<211> LENGTH: 34
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 51
gtttcttctt gtccttagtt accagcacgt tatg                                   34

<210> SEQ ID NO 52
<211> LENGTH: 23
<212> TYPE: DNA
<213> ORGANISM: Artificial Sequence
<220> FEATURE:
<223> OTHER INFORMATION: Description of Artificial Sequence: Synthetic
      primer
```

```
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 52
cggactacga tcggttttgt gag                                           23

<210> SEQ ID NO 53
<211> LENGTH: 23
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 53
ggttgtcgtc tctaggtatc ttg                                           23

<210> SEQ ID NO 54
<211> LENGTH: 20
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Pseudomonas, Flavobacteriaceae,
      Desulfotomaculum, Clostridium, Achromobater, Bordetella, Bacillus,
      Burkholderia, Marinobacter, Halomonas, Hormoconis resinae,
      Penicillium, Fusarium, Aspergillus and Candida

<400> SEQUENCE: 54
gttgttggcc atacggattg                                               20

<210> SEQ ID NO 55
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 55
ggagttgatc gctcgaggca aggaacaggg ttacctgacc tatgccgagg tcaacgacca   60
tctacccgag gatatcgccg acccggatca agtggaagac atcattggca tgatcaacga  120
catgggtata agtgtcgctg aagaagcgc                                    149

<210> SEQ ID NO 56
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 56
ggagttgatc gcgcgcggca aggagcaggg ctacctgacc tatgccgagg tcaacgacca   60
tctacccgag gatatcgccg acccggatca agtggaagac atcattggca tgatcaacga  120
catgggtatc agtgtcgttg aggaagcgc                                    149
```

<210> SEQ ID NO 57
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 57
ggagttgatc gcgcggggta aggagcaagg ctaccttacc tatgccgagg tcaacgatca      60
tctacccgag gatatcgccg atccggatca agtagaagac atcatcagca tgatcaacga     120
catgggtatc agtgtcgttg aagtcgcgc                                       149

<210> SEQ ID NO 58
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 58
ggagttgatc gcgcgcggca aggaacaggg ttacctgacc tatgccgagg tcaacgacca      60
tctacccgag gatatcgccg acccggatca agtggaagac atcattggca tgatcaacga     120
catgggtatt agtgtcgttg aagaagcgc                                       149

<210> SEQ ID NO 59
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 59
ggagttgatc gcgcgcggca aggaacaggg ctacctgacc tatgccgagg tcaacgacca      60
tctacccgag gatatcgccg acccggatca agtggaagac atcattggca tgatcaacga     120
catgggtatt agtgtcgctg aagaagcgc                                       149

<210> SEQ ID NO 60
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 60
ggagttgatc gcgcgcggca aggaacaggg ctacctgacc tatgccgagg tcaacgacca      60
tctacccgag gatatcgccg acccggatca agtggaagac atcattggca tgatcaacga     120
catgggtatc agtgtcgttg aagaagcgc                                       149

<210> SEQ ID NO 61
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 61
ggagttgatc gcgcgcggca aggaacaggg ctacctgacc tatgccgagg tcaacgacca    60
tctacccgag gatatcgccg acccggatca agtggaagac atcattggca tgatcaacga    120
catgggtatc agtgtcgttg aggaagcgc                                      149

<210> SEQ ID NO 62
<211> LENGTH: 148
<212> TYPE: DNA
<213> ORGANISM: Unknown
<220> FEATURE:
<223> OTHER INFORMATION: Description of Unknown:
      non-target sequence

<400> SEQUENCE: 62
ggagttgatc gctcgaggca aggaacaggg ctacctgacc tatgccgagg tcaacgacca    60
tctacccgag gatatcgccg acccggatca gtggaagaca tcattggcat gatcaacgac    120
atgggtatta gtgtcgctga agaagccc                                       148

<210> SEQ ID NO 63
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 63
ggagttgatc gctcgaggca aggaacaggg ctacctgacc tatgccgagg tcaacgacca    60
tctacccgag gatatcgccg acccggatca agtggaagac atcattggca tgatcaacga    120
catgggtata agtgtcgctg aagaagcgc                                      149

<210> SEQ ID NO 64
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 64
ggagttgatc gcgcgcggca aggaacaggg ctacctgacc tatgccgagg tcaacgacca    60
tctacccgag gatatcgccg accccgatca ggtggaagac atcatcggca tgatcaacga    120
catgggtatc agcgtcgtcg aggaagccc                                      149

<210> SEQ ID NO 65
<211> LENGTH: 149
<212> TYPE: DNA
<213> ORGANISM: Unknown
<220> FEATURE:
<223> OTHER INFORMATION: Description of Unknown:
      non-target sequence

<400> SEQUENCE: 65
ggagttgatc gcgcgcggca aggaacaggg ctacctgacc tatgccgagg tcaacgacca    60
tctacccgag gatatcgccg acccggatca agtggaagac atcattggca tgatcaacga    120
catgggtatt agtgtcgttg aagaagcgc                                      149

<210> SEQ ID NO 66
<211> LENGTH: 149
<212> TYPE: DNA

<213> ORGANISM: Unknown
<220> FEATURE:
<223> OTHER INFORMATION: Description of Unknown:
      target sequence

<400> SEQUENCE: 66
ggagttgatc gcgcgcggca aggaacaggg cttcctgacc tatgccgagg tcaacgacca      60
ccttcccgag gatatcgccg acccggatca agtggaagac atcatcggca tgatcaacga     120
catgggcatc aatgtcgttg aggaggcgc                                       149

<210> SEQ ID NO 67
<211> LENGTH: 149
<212> TYPE: DNA
<213> ORGANISM: Unknown
<220> FEATURE:
<223> OTHER INFORMATION: Description of Unknown:
      target sequence

<400> SEQUENCE: 67
ggagttgatc gcgcgcggca aggaacaggg cttcctgacc tatgccgagg tcaacgacca      60
tcttcccgag gatatcgccg accccgatca ggtggaagac atcatcggca tgatcaacga     120
catgggtatc aatgtcgtcg aggaagcgc                                       149

<210> SEQ ID NO 68
<211> LENGTH: 149
<212> TYPE: DNA
<213> ORGANISM: Unknown
<220> FEATURE:
<223> OTHER INFORMATION: Description of Unknown:
      target sequence

<400> SEQUENCE: 68
ggagttgatc gcgcgcggca aggaacaggg cttcctgacc tatgccgagg tcaacgacca      60
ccttcccgag gatatcgccg acccggatca ggtggaagac atcatcggca tgatcaacga     120
catgggcatc agcgtcgtcg aggaagccc                                       149

<210> SEQ ID NO 69
<211> LENGTH: 149
<212> TYPE: DNA
<213> ORGANISM: Unknown
<220> FEATURE:
<223> OTHER INFORMATION: Description of Unknown:
      target sequence

<400> SEQUENCE: 69
ggagttgatc gcgcgcggca aggagcaggg cttcctgact tatgccgagg tcaacgacca      60
ccttcccgag gatatcgccg acccggatca agtggaagac atcatcggca tgatcaacga     120
catgggtatc agcgtcgttg aagaagcgc                                       149

<210> SEQ ID NO 70
<211> LENGTH: 149
<212> TYPE: DNA
<213> ORGANISM: Unknown
<220> FEATURE:
<223> OTHER INFORMATION: Description of Unknown:
      target sequence

<400> SEQUENCE: 70
ggagttgatc gcgcgcggca aggaacaggg tttcctgacc tatgccgagg tcaacgacca      60
tcttcccgag gatatcgccg accccgatca ggtggaagac atcatcggca tgatcaacga     120

```
catgggtatc aatgtcgtcg aggaagcgc                                        149

<210> SEQ ID NO 71
<211> LENGTH: 18
<212> TYPE: DNA
<213> ORGANISM: Unknown
<220> FEATURE:
<223> OTHER INFORMATION: Description of Unknown:
      primary sequence

<400> SEQUENCE: 71
cggcgatatc ctcggaaa                                                     18

<210> SEQ ID NO 72
<211> LENGTH: 18
<212> TYPE: DNA
<213> ORGANISM: Unknown
<220> FEATURE:
<223> OTHER INFORMATION: Description of Unknown:
      target sequence

<400> SEQUENCE: 72
ttcccgagga tatcgccg                                                     18

<210> SEQ ID NO 73
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 73
agatggtcgt tgacctcg                                                     18

<210> SEQ ID NO 74
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 74
cgaggtcaac gaccatct                                                     18

<210> SEQ ID NO 75
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 75
gatggtcgtt gacctcg                                                      17

<210> SEQ ID NO 76
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 76
cgaggtcaac gaccatc                                                      17
```

<210> SEQ ID NO 77
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 77
tagatggtcg ttgacctcg                                                  19

<210> SEQ ID NO 78
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 78
cgaggtcaac gaccatcta                                                  19

<210> SEQ ID NO 79
<211> LENGTH: 1214
<212> TYPE: DNA
<213> ORGANISM: Pseudomonas putida

<400> SEQUENCE: 79
ggacgggtga gtaatgccta ggaatctgcc tggtagtggg ggacaacgtt tcgaaaggaa      60
cgctaatacc gcatacgtcc tacgggagaa agcaggggac cttcgggcct tgcgctatca    120
gatgagccta ggtcggatta gctagttggt ggggtaatgg ctcaccaagg cgacgatccg    180
taactggtct gagaggatga tcagtcacac tggaactgag acacggtcca gactcctacg    240
ggaggcagca gtggggaata ttggacaatg ggcgaaagcc tgatccagcc atgccgcgtg    300
tgtgaagaag gtcttcggat tgtaaagcac tttaagttgg gaggaagggc agtaagttaa    360
taccttgctg ttttgacgtt accgacagaa taagcaccgg ctaactctgt gccagcagcc    420
gcggtaatac agagggtgca agcgttaatc ggaattactg ggcgtaaagc gcgcgtaggt    480
ggtttgttaa gttggatgtg aaagccccgg gctcaacctg gaactgcat ccaaaactgg     540 caagctagag tacggtagag ggtggtgaa tttcctgtgt agcggtgaaa tgcgtagata     600
taggaaggaa caccagtggc gaaggcgacc acctggactg atactgacac tgaggtgcga    660
aagcgtgggg agcaaacagg attagatacc ctggtagtcc acgccgtaaa cgatgtcaac    720
tagccgttgg aatccttgag attttagtgg cgcagctaac gcattaagtt gaccgcctgg    780
ggagtacggc cgcaaggtta aaactcaaat gaattgacgg gggcccgcac aagcggtgga    840
gcatgtggtt taattcgaag caacgcgaag aaccttacca ggccttgaca tgcagagaac    900
tttccagaga tggattggtg ccttcgggaa ctctgacaca ggtgctgcat ggctgtcgtc    960
agctcgtgtc gtgagatgtt gggttaagtc ccgtaacgag cgcaacccct tgtccttagt   1020
accagcacgt tatggtgggc actctaagga gactgccggt gacaaaccgg aggaaggtgg   1080
ggatgacgtc aagtcatcat ggcccttacg gcctgggcta cacacgtgct acaatggtcg   1140
gtacagaggg ttgccaagcc gcgaggtgga gctaatctca caaaaccgat cgtagtccgg   1200
atcgcagtct gcaa                                                    1214

<210> SEQ ID NO 80

-continued

```
<211> LENGTH: 1213
<212> TYPE: DNA
<213> ORGANISM: Pseudomonas aeruginosa

<400> SEQUENCE: 80
ggacgggtga gtaatgccta ggaatctgcc tggtagtggg ggataacgtc cggaaacggg      60
cgctaatacc gcatacgtcc tgagggagaa agtgggggat cttcggacct cacgctatca     120
gatgagccta ggtcggatta gctagttggt ggggtaaagg cctaccaagg cgacgatccg     180
taactggtct gagaggatga tcagtcacac tggaactgag acacggtcca gactcctacg     240
ggaggcagca gtggggaata ttggacaatg ggcgaaagcc tgatccagcc atgccgcgtg     300
tgtgaagaag gtcttcggat tgtaaagcac tttaagttgg gaggaagggc agtaagttaa     360
taccttgctg ttttgacgtt accaacagaa taagcaccgg ctaacttcgt gccagcagcc     420
gcggtaatac gaagggtgca agcgttaatc ggaattactg ggcgtaaagc gcgcgtaggt     480
ggttcagcaa gttggatgtg aaatccccgg gctcaacctg gaactgcat ccaaaactac      540 tgagctagag tacggtagag ggtggtgaa tttcctgtgt agcggtgaaa tgcgtagata      600
taggaaggaa caccagtggc gaaggcgacc acctggactg atactgacac tgaggtgcga     660
aagcgtgggg agcaaacagg attagatacc ctggtagtcc acgccgtaaa cgatgtcgac     720
tagccgttgg gatccttgag atcttagtgg cgcagctaac gcgataagtc gaccgcctgg     780
ggagtacggc cgcaaggtta aaactcaaat gaattgacgg gggcccgcac aagcggtgga     840
gcatgtggtt taattcgaag caacgcgaag aaccttacct ggccttgaca tgctgagaac     900
tttccagaga tggattggtg ccttcgggaa ctcagacaca ggtgctgcat ggctgtcgtc     960
agctcgtgtc gtgagatgtt gggttaagtc ccgtaacgag cgcaacccct gtccttagtt    1020
accagcacct cgggtgggca ctctaaggag actgccggtg acaaaccgga ggaaggtggg    1080
gatgacgtca agtcatcatg gcccttacgg ccagggctac acacgtgcta caatggtcgg    1140
tacaaagggt tgccaagccg cgaggtggag ctaatcccat aaaaccgatc gtagtccgga    1200
tcgcagtctg caa                                                      1213
```